United States Patent
Kim et al.

(10) Patent No.: US 9,674,784 B2
(45) Date of Patent: Jun. 6, 2017

(54) METHOD FOR INDICATING CHANNEL ACCESS TYPE IN WIRELESS COMMUNICATION SYSTEM, AND APPARATUS THEREFOR

(71) Applicant: LG ELECTRONICS INC., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/237,382

(22) Filed: Aug. 15, 2016

(65) Prior Publication Data

US 2016/0353378 A1   Dec. 1, 2016

Related U.S. Application Data

(63) Continuation of application No. 14/390,330, filed as application No. PCT/KR2013/005714 on Jun. 27, 2013, now Pat. No. 9,451,637.

(Continued)

(51) Int. Cl.
*H04W 52/02* (2009.01)
*H04W 74/06* (2009.01)
(Continued)

(52) U.S. Cl.
CPC ..... *H04W 52/0216* (2013.01); *H04W 74/008* (2013.01); *H04W 74/06* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | |
|---|---|---|
| 2004/0259542 A1 | 12/2004 | Viitamaki et al. |
| 2005/0152324 A1 | 7/2005 | Benveniste ........... H04W 28/10 370/338 |

(Continued)

FOREIGN PATENT DOCUMENTS

| | | |
|---|---|---|
| WO | 2006-032720 A1 | 3/2006 |
| WO | 2011-149285 A2 | 12/2011 |
| WO | 2012-077952 A2 | 6/2012 |

OTHER PUBLICATIONS

STMicroelectronics: "Low Collision EDCA", IEEE 802.11-1110116r0, XP068038219.L. Chu et al., Jan. 16, 2012.

(Continued)

*Primary Examiner* — Diane Lo
(74) *Attorney, Agent, or Firm* — Dentons US LLP

(57) ABSTRACT

Disclosed is a method for a station (STA) for accessing a channel in a wireless communication system. The method for a STA for accessing a channel in a wireless communication system comprises the steps of: receiving a beacon frame comprising a traffic indicator map (TIM); and transmitting a power save (PS)-Poll frame if buffered traffic is indicated by TIM to the STA, wherein the PS-Poll frame is transmitted during a PS-Poll dedicated restricted access window (RAW) by and/or during an additional RAW, the PS-Poll dedicated RAW being allocated to transmit the PS-Poll frame, and the additional RAW being additionally allocated subsequent to the PS-Poll-dedicated RAW.

18 Claims, 49 Drawing Sheets

Related U.S. Application Data

(60) Provisional application No. 61/664,761, filed on Jun. 27, 2012.

(51) Int. Cl.
*H04W 74/00* (2009.01)
*H04W 84/12* (2009.01)

(56) References Cited

U.S. PATENT DOCUMENTS

| | | | |
|---|---|---|---|
| 2005/0207400 A1 | 9/2005 | Shinohara | |
| 2009/0296618 A1 | 12/2009 | Wang et al. | |
| 2010/0067424 A1 | 3/2010 | Sun | H04W 72/1215 370/311 |
| 2010/0189024 A1 | 7/2010 | Xhafa et al. | |
| 2013/0195036 A1* | 8/2013 | Quan | H04W 72/04 370/329 |
| 2013/0208637 A1 | 8/2013 | Abraham | H04W 52/02 370/311 |
| 2013/0229963 A1 | 9/2013 | Asterjadhi | H04W 28/044 370/311 |
| 2013/0336184 A1* | 12/2013 | Kwon | H04W 74/002 370/311 |
| 2014/0146678 A1 | 5/2014 | Merlin | H04W 68/025 370/235 |

OTHER PUBLICATIONS

Costa-Perez, X. et al., Analysis of the integration of IEEE 802.11e capabilities in battery limited mobile devices, Wireless Communications, IEEE, 2005-12, vol. 12, Issue 6, p. 26-32.

Fan Zhu, et al., Priority Based Power Saving Mode in WLAN, Global Telecommunications conference, 2008. IEEE GLOBECOM 2008, IEEE, Dec. 4, 2008, p. 1-6.

Sang-Wook Kwon, et al., Efficient Power Management Scheme Considering Inter-User QoS in Wireless LAN, Vehicular technology conference, 2006, VTC-2006 Fall. 2006 IEEE 64th, Sep. 28, 2006, p. 1-5.

CATR: "DCF Enhancements for Large Number of STAs", IEEE 802.11-11/1255r0, Liu et al., Sep. 15, 2011.

\* cited by examiner

FIG. 13
(a) 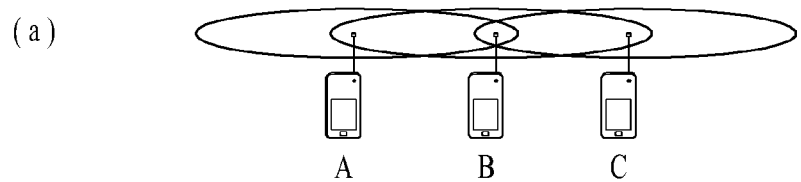
(b) 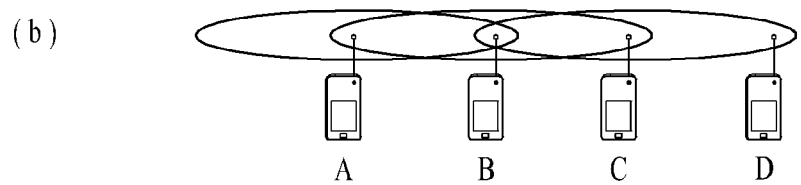
FIG. 14
(a) 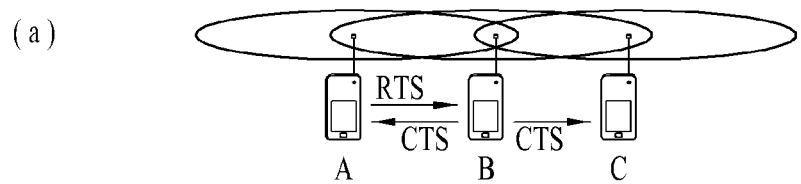
(b) 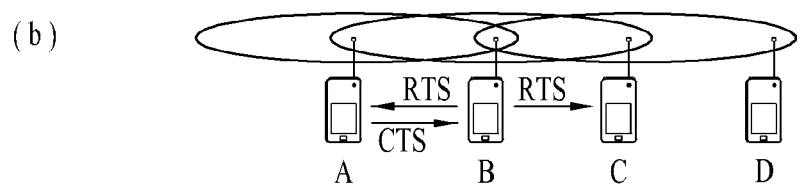

FIG. 18
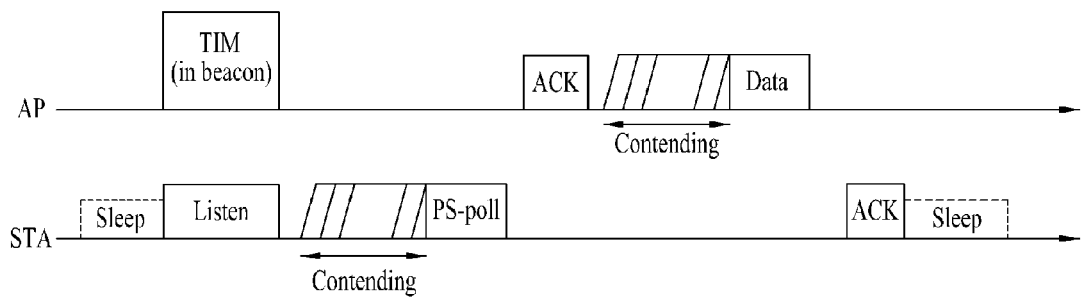
FIG. 19
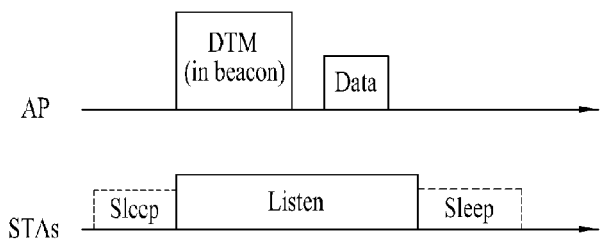
FIG. 20
| Element ID | Length | DTIM Count | DTIM Period | Bitmap Control | Partial Virtual Bitmap |
|---|---|---|---|---|---|
Octets :  1    1    1    1    1    1-251

FIG. 21

| Element ID | Length | TSF 0 Offset | Interval/ Duration | Optional Subelements |
|---|---|---|---|---|
| 1 | 1 | 8 | 4 | variable |

Octets :

(a)

| Frame control | AID = broadcast | BSSID | Bitmap size | ACK bitmap | Padding (For byte alignment) |
|---|---|---|---|---|---|

Otects :    2    2    6    2    Variable    Variable (< 8 bits)

(b)

| Frame control | AID = broadcast | BSSID | ACK bitmap | Padding (For byte alignment) |
|---|---|---|---|---|

Otects :    2    2    6    Variable    Variable (< 8 bits)

(c)

| Frame control | BSSID | ACK bitmap | Padding (For byte alignment) |
|---|---|---|---|

Otects :    2    6    Variable    Variable (< 8 bits)

* RBO : Random backoff

FIG. 45
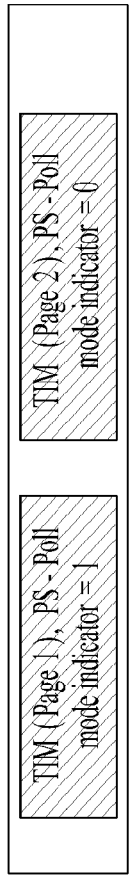
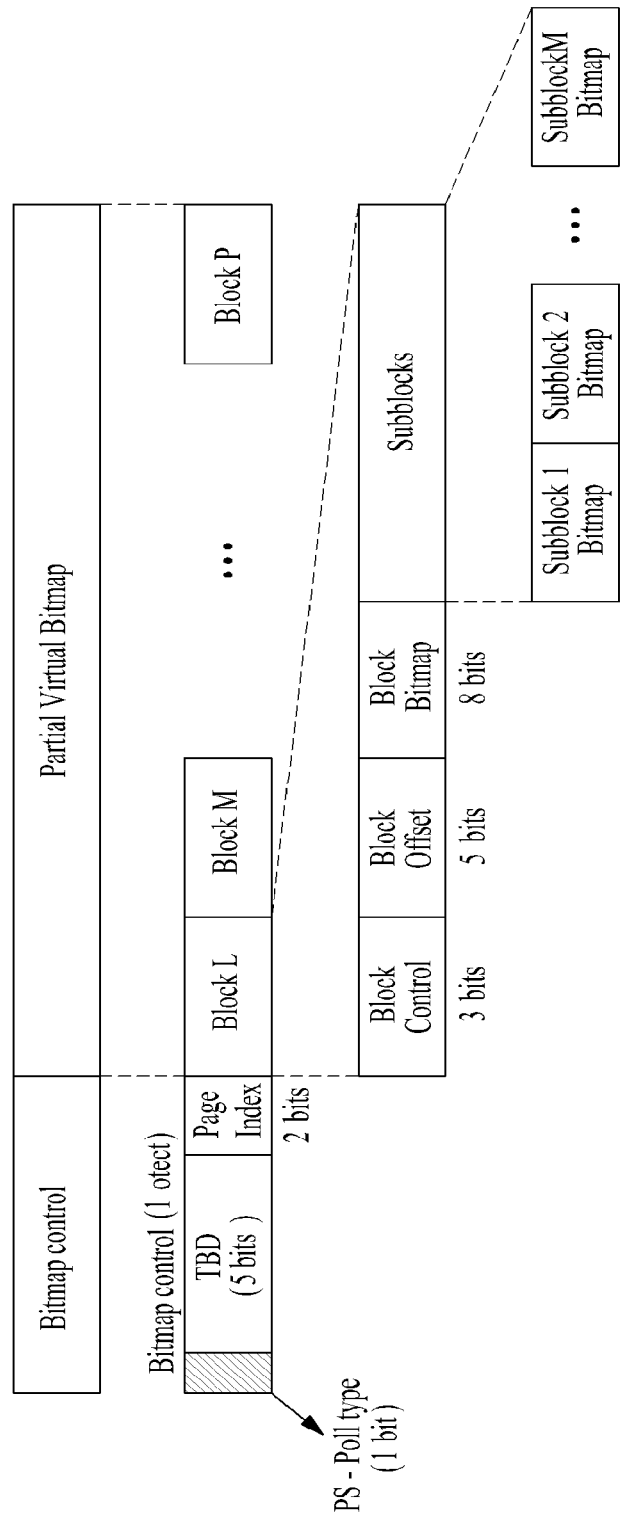

FIG. 50

| Element ID | Length | Group ID | RAW start time | RAW duration | Poll type |

FIG. 59

| STF | LTF | SIG |
|-----|-----|-----|

METHOD FOR INDICATING CHANNEL ACCESS TYPE IN WIRELESS COMMUNICATION SYSTEM, AND APPARATUS THEREFOR

This application is a Continuation of U.S. patent application Ser. No. 14/390,330 filed Oct. 2, 2014, which is a National Stage Entry of International Application No. PCT/KR2013/005714 filed Jun. 27, 2013, which claims priority to U.S. Provisional Application No. 61/664,761 filed Jun. 27, 2012, all of which are hereby incorporated by reference in their entireties as if fully set forth herein.

TECHNICAL FIELD

The present invention relates to a wireless communication system, and more particularly, to a method of indicating a channel access type in a wireless LAN system and apparatus for supporting the same.

BACKGROUND ART

Recently, various kinds of wireless communication technologies have been developed together with the developments of the information communication technology. Particularly, wireless LAN (WLAN) is the technology for accessing Internet by wireless in a home, a company or a specific service provided area using such a mobile user equipment as a personal digital assistant (PDA), a laptop computer, a portable multimedia player (PMP) and the like based on a radio frequency technology.

In order to overcome the limitation put on a communication speed pointed out as a weak point of WLAN, the recent technology standard has introduced a system having an enhanced speed and reliability of a network and an extended operating distance of a wireless network. For instance, IEEE 802.11n has introduced the application of MIMO (Multiple Inputs and Multiple Outputs) that uses multiple antennas at both ends including a transmitting unit and a receiving unit in order to support high throughput for a data processing speed over maximum 540 Mbps, minimize transmission error, and optimize a data rate or speed.

DISCLOSURE OF THE INVENTION

Technical Tasks

One technical task of the present invention is to provide an enhanced method of accessing a channel in a wireless communication system, and preferably, in a wireless LAN (WLAN) system and apparatus therefor.

Another technical task of the present invention is to provide a method of preventing an unnecessary power consumption and transmission delay of a user equipment due to a contention based channel access operation in a WLAN system and apparatus therefor.

A further technical task of the present invention is to provide an opportunity for attempting a channel access additionally if a station fails in performing a channel access successfully.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In a $1^{st}$ technical aspect of the present invention, provided herein is a method of performing a channel access, which is performed by a station (STA) in a wireless communication system, the method including the steps of receiving a beacon frame containing a TIM (traffic indication map) and if a presence of a traffic buffered for the STA is indicated by the TIM, transmitting a PS-Poll (Power Save-Poll) frame, wherein the PS-Poll frame is transmitted during at least one of a PS-Poll dedicated RAW (restricted access window) assigned to transmit the PS-Poll frame and an additional RAW additionally assigned behind the PS-Poll dedicated RAW.

The STA may attempt a transmission of the PS-Poll frame in a PS-Poll interval assigned for the STA within the PS-Poll dedicated RAW. In doing so, the PS-Poll interval may be configured different per STA receiving the indication of the presence of the buffered traffic through the TIM within the PS-Poll dedicated RAW.

If the PS-Poll is not successfully transmitted during the PS-Poll dedicated RAW, the STA may transmit the PS-Poll frame during the additional RAW.

In doing so, if the STA fails to transmit the PS-Poll frame in the PS-Poll interval or is unable to receive an ACK (acknowledgement) frame in response to the PS-Poll despite transmitting the PS-Poll frame in the PS-Poll interval, the STA may determine that the PS-Poll frame was not successfully transmitted.

On the other hand, if the presence of the traffic buffered for the STA is not indicated by the TIM or the STA successfully transmits the PS-Poll frame during the PS-Poll dedicated RAW, the STA may receive a UTA (UL transmission allowance) frame during the additional RAW and may then attempt the channel access during the additional RAW.

At least one of EDCA parameters applied to transmitting the PS-Poll frame during at least one of the PS-Poll dedicated RAW and the additional RAW may be equivalent to or smaller than an EDCA parameter applied to transmitting an audio traffic.

In this case, the EDCA parameter may include at least one of CWmin (minimum Contention Window), CWmax (maximum Contention Window) and AIFSN (Arbitration Inter-Frame Spacing Number).

The STA may further receive a data frame during the additional RAW. In this case, the STA may receive a UTA (UL transmission allowance frame) during the additional RAW after receiving the data frame.

For another instance, a transmission priority of the PS-Poll frame may be set equivalent to that of an audio traffic during at least one of the PS-Poll dedicated RAW and the additional RAW.

In a $2^{nd}$ technical aspect of the present invention, provided herein is a method of performing a channel access, which is supported by an AP (access point) in a wireless communication system, including the steps of transmitting a beacon frame containing a TIM (traffic indication map) and receiving a PS-Poll (Power Save-Poll) frame from a paged STA receiving an indication of a presence of a buffered traffic the TIM, wherein the PS-Poll frame is received during at least one of a PS-Poll dedicated RAW (restricted access window) assigned to receive the PS-Poll frame and an additional RAW additionally assigned behind the PS-Poll dedicated RAW.

The PS-Poll dedicated RAW may be a sum of a PS-Poll interval for transmitting the PS-Poll frame per the paged STA.

The AP may receive the PS-Poll during the additional RAW from at least one STA failing in transmitting the PS-Poll frame successfully in its own PS-Poll interval among the pated STAs.

The AP may transmit a UTA (UL transmission allowance) frame indicating that the channel access of the STA is allowed during the additional RAW. In doing so, the UTA frame may be transmitted while a channel is idle over a prescribed time during the additional RAW.

The UTA frame may be transmitted to the paged STA by unicast or multicast. For another instance, the UTA frame may be transmitted by broadcast.

A transmission priority of the PS-Poll frame may be set higher than that of an audio traffic during at least one of the PS-Poll dedicated RAW and the additional RAW. For another instance, a transmission priority of the PS-Poll frame may be set equivalent to that of an audio traffic during at least one of the PS-Poll dedicated RAW and the additional RAW.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 13 is a diagram to describe a hidden node and an exposed node.

FIG. 14 is a diagram to describe RTS and CTS.

FIGS. 17 to 19 are diagrams to describe operations of an STA having received TIM in detail.

FIG. 20 is a diagram for one example of TIM element format.

FIG. 21 shows one example of U-APSD coexistence element format.

FIGS. 43 to 46 are diagrams to describe a channel access type indicating method according to an embodiment of the present invention.

FIGS. 47 to 50 are diagrams to describe a channel access type indicating method in case of a plurality of enhanced channel access types according to an embodiment of the present invention.

FIG. 59 is a diagram for one example of NDP UTA frame format.

MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

The General of System

Figure 1:
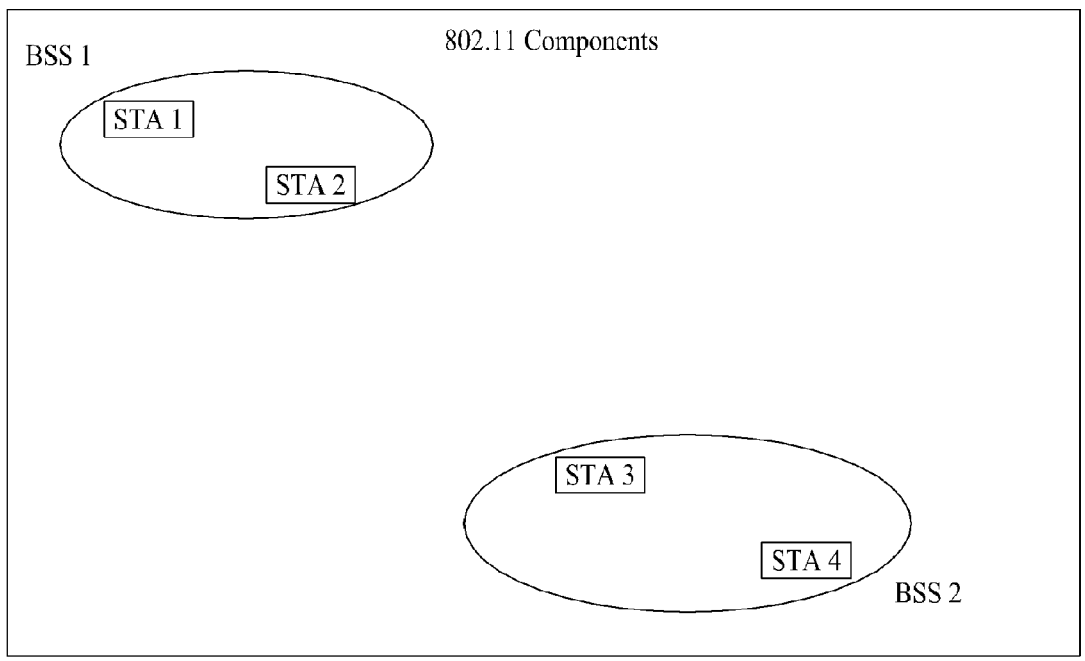
FIG. 1 is a diagram for one example of a structure of IEEE 802.11 system to which the present invention is applicable.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
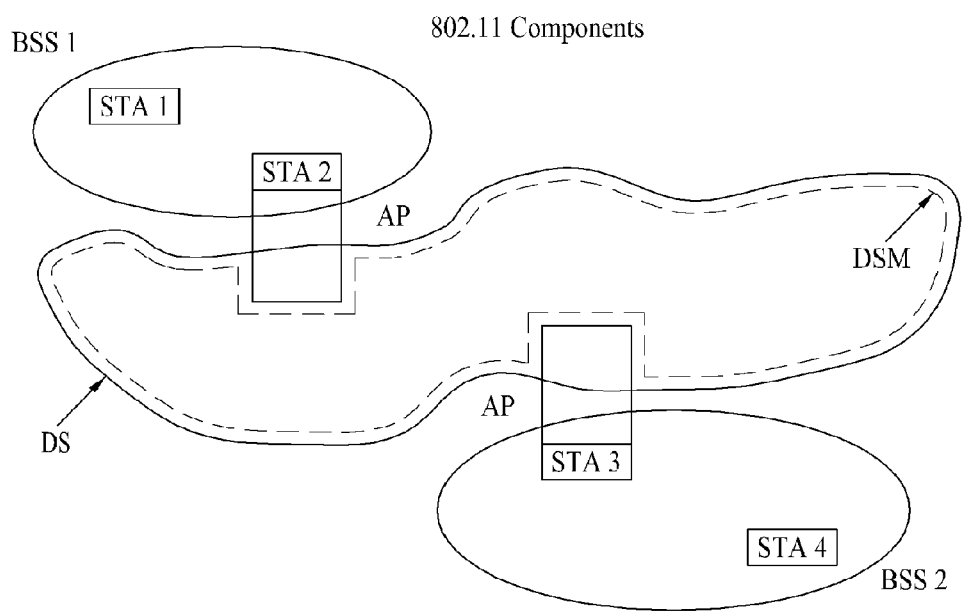
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DSM), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
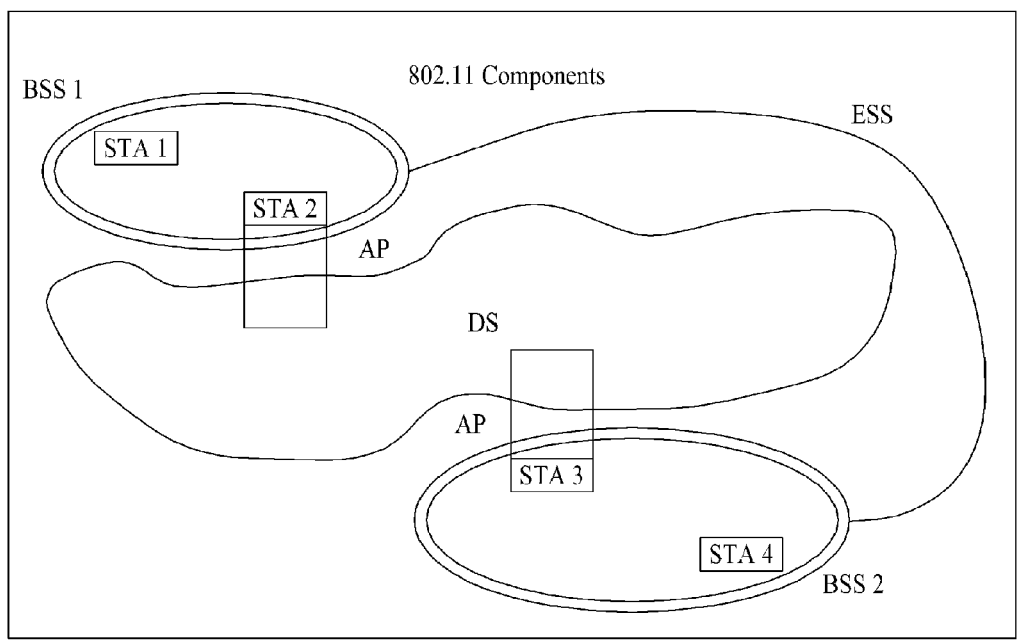
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two different access and security policies are necessary at the same location, and the like.

Figure 4:
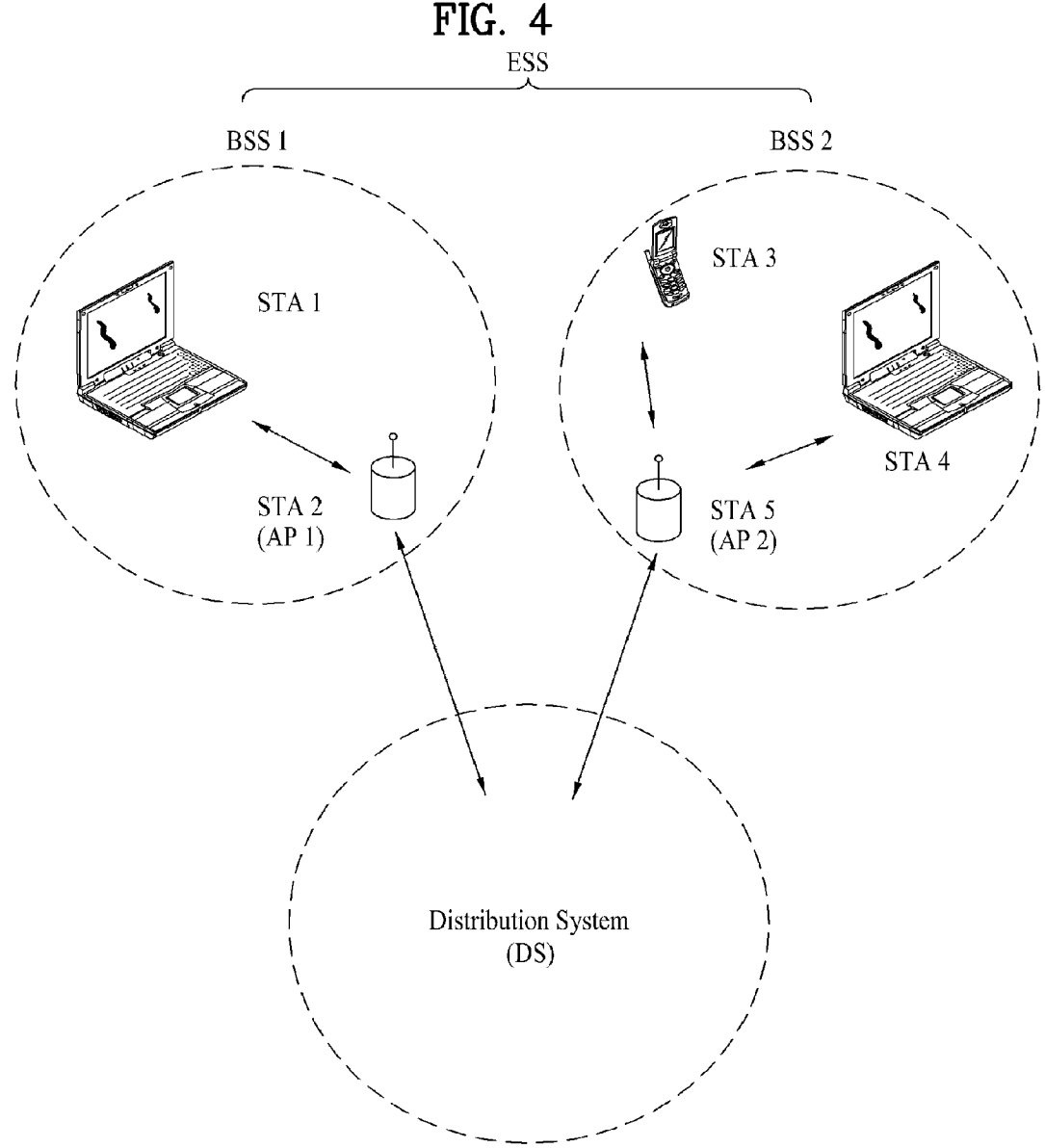
FIG. 4 is a diagram for one example of a structure of WLAN system.

FIG. 4 is a diagram for one example of a structure of WLAN system. In particular, FIG. 4 shows one example of BSS in DS-included infrastructure.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to one of a Base Station (BS), a Node-B, an evolved Node-B (eNB), a Base Transceiver System (BTS), a Femto BS and the like in other wireless communication fields.

Figure 5:
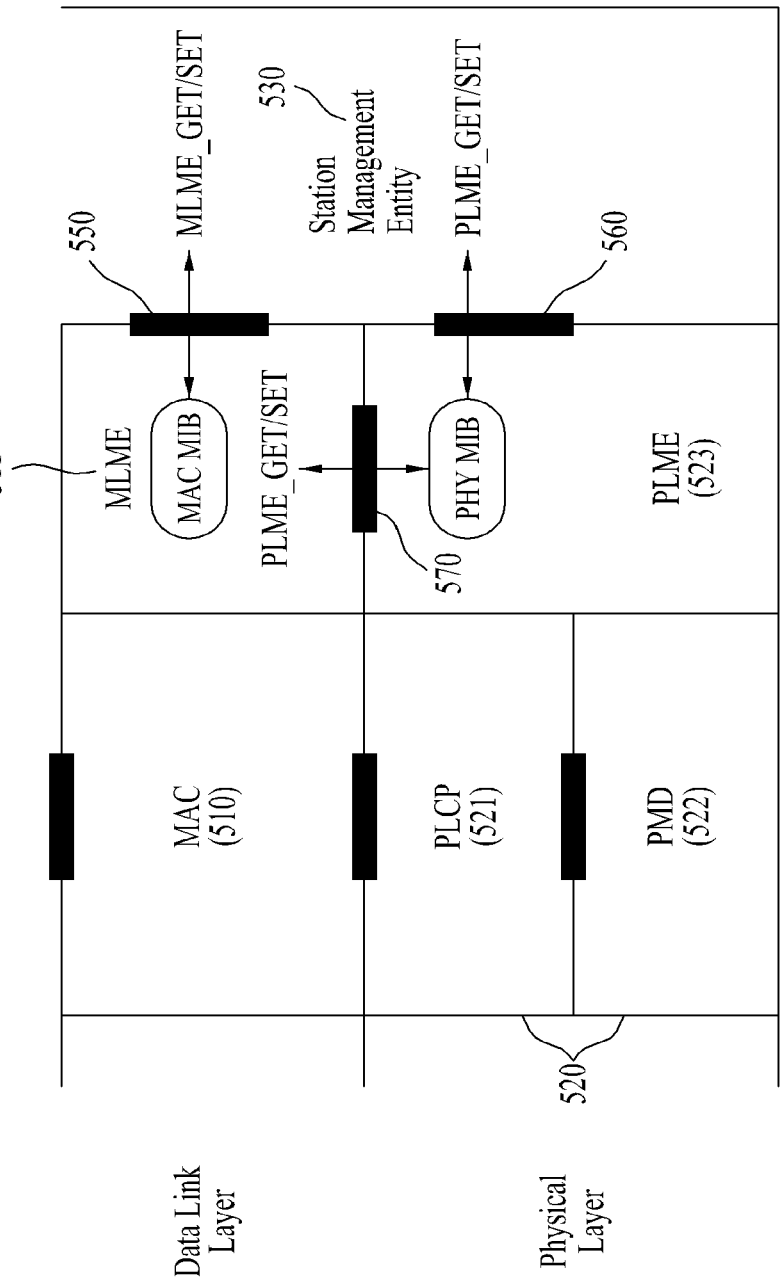
FIG. 5 is a diagram for one example of the structure of a data link layer and a physical layer on IEEE 802.11 system to which the present invention is applicable.

FIG. 5 is a diagram for one example of the structure of a data link layer and a physical layer on IEEE 802.11 system to which the present invention is applicable.

Referring to FIG. 5, a physical layer 520 can include a PLCP entity (Physical Layer Convergence Procedure Entity) 521 and a PMD entity (Physical Medium Dependent Entity) 522. The PLCP entity 521 plays a role in connecting a MAC sublayer 510 and a data frame to each other. The PMD entity 522 plays a role in transceiving data with at least two STAs by wireless using OFDM.

Both of the MAC sublayer 510 and the physical layer 520 can include conceptional management entities that can be named MLME (MAC Sublayer Management Entity) 511 and PLME (Physical Layer Management Entity) 523, respectively. These entities 511 and 521 provide a layer management service interface through an operation of a layer management function.

In order to provide an accurate MAC operation, SME (Station Management Entity) 530 may exist in each user equipment. The SME 530 is a management entity independent from each layer and collects layer based state information from various layer management entities or sets values of specific parameters of the respective layers. The SME 530 can perform such a function instead of general system management entities and can implement a standard management protocol.

The above-mentioned various entities can mutually interact with each other in various ways. In the example shown in FIG. 5, a GET/SET primitive is exchanged. A primitive XX-GET.request is used to request a value of MIB attribute (management information base attribute. If a state is 'SUCCESS', a primitive XX-GET.confirm returns a value of the corresponding MIB attribute. In other cases, an error indication is marked on a state field and then returned. A primitive XX-SET.request is used to make a request for setting a designated attribute as a given value. If the MIB attribute means a specific operation, this request makes a request for executing the corresponding specific operation. If a state is 'SUCCESS', a primitive XX-SET.confirm means that the designated MIB attribute is set to the requested value. In other cases, a state field indicates an erroneous situation. If this MIB attribute means a specific operation, the corresponding primitive can confirm that the corresponding operation has been performed.

Referring to FIG. 5, the MLME 511 & the SME 530 and the PLME 523 & the SME 530 can exchange various primitives through MLME_SAP (MLME_Service Access Point) 550 and PLME_SAP (PLME_Service Access Point) 560, respectively. And, the MLME 511 and the PLME 523 can exchange primitives through MLME-PLME_SAP (MLME-PLME_Service Access Point) 570.

Link Setup Process

Figure 6:
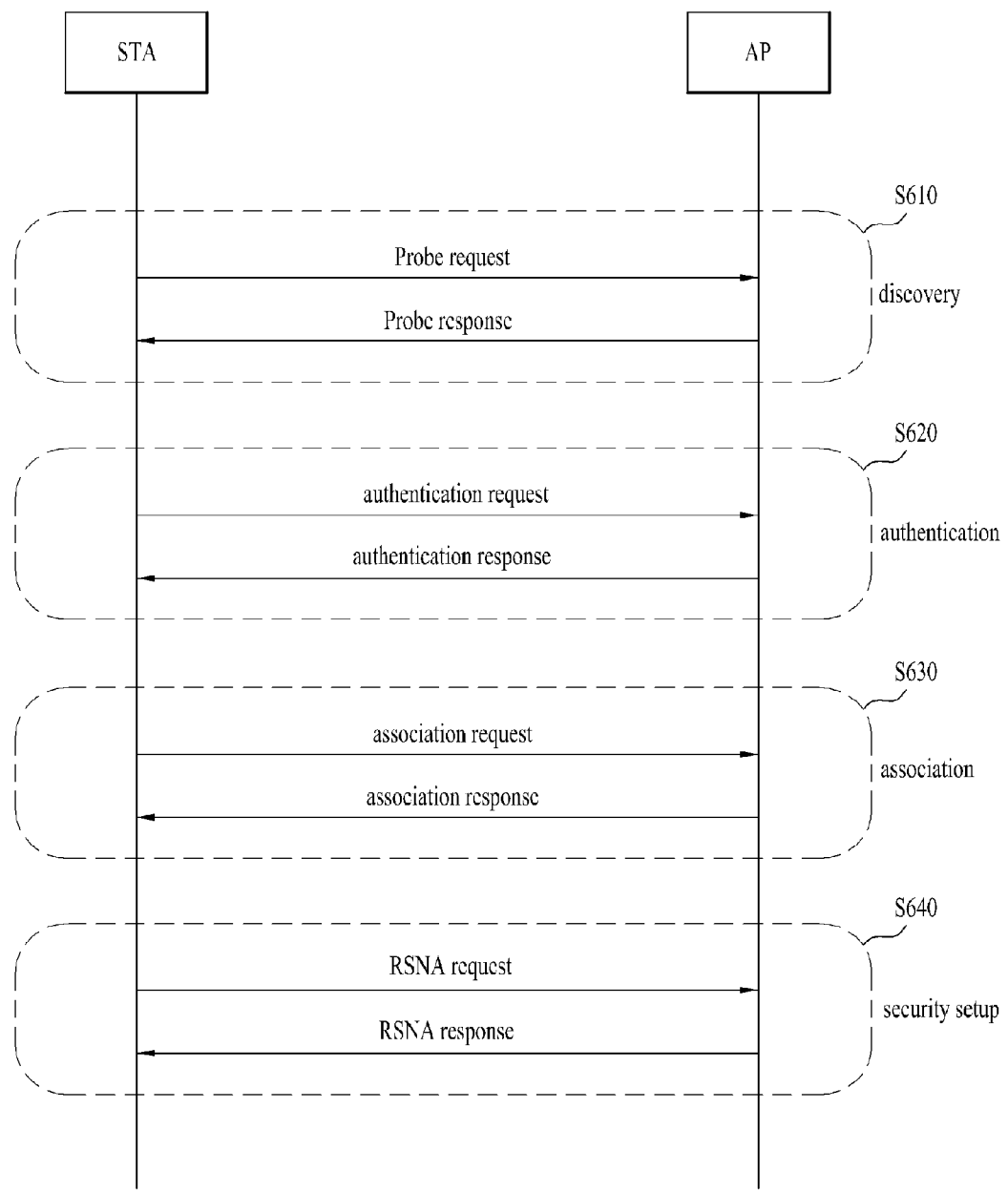
FIG. 6 is a diagram to describe a general link setup process in a WLAN system to which the present invention is applicable.

FIG. 6 is a diagram to describe a general link setup process in a WLAN system to which the present invention is applicable.

In order for an STA to transceive data by setting up a link with a network, the STA should discover a network, perform authentication, establish association, perform an authentication procedure for security, and the like. A link setup process can be named a session initiation process or a session setup process. And, the discovery, authentication, association and security setup steps of the link setup process can be commonly named an association process.

One example of a link setup process is described with reference to FIG. 6 as follows.

In a step S610, an STA can perform a network discovery action. The network discovery action can include a scanning action of the STA. In particular, in order to access the network, the STA should discover a joinable network. The STA needs to identify a compatible network before joining a wireless network. In doing so, a process for identifying a network existing in a specific area is called a scanning.

The scanning can be categorized into an active scanning or a passive scanning.

FIG. 6 shows a network discovery action including an active scanning process. In the active scanning, an STA performing a scanning transmits a probe request frame for searching what kind of AP exists nearby while switching channels and then waits for a response to the transmitted probe request frame. A responder transmits a probe response frame in response to the probe request frame to the STA having transmitted the probe request frame. In this case, the responder may include an STA having transmitted a beacon frame last in a BSS of a scanned channel. In the BSS, since an AP transmits the beacon frame, the AP becomes the responder. In IBSS, since each of STAs within the IBSS transmits the beacon frame in turn, the responder is not fixed. For instance, if an STA transmits a probe request frame on channel #1 and then receives a probe response frame on the channel #1, the STA saves BBS related information contained in the received probe response frame and is then able to perform a scanning in the same manner by switching to a next channel (e.g., channel #2) [i.e., transmission of a probe request on channel #2 and reception of a probe response on channel #2].

The scanning action may be performed by the passive scanning scheme [not shown in FIG. 6]. In the passive scanning, an STA performing the scanning waits for a beacon frame while switching channels. The beacon frame is one of management frames in IEEE 802.11 and is periodically transmitted in order to announce an existence of a wireless network and to enable an STA performing a scanning to discover and join the corresponding wireless network. In a BSS, an AP plays a role in transmitting a beacon frame periodically. In an IBSS, each of STAs within the IBSS transmits a beacon frame in turn. If an STA performing a scanning receives a beacon frame, the corresponding STA saves an information on a BSS included in the beacon frame and then records a beacon frame information on each channel while switching to another channel Having received the beacon frame, the STA saves a BSS related information contained in the received beacon frame and is then able to perform a scanning on a next channel by switching to the next channel.

Comparing an active scanning and a passive canning to each other, the active scanning is more advantageous than the passive scanning in delay and power consumption.

After the STA has discovered the network, an authentication process can be performed in a step S620. This authentication process can be named a first authentication process to be clearly discriminated from a security setup action in a step S640 described later.

The authentication process includes a following process. First of all, the STA transmits an authentication request frame to the AP. Secondly, the AP transmits an authentication response frame to the STA in response to the authentication request frame. The authentication frame used for the authentication request/response corresponds to a management frame.

The authentication frame can contain informations on an authentication algorithm number, an authentication transaction sequence number, a status code, a challenge text, an RSN (robust security network), a finite cyclic group, and the like. These informations correspond to some example of informations containable in the authentication request/response frame, can be substituted with other information, and may further include additional informations.

The STA can transmit an authentication request frame to the AP. Based on the information contained in the received authentication request frame, the AP can determine whether to allow the authentication of the corresponding STA. The AP is able to provide a result of the authentication processing to the STA through an authentication response frame.

After the STA has been successfully authenticated, an association process can be performed in a step S630. The association process includes a following process. First of all, the STA transmits an association request frame to the AP. Secondly, the AP transmits an association response frame to the STA in response to the association request frame.

For instance, the association request frame can include informations related to various capabilities, e.g., informations on a beacon listen interval, a service set identifier (SSID), supported rates, supported channels, an RSN, a mobility domain, supported operating classes, a TIM (traffic indication map) broadcast request, an interworking service capability and the like.

For instance, the association response frame can include informations related to various capabilities, e.g., informations on a status code, an AID (association ID), supported rates, an EDCA (enhanced distributed channel access) parameter set, an RCPI (received channel power indicator), an RSNI (received signal to noise indicator), a mobility domain, a timeout interval (association comeback time), an overlapping BSS scan parameter, a TIM broadcast response, a QoS (quality of service) map and the like.

These informations correspond to some example of informations containable in the authentication request/response frame, can be substituted with other information, and may further include additional informations.

After the STA has been successfully associated with the network, a security setup process can be performed in a step S640. The security setup process in the step S640 may be called an authentication process through RSNA (robust security network association) request/response. The authentication process of the step S620 may be named a first authentication process, while the security setup process of the step S640 may be simply named an authentication process.

The security setup process of the step S640 can include a private key setup process by 4-way handshaking through EAPOL (extensible authentication protocol over LAN) for example. And, the security setup process can be performed by a security scheme that is not defined in IEEE 802.11 Standard.

Evolution of WLAN

IEEE 802.11n exists as a technology standard stipulated relatively recently in order to overcome the limits put on a communication speed in a wireless LAN. The objects of IEEE 802.11n are to increase a speed and reliability of a network and to extend an operating distance of a wireless network. In particular, IEEE 802.11n supports high throughput (HT) of which data processing speed is equal to or greater than maximum 540 Mbps. In order to minimize transmission error and optimize a data speed or rate, IEEE 802.11n is based on MIMO (multiple inputs and multiple outputs) technology that uses multiple antennas for a transmitting unit end and a receiving end unit both.

As WLAN is supplied widely and actively and applications using WLAN are diversified, the necessity for a new WLAN system to support a throughput higher than a data processing speed supported by IEEE 802.11n is increasingly rising. A next generation WLAN system supportive of VHT (very high throughput) is a next version (e.g., IEEE 802.11ac) of IEEE 802.11n WLAN system and corresponds to one of IEEE 802.11 WLAN systems proposed recently and newly to support a data processing sped over 1 Gbps at a MAC service access point (SAP).

A next WLAN system supports a transmission of MU-MIMO (multi user multiple input multiple output) for enabling a plurality of STAs to access a channel simultaneously in order to efficiently use wireless channels. According to MU-MIMO transmission scheme, an AP is able to simultaneously transmit a packet to at least one or more MIMO-paired STAs. And, there has been much discussion about supporting a WLAN system operation on a whitespace. For instance, the introduction of a WLAN system on a TV whitespace (ES) such as a frequency band (e.g., 54~698 MHz band) in idle state due to the digitalization of analog TV has been discussed as IEEE 802.11af Standard. Yet, this is just one example. The whitespace can be regarded as a licensed band that can be incumbently used by a licensed user. In this case, the licensed user means a user that is licensed to use a licensed band. And, the licensed user can be called one of a licensed device, a primary user, an incumbent user and the like.

For instance, an AP and/or STA operation on WS should provide a protection function for a licensed user. For instance, in case that a licensed user such as a microphone is already using a specific WS channel corresponding to a frequency band divided on regulation to have a specific bandwidth on a WS band, an AP and/or STA is unable to use the frequency band amounting to the corresponding WS channel to protect the licensed user. If a licensed user uses a frequency band currently used for a current frame transmission and/or reception, an AP and/or STA should stop using the corresponding frequency band.

Hence, the AP and/or STA should precedently perform a procedure for checking whether a use of a specific frequency band within a WS band is available, i.e., whether a licensed user exists on the frequency band. Checking whether the licensed user exists on the specific frequency band is called a spectrum sensing. As a spectrum sensing mechanism, one of energy detection, signature detection and the like is utilized. If a strength of a received signal is equal to or greater than a predetermined value, it is able to determine that the licensed user currently uses the specific frequency band. If a DTV preamble is detected, it is able to determine that the licensed user currently uses the specific frequency band.

M2M (machine-to-machine) communication technology is currently discussed as a next generation communication technology. In IEEE 802.11 WLAN system, a technology standard for supporting M2M communication is developed as IEEE 802.11ah. The M2M communication means a communication system that includes at least one machine and may be called MTC (machine type communication) or the like. In this case, 'machine' means an entity that does not require direct human manipulation or intervention. For instance, a device such as a wireless communication module installed meter and a wireless communication module installed auto vending machine may correspond to one example of a machine as well as a user device such as a smartphone that can perform a communication by automatically accessing a network without user's manipulation/intervention. The M2M communication can include one of a communication between devices (e.g., a D2D (device-to-device) communication), a communication between a device and a server (e.g., an application server), and the like. As one example of the device-to-server communication, there is a communication between an auto vending machine and a server, a communication between a POS (point of sale) device and a server, a communication between an electricity/gas/water meter and a server, or the like. Besides, M2M communication based applications can include security, transportation, health case and the like. Considering the properties of the application examples, M2M communication should be generally able to support transmission/reception of a small amount of data occasionally in an environment in which many devices exist.

In particular, M2M communication should be able to support a large number of STAs. Although a currently defined WLAN system assumes a case that maximum 207 STAs are associated with a single AP, methods for supporting a case that a number of STAs more than 2007 STAs are associated with a single AP are currently discussed in M2M communication. Moreover, in M2M communication, it is estimated that there will be many applications that support/require a low transmission speed. In order to support this smoothly, for instance, in WLAN system, an STA is able to recognize a presence or non-presence of data, which is to be transmitted to the STA, based on TIM (traffic indication map) element. And, methods for reducing a bitmap size of TIM are currently discussed. Moreover, in M2M communication, it is estimated that there will be many traffics that have a considerably long transmission/reception interval. For instance, like an electricity/gas/water used amount, it is required to transceive a considerably small amount of data in each long periodicity (e.g., 1 month, etc.). Hence, although the number of STAs associable with a single AP increases highly, methods for efficiently supporting a case that the number of STAs having a data frame supposed to be received from an AP in a single beacon periodicity is considerably small are currently discussed.

Thus, the WLAN technology is evolving fast and technologies for a direct link setup, an enhancement of media streaming performance, support of a fast and/or large-scale initial session setup, support of an extended bandwidth and operating frequency, and the like are currently developed.

Frame Structure

Figure 7:
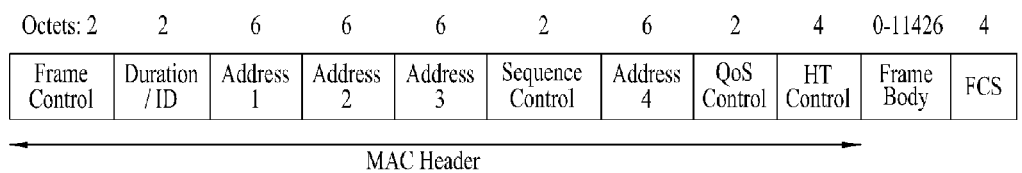
FIG. 7 shows one example of a MAC frame format of IEEE 802.11 system to which the present invention is applicable.

FIG. 7 shows one example of a MAC frame format of IEEE 802.11 system to which the present invention is applicable.

Referring to FIG. 7, a MAC frame format includes a MAC header (MHR), a MAC payload and a MAC footer (MFR). The MHR is defined as a region including a frame control field, a duration/identifier (duration/ID) field, an address 1 field, an address 2 field, an address 3 field, a sequence control field, an address 4 field, a QoS control field, and an HT control field. A frame body field is defined as a MAC payload. Data desired to be transmitted by an upper layer is located in the frame body field. And, the frame body field has a variable size. A frame check sequence (FCS) field is defined as a MAC footer and is used for an error search of a MAC frame.

The first 3 fields (i.e., the frame control field, the duration/ID field, and the address 1 field) configure a minimum frame format and exist in all frames. And, other fields can exist in a specific frame type only.

Informations included in the respective fields mentioned in the above description can follow the definition of IEEE 802.11 system. The respective fields mentioned in the foregoing description correspond to examples of the fields that can be included in the MAC frame, may be substituted with other fields, or may further include additional fields.

Figure 8:
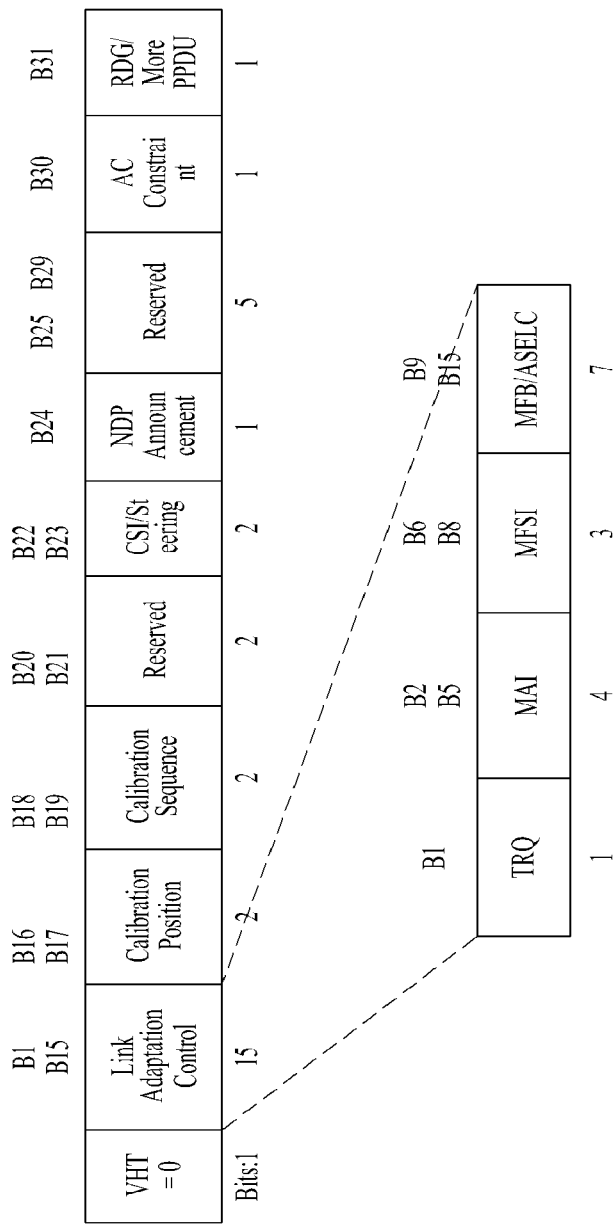
FIG. 8 shows one example of HT format of HT Control field in MAC frame according to FIG. 7.

FIG. 8 shows one example of HT format of the HT control field in the MAC frame according to FIG. 7.

Referring to FIG. 8, the HT control field may include a VHT subfield, a link adaptation subfield, a calibration position subfield, a calibration sequence subfield, a CSI/Steering (channel state information/steering) subfield, an NDP (null data packet) announcement subfield, an AC (access category) constraint subfield, an RDG/More PPDU (reverse direction grant/More PPDU) subfield, a reserved subfield, and the like.

The link adaption subfield can include a TRQ (training request) subfield, an MAI [MCS (modulation and coding scheme) request or ASEL (antenna selection) indication] subfield, an MFSI (MCS feedback sequence identifier) subfield, an MFB/ASELC (MCS feedback and antenna selection command/data) subfield, and the like.

If a request for a sounding PPDU transmission is made to a responder, the TRQ subfield is set to 1. If a request for a sounding PPDU transmission is not made to a responder, the TRQ subfield is set to 0. If the MAI subfield is set to 14, it means an antenna selection (ASEL) indication and the MFB/ASELC subfield is interpreted as antenna selection command/data. Otherwise, the MAI subfield indicates an MCS request and the MFB/ASELC subfield is interpreted as an MCS feedback. When the MAI subfield indicates an MCS request (MRQ), if any MCS feedback is not requested, the MAI subfield is set to 0. If the MCS feedback is requested, the MAI subfield is set to 1. The sounding PPDU means PPDU that carries a training symbol usable for channel estimation.

The respective subfields mentioned in the above description correspond to examples of the subfields that can be included in the HT control field, may be substituted with other subfields, or may further include additional subfields.

Figure 9:
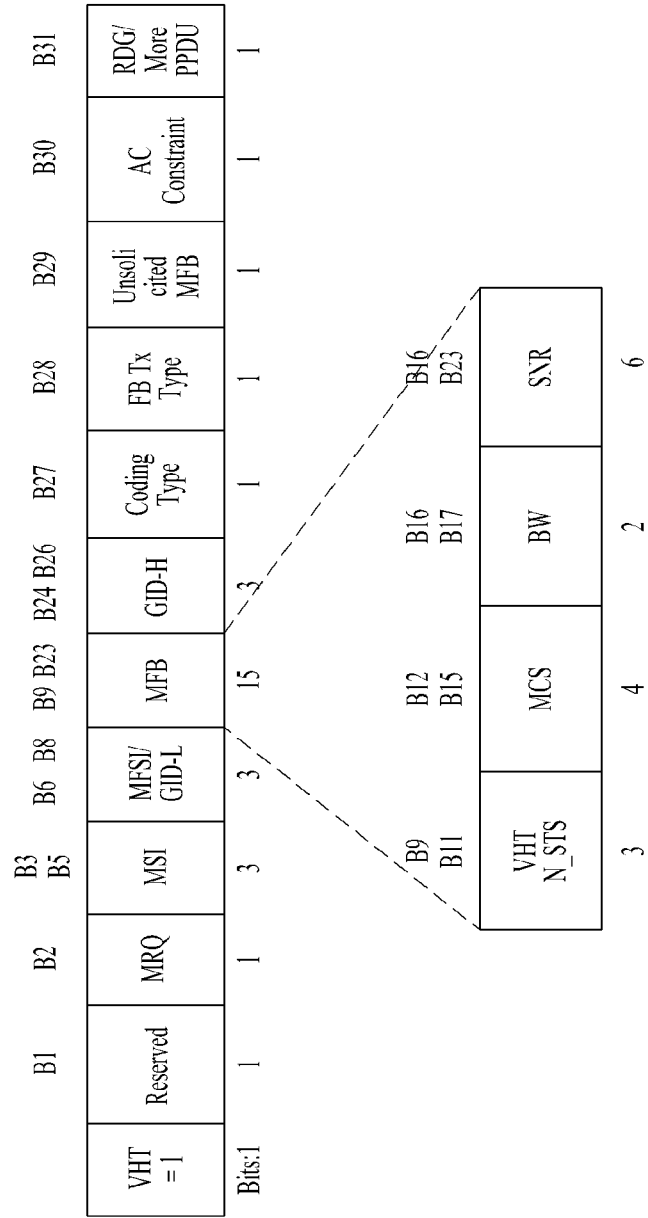
FIG. 9 shows one example of VHT format of HT Control field in MAC frame according to FIG. 7.

FIG. 9 shows one example of VHT format of the HT control field in the MAC frame according to FIG. 7.

Referring to FIG. 9, the HT control field may include a VHT subfield, an MRQ subfield, an MSI subfield, an MCS feedback sequence indication/group ID least significant bit (MFSI/GID-L (LSB of Group ID)) subfield, an MFB subfield, a group ID most significant bit (GID-H (MSB of Group ID)) subfield, a coding type subfield, an MFC response transmission type (FB Tx Type: Transmission type of MFB response) subfield, an unsolicited MFB subfield, an AC constraint subfield, an RDG/More PPDU subfield, and the like. And, the MFB subfield may include a VHT N_STS (Number of space time streams) subfield, an MCS subfield, a BW (bandwidth) subfield, an SNR (Signal to Noise Ratio) subfield, and the like.

Table 1 shows descriptions of the respective subfields in the VHT format of the HT control field.

TABLE 1

| Subfield | Meanings | Definitions |
| --- | --- | --- |
| MRQ | MCS request | This is set to 1 if an MCS feedback (solicited MFB) is requested. Otherwise, this is set to 0. |
| MSI | MRQ sequence identifier | If MRQ subfield is set to 1, MSI subfield includes a sequence number ranging from 0 to 6. If MRQ subfield is set to 0, MSI subfield is reserved. |
| MFSI/GID-L | MFB sequence identifier/LSB of Group ID | Of unsolicited) MFB subfield is set to 0, MFSI/GID-L subfield includes a reception value of MSI included in the frame indicated by MFB information. If unsolicited MFB subfield is set to 1, MFSI/GID-L subfield includes 3 LSBs of group ID of PPDU indicated by unsolicited MFB. |
| MFB | VHT N_STS, MCS, BW, SNR feedback | MFB subfield indicates recommended MF. If MCS = 15 and VHT N_STS = 7, it indicates that no feedback exists. |
| GID-H | MSB of Group ID | If unsolicited MFB subfield is set to 1, GID-H subfield includes 3 MSBs of group ID of PPDU indicated by unsolicited MFB. |
| Coding Type | Coding type of MFB response | If unsolicited MFB subfield is set to 1, coding type subfield includes coding information (e.g., 1 in case of BCC (binary convolutional code), 0 in case of LDPC (low-density parity check). Otherwise, this subfield is reserved. |
| FB Tx Type | Transmission type of MFB response | If unsolicited MFB subfield is set to 1 and FB Tx Type subfield is set to 0, unsolicited MFB indicates one of a transmit diversity using unbeamformed VHT PPDU and a transmit diversity using STBC (space-time block coding) VHT PPDU. If unsolicited MFB subfield is set to 1 and FB Tx Type subfield is set to 1, unsolicited MFB indicates beamformed SU-MIMO (Single User MIMO) VHT PPDU๕. Otherwise, this subfield is reserved. |
| Unsolicited MFB | Unsolicited MCS feedback indicator | If MFB is not a response to MRQ, this subfield is set to 1. If MFB is a response to MRQ, this subfield is set to 0. |
| AC Constraint | | If a response to a reverse direction grant (RDG) includes a data frame from a prescribed TID (traffic identifier), this subfield is set to 0. If a response to a reverse direction grant (RDG) includes a frame from the same AC of a last data frame received from a same reverse direction (RD) initiator), this subfield is set to 1. |

TABLE 1-continued

| Subfield | Meanings | Definitions |
| --- | --- | --- |
| RDG/More PPDU | | If RDG/More PPDU subfield is set to 0, it indicates that there is no reverse direction grant (RDG) in case of a transmission from a reverse direction (RD) initiator or that PPDU carrying MAC frame is a final transmission in case of a transmission from a reverse direction (RD) responder. If RDG/More PPDU subfield is set to 1, it indicates that a reverse direction grant (RDG) exists in case of a transmission from a reverse direction (RD) initiator or that PPDU carrying a MAC frame is followed by another PPDU in case of a transmission from a responder. |

The respective subfields mentioned in the above description correspond to examples of the subfields that can be included in the HT control field, may be substituted with other subfields, or may further include additional subfields.

Meanwhile, a MAC sublayer delivers a MAC protocol data unit (MPDU) to a physical layer as a physical (PHY) service data unit (PSDU). A PLCP entity generates PLCP protocol data unit (PPDU) by attaching a physical (PHY) header and a preamble to the received PSDU.

Figure 10:
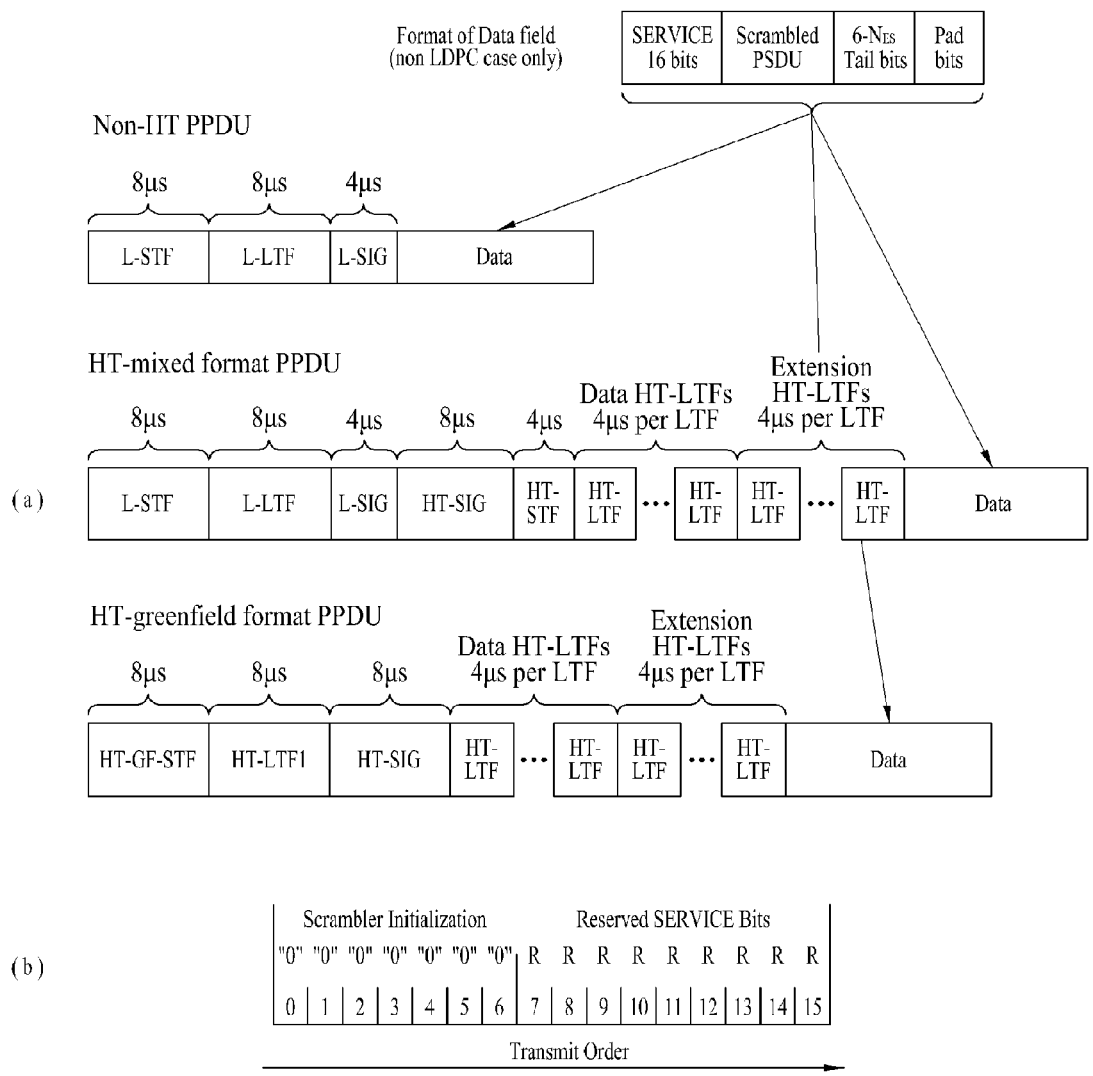
FIG. 10 shows one example of PPDU frame format of IEEE 802.11n system to which the present invention is applicable.

FIG. 10 shows one example of PPDU frame format of IEEE 802.11n system to which the present invention is applicable.

FIG. 10 (a) shows one example of PPDU frames according to a non-HT format, an HT mixed format and an HT-greenfield format.

The non-HT format indicates a frame format for an existing legacy system (IEEE 802.11 a/g) STA. The non-HT format PPDU includes a legacy format preamble consisting of L-STF (Legacy-Short Training field), L-LTF (Legacy-Long Training field) and L-SIG (Legacy-Signal) field.

The HT mixed format allows a communication of an existing legacy system STA and also indicates a frame format for IEEE 802.11n STA. The HT mixed format PPDU includes a legacy format preamble consisting of L-STF, L-LTF and L-SIG and an HT format preamble consisting of HT-STF (HT-Short Training field), HT-LTF (HT-Long Training field) and HT-SIG (HT-Signal) field. Since the L-STF, L-LTF and L-SIG mean the legacy fields for backward compatibility), a configuration from L-STF to L-SIG is identical to that of the non-HT format. And, an STA is able to recognize the mixed format PPDU using a following HT-SIG field.

The HT-Greenfield format is not compatible with an existing legacy system and indicates a frame format for IEEE 802.11n ST. The HT-Greenfield format PPDU includes a greenfield preamble consisting of HT-GF-STF (HT-Greenfield-STF), HT-LTF1, HT-SIG and at least one HT-LTF.

The data field includes a SERVICE field, PSDU, tail bit, and pad bit. All bots of the data field are scrambled.

FIG. 10 (b) shows a service field included in the data field. The service field retains 16 bits. The bits are numbered by 0 to 15. And, the bits are sequentially transmitted by starting with the bit #0. The bits #0 to #6 are set to 0 and used to synchronize a descrambler within a receiving end.

Figure 11:
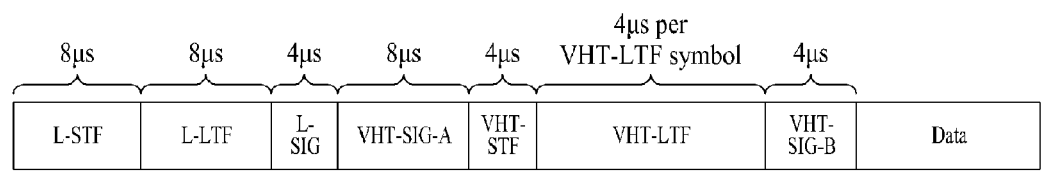
FIG. 11 shows one example of VHT PPDU frame format of IEEE 802.11ac system to which the present invention is applicable.

FIG. 11 shows one example of VHT PPDU frame format of IEEE 802.11ac system to which the present invention is applicable.

Referring to FIG. 11, VHT format PPDU includes a legacy format preamble consisting of L-STF, L-LTF and L-SIG and a VHT format preamble consisting of VHT-SIG-A, HT-STF and HT-LTFs before a data field. Since the L-STF, L-LTF and L-SIG mean the legacy fields for backward compatibility, a configuration from the L-STF to the L-SIG is identical to that of the non-HT format and an STA is able to recognize the VHT format PPDU using a following VHT-SIG field.

The L-STF is the field for frame detection, AGC (Auto Gain Control), diversity detection, coarse frequency/time synchronization, and the like. The L-LTF is the field for fine frequency/time synchronization, channel estimation and the like. The L-SIG is the field for legacy control information transmission. The VHT-SIG-A is the VHT field for common control information transmission of VHT STAs. The VHT-STF is the field for AGC for MIMO and a beamformed stream. The VHT-LTFs is the field for channel estimation for MIMO and a beamformed stream. And, the VHT-SIG-B is the field for transmitting a control information specified for each STA.

Medium Access Mechanism

In WLAN system according to IEEE 802.11, a basic access mechanism of MAC (medium access control) is a CSMA/CA (carrier sense multiple access with collision avoidance) mechanism. The CSMA/CA mechanism may be called DCF (distributed coordination function) of IEEE 802.11 MAC and basically employees an access mechanism 'listen before talk'. According to an access mechanism of such a type, before initiating a transmission, an AP and/or STA can perform CCA (clear channel assessment) for sensing a radio channel or medium during a prescribed time interval (e.g., DIFS (DCF inter-frame space). As a result of the sensing, if it is determined that a medium is in idle status, the AP and/or STA starts a frame transmission through a corresponding medium. On the contrary, if it is detected that a medium is in occupied status, the corresponding AP and/or STA sets up a delay interval (e.g., a random backoff period) for a medium access instead of starting its own transmission, stands by, and is then able to attempt a frame transmission. Since several STAs are expected to attempt frame transmission after standbys for different times owing to the application of the random backoff period, it is able to minimize collision.

IEEE 802.11 MAC protocol provides HCF (hybrid coordination function). The HCF is based on the DCF and PCF (point coordination function). The PCF corresponds to a polling-based synchronous access scheme and means a scheme of performing polling periodically in order for all receiving APs and/or STAs to receive data frame. The HCF has EDCA (enhanced distributed channel access) and HCCA (HCF controlled channel access). The EDCA uses a contention based access scheme for a provider to provide a data frame to multiple users. And, the HCCA uses a non-contention based channel access scheme using a polling mechanism. The HCF includes a medium access mechanism for improving QoS (quality of service) of WLAN and is able to transmit QoS data in both a contention period (CP) and a contention free period (CFP).

Figure 12:
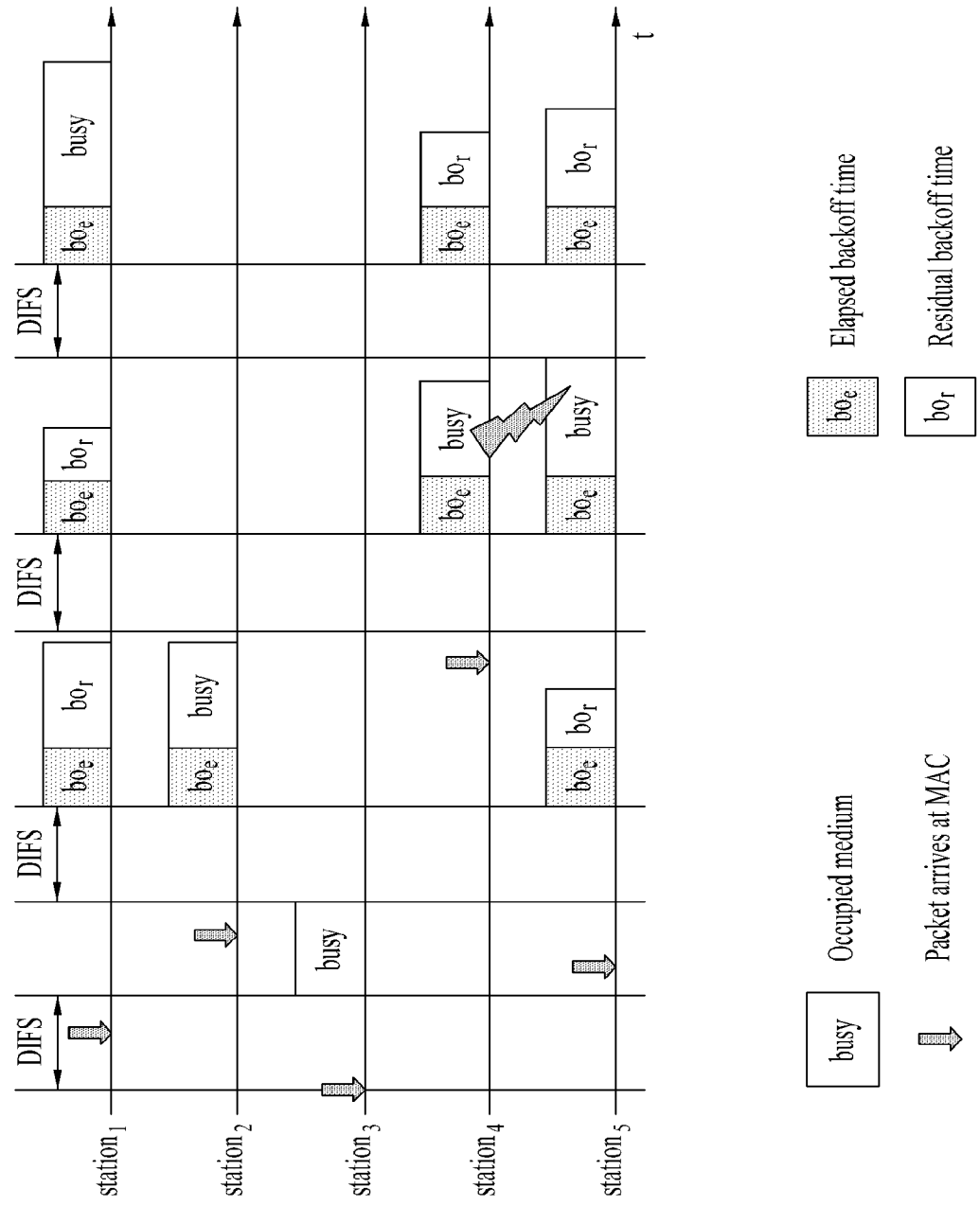
FIG. 12 is a diagram to describe a back-off process in a WLAN system to which the present invention is applicable.

FIG. 12 is a diagram to describe a backoff process in a WLAN system to which the present invention is applicable.

An operation based on a random backoff period is described with reference to FIG. 12 as follows.

First of all, if a medium in occupied or busy status enters an idle status, several STAs can attempt data (or frame) transmission. In doing so, according to a scheme of minimizing collision, each of the STAs selects a random backoff count, stands by in a slot time amounting to the selected random backoff count, and is then able to attempt the transmission. The random backoff count has a pseudo-random integer value and can be determined as 0 or one of values in a CW range. In this case, the CW is a contention window parameter value. CWmin is given as an initial value to the CW parameter. Yet, if the transmission fails [e.g., ACK for a transmitted frame is not received], the CW parameter can take a doubled value. If the CW parameter value becomes CWmax, the data transmission can be attempted by maintaining the CWmax value until the data transmission becomes successful. If the data transmission is successfully completed, the CW parameter value is rest to the CWmin value. Preferably, a value of each of the CW, CWmin and CWmax is set to $(2n-1)$, where n= 0, 1, 2 . . . .

If a random backoff process starts, the STA keeps monitoring a medium while a backoff slot is counted down according to the determined backoff count value. If the STA monitors that the medium is in a busy status, the STA waits by stopping the countdown. If the medium enters the idle status, the STA resumes the remaining countdown.

Figure 17:
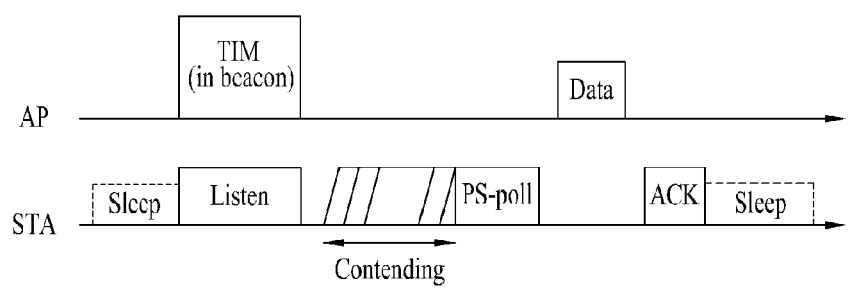

In the example shown in FIG. 12, in case that a packet to be transmitted arrives at the MAC of STA3, the STA3 confirms that the medium is in idle status and is then able to directly transmit a frame. Meanwhile, the rest of the STAs monitor that the medium is in busy status and stands by. In doing so, since data to be transmitted may be generated from each of STA1, STA2 and STA5, each of the STAs stands by for DIFS if monitoring that the medium is in idle status and is then able to count down a backoff slot according to a random backoff count value selected by itself. In the example shown in FIG. 17, the STA2 selects a smallest backoff count value and the STA1 selects a biggest backoff count value. In particular, FIG. 17 shows one example that a residual backoff time of the STA5 is shorter than that of the STA1 at the timing point at which the STA2 finishes the backoff count and starts a frame transmission. Each of the STA1 and the STA5 stops the countdown temporarily and stands by, while the STA2 occupies the medium. As the occupation by the STA2 is ended, if the medium enters the idle status again, each of the STA1 and the STA5 stands by for DIFS and then resumes the paused backoff count. In particular, the frame transmission can be started after the rest of backoff slots amounting to the residual backoff time have been counted down. Since the residual backoff time of the STA5 is shorter than that of the STA1, the STA5 starts the frame transmission. Meanwhile, while the STA2 occupies the medium, data can be generated from the STA4. In doing so, from the viewpoint of the STA4, if the medium enters an idle status, the STA4 stands by for DIFS, performs a countdown according to a random backoff count value selected by itself, and is then able to start a frame transmission. FIG. 12 shows one example of a case that a residual backoff time of the STA5 accidently coincides with a random backoff count value of the STA4. In this case, collision may occur between the STA4 and the STA5. In case that the collision occurs, each of the STA4 and the STA5 is unable to receive ACK and fails in the data transmission. In this case, each of the STA4 and the STA5 doubles a CW value, selects a random backoff count value, and is then able to perform a countdown. Meanwhile, the STA1 stands by while the medium is in the occupied (or busy) status due to the transmissions by the STA4 and the STA5. If the medium enters an idle status, the STA1 stands by for DIFS. If the residual backoff time elapses, the STA1 is able to start the frame transmission.

Sensing Operation of STA

As mentioned in the foregoing description, the CSMA/CA mechanism includes a virtual carrier sensing as well as a physical carrier sensing for an AP and/or STA to directly sense a medium. The virtual carrier sensing is provided to complement such a problem, which may be generated from a medium access, as a hidden node problem and the like. For the virtual carrier sensing, MAC of WLAN system is able to use a network allocation vector (NAV). The NAV is a value for an AP and/or STA currently using a medium or having an authority to use to indicate a time, which is left until a medium enters an available status, to another AP and/or STA. Hence, the value set as the NAV corresponds to a period scheduled for an AP and/or STA transmitting a corresponding frame to use a medium. If an STA receives the NAV value, the STA is prohibited from a medium access during the corresponding period. For instance, the NAV can be set according to a value of a duration field of a MAC header of a frame.

In order to reduce possibility of collision, a robust collision detecting mechanism has been introduced. This shall be described with reference to FIG. 18 and FIG. 19. Although a carrier sensing range and a carrier transmission range may not be actually identical to each other, assume that the two ranges are identical to each other for clarity of the following description.

FIG. 13 is a diagram to describe a hidden node and an exposed node.

FIG. 13 (a) shows one example of a hidden node, which corresponds to a case that STA C has an information to transmit in the course of a communication between STA A and STA B. In particular, despite a situation that the STA is transmitting an information to the STA B, the STA C can determine that a medium is in idle status when the STA C performs a carrier sensing before sending data to the STA B. The reason for this is that a transmission (i.e., a medium occupation) by the STA A may not be sensed at a location of the STA C. In this case, since the STA B receives both information of the STA A and information of the STA C simultaneously, a collision occurs. In doing so, the STA A can be called a hidden node of the STA C.

FIG. 13 (b) shows one example of an exposed node, which corresponds to a case that STA C has an information to transmit to STA D in a situation that STA B is transmitting data to STA A. In doing so, if the STA C performs a carrier sensing, it is able to determine that a medium is occupied due to the transmission by the STA B. Hence, although the STA C has the information to transmit to the STA D, since the medium occupied status is sensed, the STA C should stand by until the medium enters an idle status. Yet, since the STA A is actually located out of a transmission range of the STA C, the transmission from the STA C and the transmission from the STA B may not collide with each other from the viewpoint of the STA A, the STA C may stand by unnecessarily until the STA B stops the transmission. In doing so, the STA C can be called an exposed node of the STA B.

FIG. 14 is a diagram to describe RTS and CTS.

First of all, in order to efficiently use a collision avoidance mechanism in the exemplary situation shown in FIG. 13, it is able to use such a short signaling packet as RTS (request to send), CTS (clear to send) and the like. In order to enable neighbor STA(s) to overhear, RTS/CTS between two STAs can be set to enable the neighbor STA(s) to consider whether to perform an information transmission between the two STAs. For instance, if a data transmitting STA transmits an RTS frame to a data receiving STA, the data receiving STA is able to announce that it will receive data by transmitting a CTS frame to neighbor user equipments.

FIG. 14 (a) shows one example of a method of solving a hidden node problem, which assumes a case that both STA A and STA C intend to transmit data to STA B. if the STA A sends RTS to the STA B, the STA B transmits CTS to both of the STA A and the STA C neighboring to the STA B. As a result, the STA C stands by until the data transmission between the STA A and the STA B ends, whereby collision can be avoided.

FIG. 14 (b) shows one example of a method of solving an exposed node problem. As STA C overhears RTS/CTS transmission between STA A and STA B, the STA C can determine that collision will not occur despite that the STA C transmits data to another STA (e.g., STA D). In particular, the STA B transmits RTS to all neighbor user equipments and the STA A having data to send actually transmits CTS only. Since the STA C receives the RTS but fails in receiving the CTS of the STA A, the STA C can recognize that the STA A is out of a carrier sensing of the STA C.

IFS (Inter-Frame Space)

A time space between two frames is defined as IFS (inter-frame space). STA determines whether a channel is used for IFS through a carrier sensing. DCF MAC layer defines 4 kinds of inter-frame spaces (IFSs), by which a priority of occupying a radio medium is determined.

IFS is set to a specific value depending on a physical layer irrespective of a bit rate of STA. Types of IFS include SIFS (Short IFS), PIFS (PCF IFS), DIFS (DCF IFS), and EIFS (Extended IFS). SIFS (Short IFS) is used for a transmission of RTS/CTS and a transmission of ACK frame and has a top priority. PIFS (PCF IFS) is used for PCF frame transmission. DIFS (DCF IFS) is used for DCF frame transmission. EIFS (Extended IFS) is used for an occurrence of frame transmission error only and does not have a fixed interval.

Figure 15:
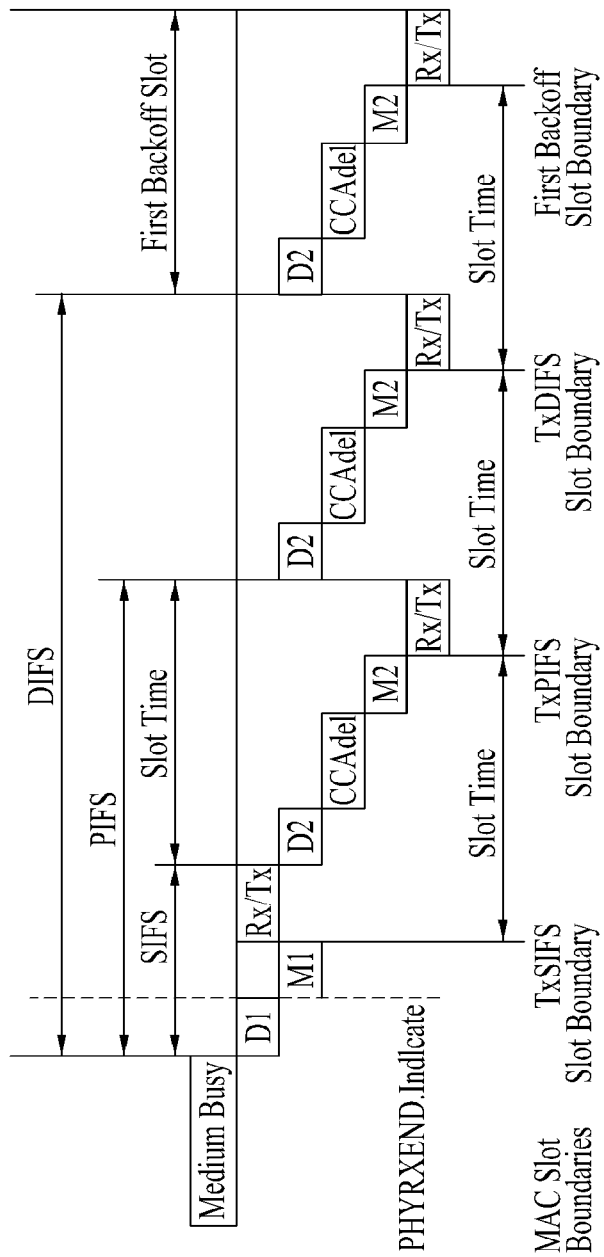
FIG. 15 is a diagram for one example of relation of IFS.

Relation between IFSs is defined as a time gap on a medium and related attributes are provided by a physical layer, as shown in FIG. 15.

FIG. 15 is a diagram for one example of relation of IFS.

In every medium timing, an end timing point of a last symbol of PPDU indicates a transmission end and a first symbol of a preamble of a next PPDU indicates a transmission start. Every MAC timing can be determined with reference to PHY-TXEND.confirm primitive, PHYTX-START.confirm primitive, PHY-RXSTART.indication primitive, and PHY-RXEND.indication primitive.

Referring to FIG. 15, SIFS time (aSIFSTime) and slot time (aSlotTime) can be determined per physical layer. The SIFS time has a fixed value and the slot time can be dynamically changed in accordance with a change of an air propagation time (aAirPropagationTime). The SIFS time and the slot time are defined as Formula 1 and Formula 2, respectively.

$$\text{aSIFSTime} = \text{aRxRFDelay} + \text{aRxPLCPDelay} + \text{aMACProcessingDelay} + \text{aRxTxTurnaroundTime} \quad \text{[Formula 1]}$$

$$\text{aSlotTime} = \text{aCCATime} + \text{aRxTxTurnaroundTime} + \text{aAirPropagationTime} + \text{aMACProcessingDelay} \quad \text{[Formula 2]}$$

PIFS and SIFS are defined as Formula 3 and Formula 4, respectively.

$$\text{PIFS} = \text{aSIFSTime} + \text{aSlotTime} \quad \text{[Formula 3]}$$

$$\text{DIFS} = \text{aSIFSTime} + 2*\text{aSlotTime} \quad \text{[Formula 4]}$$

EIFS is calculated from SIFS, DIFS and ACK transmission time (ACKTxTime) by Formula 5. The ACK transmission time (ACKTxTime) is expressed as microseconds required for a transmission of ACK frame including a preamble in a lowest physical layer mandatory rate, a PLCP header and additional physical layer dependent informations.

$$\text{EIFS} = \text{aSIFSTime} + \text{DIFS} + \text{ACKTxTime} \quad \text{[Formula 5]}$$

SIFS, PIFS and DIFS exemplarily shown in FIG. 15 are measured on MAC slot boundaries (TxSIFS, TxPIFS, TxDIFS) different from a medium. Such a slot boundary is defined as a time at which a transmitter is turned on by a MAC layer in order to match different IFS timings after detection of CCA result of a previous slot time. The MAC slot boundaries for SIFS, PIFS and DIFS are defined as Formulas 6 to 8, respectively.

$$\text{TxSIFS} = \text{SIFS} - \text{aRxTxTurnaroundTime} \quad \text{[Formula 6]}$$

$$\text{TxPIFS} = \text{TxSIFS} + \text{aSlotTime} \quad \text{[Formula 7]}$$

$$\text{TxDIFS} = \text{TxSIFS} + 2*\text{aSlotTime} \quad \text{[Formula 8]}$$

Power Management

As mentioned in the foregoing description, in WLAN system, STA should perform a channel sensing before performing transmission/reception. Yet, sensing a channel all the time requires a consistent power consumption of the STA. there is no big difference between a power consumption in reception status and a power consumption in transmission status. And, keeping the reception status puts a burden on a power-limited STA (i.e., a battery-operable STA). Hence, if an STA maintains a reception standby status in order to consistently sense a channel, it consumes a power inefficiently without special advantages in aspect of WLAN throughput. In order to solve this problem, a WLAN system supports a power management (PM) mode of STA.

The power management mode of STA can be divided into an active mode and a power save mode. The STA basically operates in active mode. The STA operating in active mode maintains an awake state. The awake state means a state in which a normal operation such as a frame transceiving, a channel scanning and the like is possible. On the other hand, the STA operating in PS mode operates in a manner of switching between a sleep state and an awake state. The STA operating in sleep state operates with a minimum power but does not perform a channel scanning as well as a frame transceiving.

Since a power consumption decreases if an STA operates in sleep state as long as possible, an operating period of the STA increases. Yet, since a frame transceiving is impossible in the sleep state, the STA is unable to operate long unconditionally. If there is a frame an STA operating in sleep state will transmit to an AP, the STA can transmit a frame by switching to an awake state. On the contrary, if there is no frame the AP will transmit to the STA, the STA in the sleep state is unable to receive the frame and is also unable to recognize a presence of the frame to receive. Hence, the STA may need an operation of switching to an awake state in accordance with specific periodicity in order to recognize a presence or non-presence of a frame to be transmitted to the corresponding STA (or, in order to receive the frame if the frame is present).

Figure 16:
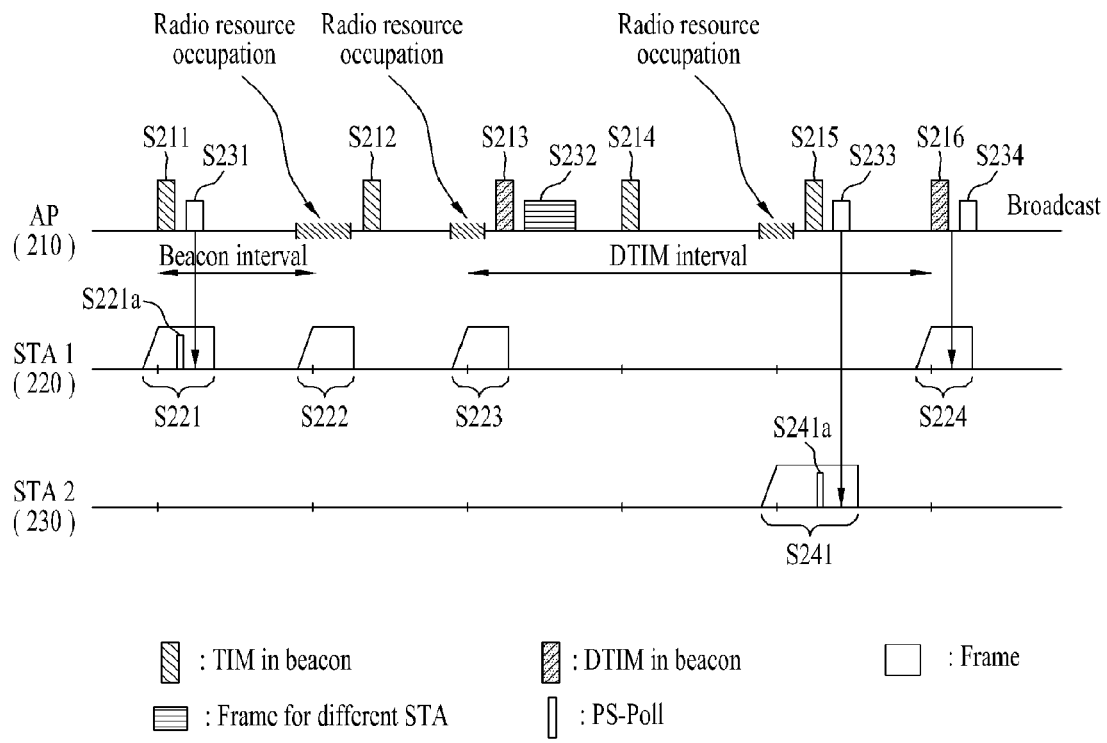
FIG. 16 is a diagram to describe a power management operation.

FIG. 16 is a diagram to describe a power management operation.

Referring to FIG. 16, an AP 210 transmits beacon frames to STAs in a BSS by predetermined periods [S211, S212, S213, S214, S215, S216]. In the beacon frame, a TIM (traffic indication map) information element is contained. The TIM information element contains an information for the AP 210 to indicate that there is a buffered traffic for STAs associated with the AP 210 and that the AP 210 will transmit a frame. TIM element may include a TIM used to indicate a unicast frame and a DTIM (delivery traffic indication map) used to indicate a multicast or broadcast frame.

The AP 210 can transmit the DTIM once per 3 transmissions of the beacon frames.

STA1 220 and STA2 230 are STAs operating in PS mode. Each of the STA1 220 and the STA2 230 can be set to receive the TIM element transmitted by the AP 210 by switching to an awake state from a sleep state in every wakeup interval of prescribed periodicity. Each of the STAs can calculate a timing point of switching to an awake state based on its local clock. In the example shown in FIG. 20, assume that the clock of the STA coincides with a clock of the AP.

For instance, the prescribed wakeup interval can be set for the STA1 220 to receive the TIM element by switching to the awake state in every beacon interval. Hence, when the AP 210 transmits the beacon frame for the $1^{st}$ time [S211], the STA1 220 can switch to the awake state [S221]. The STA1 220 receives the beacon frame and is able to acquire the TIM element. If the acquired TIM element indicates that there is a frame to be transmitted to the STA1 220, the STA1 220 can transmit a PS-Poll (Power Save-Poll) frame, which is provided to make a request for a frame transmission to the AP 210, to the AP 210 [S221a]. The AP 210 is able to transmit a frame to the STA1 220 in response to the PS-Poll frame [S231]. Having received the frame, the STA1 220 operates by switching to the sleep state again.

When the AP 210 transmits the beacon frame for the $2^{nd}$ time, since a medium is occupied (i.e., the medium is a busy medium) in a manner that another device accesses the medium for example, the AP 210 is unable to transmit the beacon frame to correspond to an accurate beacon interval but is able to transmit the beacon frame at a delayed timing point [S212]. In this case, although the STA1 220 switches its operating mode to the awake state to correspond to the beacon interval, since the STA1 220 fails in receiving the beacon frame transmitted by being delayed, the STA1 220 switches to the sleep state again [S222].

When the AP 210 transmits the beacon frame for the $3^{rd}$ time, TIM element set as DTIM may be contained in the corresponding beacon frame. Yet, since the medium is occupied (i.e., the medium is a busy medium), the AP 210 transmits a delayed beacon frame [S213]. The STA1 220 operates by switching to the awake state to correspond to the beacon interval and is able to acquire DTIM through the beacon frame transmitted by the AP 210. The DTIM acquired by the STA1 220 is assumed as indicating that there is no frame to be transmitted to the STA1 220 and that a frame for another STA is present. In this case, the STA1 220 confirms that there is no frame to receive and is then able to operate by switching to the sleep state again. After transmitting the beacon frame, the AP 210 transmits a frame to the corresponding STA [S232].

The AP 210 transmits the beacon frame for the $4^{th}$ time [S214]. Yet, since the STA1 220 is unable to acquire information, which indicates that a buffered traffic for the STA1 220 is present, through the 2 previous TIM element receptions, the STA1 220 is able to adjust a wakeup interval for the TIM element reception. On the other hand, if a signaling information for adjusting a wakeup interval value of the STA1 220 is contained in the beacon frame transmitted by the AP 210, the wakeup interval value of the STA1 can be adjusted. According to the present example, the STA1 220 can be set to switch an operating state in a manner that the STA1 220 wakes up once in every 3 beacon intervals instead of switching the operating state for the TIM element reception in every beacon interval. Hence, since the STA1 220 maintains the sleep state at the timing point at which the AP 210 transmits the beacon frame for the $5^{th}$ time [S215] after transmitting the $4^{th}$ beacon frame [S214], the STA1 220 is unable to acquire the corresponding TIM element.

When the AP 210 transmits the beacon frame for the $6^{th}$ time [S216], the STA1 220 operates by switching to the awake state and is able to acquire the TIM element contained in the beacon frame [S224]. Since the TIM element is the DTIM that indicates that a broadcast frame is present, the STA1 220 does not transmit a PS-Poll frame to the AP 210 but is able to receive a broadcast frame transmitted by the AP 210 [S234]. Meanwhile, a wakeup interval set for the STA2 230 can be set to have a period longer than that of the STA1 220. Hence, the STA2 230 can receive the TIM element by switching to the awake state at the timing point S215 at which the AP 210 transmits the beacon frame for the $5^{th}$ time [S241]. The STA2 230 recognizes that a frame to be transmitted to the STA2 230 is present from the TIM element and is then able to transmit a PS-Poll frame to the AP 210 to request a frame transmission [S241a]. Finally, the AP 210 is able to transmit a frame to the STA2 230 in response to the PS-Poll frame [S233].

For the power save mode management shown in FIG. 16, TIM element contains TIM indicating whether a frame to be transmitted to STA is present or DTIM indicating whether a broadcast/multicast frame is present. And, the DTIM can be implemented through a field setup of the TIM element.

FIGS. 17 to 19 are diagrams to describe operations of an STA having received TIM in detail.

Referring to FIG. 17, an STA switches to an awake state from a sleep state in order to receive a beacon frame containing a TIM from an AP and is then able to recognize that there is a buffered traffic to be transmitted to the STA by interpreting the received TIM element. The STA performs contention with other STAs for a medium access for a PS-Poll frame transmission and is then able to transmit a PS-Poll frame to make a request for a data frame transmission to the AP. Having received the PS-Poll frame transmitted by the STA, the AP is able to transmit a frame to the STA. The STA receives a data frame and is then able to transmit an ACK frame to the AP in response to the received data frame. Thereafter, the STA can switch to the sleep state again.

Like the example shown in FIG. 17, an AP can operate by an immediate response scheme in a manner of receiving a PS-Poll frame from an STA and then transmitting a data frame after a lapse of a prescribed time (e.g., SIFS (short inter-frame space). Meanwhile, after the AP has received the PS-Poll frame, if the AP fails to prepare the data frame, which is to be transmitted to the STA, within the SIFS time, the AP is able to operate by a deferred response scheme. This is described with reference to FIG. 22 as follows.

In an example shown in FIG. 18, like the former example shown in FIG. 21, an STA operates in a manner of switching to an awake state from a sleep state, receiving a TIM from an AP, and then transmitting a PS-Poll frame to the AP. If the AP fails to prepare a data frame during SIFS despite receiving the PS-Poll frame, the AP is able to transmit an ACK frame to the STA instead of transmitting the data frame. If the AP prepares the data frame after transmitting the ACK frame, the AP performs a contending and is then able to transmit the data frame to the STA. Subsequently, the STA transmits an ACK frame, which indicates that the data frame is successfully received, to the AP and is then able to switch to the sleep sate.

FIG. 19 shows one example that an AP transmits a DTIM. Each of STAs can switch to an awake state from a sleep state in order to receive a beacon frame containing a DTIM element from an AP. Each of the STAs can be aware that a multicast/broadcast frame will be transmitted through the received DTIM. After the AP has transmitted the beacon frame containing the DTIM, the AP is able to immediately transmit data (i.e., multicast/broadcast frame) without a PS-Poll frame transceiving operation. Each of the STAs receives the data in the course of keeping the awake state after receiving the beacon frame containing the DTIM and is then able to switch to the sleep state again after completion of the data reception.

In a power save mode managing method based on TIM (or DTIM) protocol described with reference to one of FIGS. 17 to 19, each of STAs can check whether a data frame, which will be transmitted for the corresponding STA, is present through STA identification information contained in TIM element. The STA identification information may include an information related to an AID (association identifier) assigned to the STA in the course of association with an AP.

The AID is used as a unique identifier for each STA in a single BSS. For instance, in a current WLAN system, the AID can be assigned as one of values ranging 1 to 2,007. In a currently defined WLAN system, 14 bits can be assigned to AID in a frame transmitted by an AP and/or STA and an AID value can be set to a value up to 16,383. Yet, 2,008 to 16,383 are set as reserved values.

FIG. 20 is a diagram for one example of TIM element format.

Referring to FIG. 20, a TIM element includes Element ID field, Length field, DTIM Count field, DTIM period field, Bitmap Control field, and Partial Virtual Bitmap field. The length field indicates a length of an information field. The DTIM count field indicates how many beacon frames exist until a next DTIM is transmitted. The DTIM period field indicates the number of beacon spaces between contiguous DTIMs. If all TIM is DTIM, the DTIM period field has a value set to 1. The DTIM period field is reserved as 0 and consists of 1 octet. The bitmap control field consists of a single octet. Bit 0 of the bitmap control field is a traffic indicator bit for AID 0. If at least one or more group addressed MSDUs/MMPDUs (MAC service data units)/ MAC management protocol data units) have data to be sent by an AP or a mesh STA, the DTIM count field is set to 0 and the bit 0 of the bitmap control field is set to 1. The rest 7 bits in a $1^{st}$ octet indicate a bitmap offset. A traffic-indication virtual bitmap by an AP or mesh STA for generating TIM consists of 2,008 bits (=251 octets). The bit number N (0<=N<=2,007) in a bitmap can be expressed as the octet number N/8 and the bit number (N mod 8). Each bit in the traffic-indication virtual bitmap indicates a presence or non-presence of data to be sent by an AP. If data to be set by an AP for the individually addressed MSDU/ MMPDU (AID=N) is present, the bit number N is set to 1. If not present, the bit number N is set to 0.

The respective fields mentioned in the foregoing description correspond to examples of the fields that can be included in the TIM element, may be substituted with other fields, or may further include additional fields.

Power Management Using Automatic Power Saving Delivery

Aside from the above-described PS-Poll based power saving method, IEEE 802.11e system provides an automatic power saving delivery (APSD) method. The ASPD is mainly categorized into a scheduled-APSD (s-APSD) method and an unscheduled-APSD (u-APSD) method. The u-APSD means a mechanism for an AP (e.g., QoS AP) supportive of APSD to operate in a power saving mode having an awake state and a doze state switched to each other and to deliver a downlink frame to an STA (e.g., QoS STA) supportive of APSD at the same time.

A QoS (quality of service) AP supportive of APSD can signal such capability to an STA using a beacon, a probe response and an APSD subfield of a capability information field in an association (re-association) response management frame.

STAs can use u-APSD in order to receive bufferable units (BUs) of the corresponding STAs, which are delivered from an AP in an unscheduled-service period (hereinafter abbreviated u-SP), entirely or in part. When the u-SP is not in progress, the u-SP can be initiated if an STA transmits a QoS data or a QoS null frame belonging to an access category (AC) set to 'trigger-enabled' to an AP. In this case, a transmitted uplink frame is named a trigger frame. Aggregated MPDU (A-MPDU) includes one or more trigger frames. The unscheduled-SP is terminated after the AP attempts a transmission of at least one scheduled BU for a delivery-enabled AC and the corresponding STA. Yet, if a maximum service period length field (Max SP Length field) of a QoS capability element of an association (re-association) request frame of the corresponding STA has a non-zero value, it is limited to a value indicated in the corresponding field.

In order to receive BU from an AP in u-SP, an STA designates one or more of a delivery-enabled AC and a trigger-enabled AC of the corresponding STA. In IEEE 802.11e system, in order to provide QoS, 8 priorities different from one another and 4 access categories (ACs) based on the 8 different priorities are defined. An STA can configure an AP to use u-APSD using two kinds of methods. First of all, an STA can configure an individual u-APSD flag bit in a QoS information (QoS Info) subfield of a QoS capability element delivered in an association (re-association) request frame. If the u-APSD flag bit is 1, it indicates that a corresponding AC is delivery-enabled and trigger-enabled. If all of 4 u-APSD flag subfields in the association (re-association) request frame are set to 1, all ACs related to an STA are delivery-enabled and trigger-enabled during the association (re-association). If all of 4 u-APSD flag subfields in the association (re-association) request frame are set to 0, any delivery-enabled and trigger-enabled AC during association (re-association) does not exist among the ACs related to the STA. Alternatively, the STA is able to designate one or more delivery-enabled and trigger-enabled ACs by transmitting a schedule subfield set to 0 within a traffic stream (TS) information (Info) field of TSPEC (traffic specification)

element in ADDTS (add traffic stream) request frame having APSD subfield set to 1 per AC to the AP. APSD configuration in TSPEC request may be prioritized over static u-APSD configuration delivered within the QoS capability element. In other words, the TSPEC request can be overwritten on the u-APSD configuration of any previous AC. And, the corresponding request can be transmitted for an AC having an ACM subfield set to 0.

An STA is able to set an AC to be trigger-enabled or delivery-enabled in a manner of configuring TSPEC having an APSD subfield set to 1 and a schedule subfield set to 0 in an uplink or downlink transmission direction. Each of an uplink TSPEC, a downlink TSPEC and a bi-directional TSPEC, each of which has an APSD subfield set to 1 and a schedule subfield set to 0, can configure an AC to be delivery-enabled and trigger-enabled. Each of an uplink TSPEC, a downlink TSPEC and a bi-directional TSPEC, each of which has an APSD subfield set to 0 and a schedule subfield set to 0, can configure an AC to be delivery-disabled and trigger-disabled.

A scheduled-service period (hereinafter abbreviated s-SP) starts with a fixed time interval specified in a service interval field. If an access policy controls a channel access, in order to use s-SP for TS, an STA can transmit an ADDTS request frame, which has an APSD subfield set to 1 in a TS information field within a TSPEC element, to an AP. On the other hand, if the access policy supports a contention-based channel access, in order to use s-SP for TS, an STA can transmit an ADDTS request frame, which has an APSD subfield set to 1 and a schedule subfield set to 1 in a TS information field within a TSPEC element, to an AP. If APSD mechanism is supported by the AP and the AP accepts the corresponding ADDTS request frame from the STA, the AP can make a response with an ADDTS response frame containing a schedule element indicating that a requested service can be provided by the AP. If 4 lower-ordered octets of a TSF (timing synchronization function) timer are equal to a specified value in a service start time field, an initial s-SP starts. An STA, which uses s-SP, can initially wake up in order to receive a buffered and/or polled BU individually addressed to itself from an AP or a hybrid coordinator (HC). Thereafter, the STA is able to wake up in a predetermined time interval equal to a service interval (SI). The AP is able to adjust a service start time through the schedule elements in a successful ADDTS response frame (i.e., a response to the ADDTS request frame) and a schedule frame (transmitted at a different timing point).

The s-SP starts on the scheduled wake-up time corresponding to the service start time and SI indicated within the schedule elements transmitted in response to the TSPEC. Thereafter, the STA wakes up at the timing point by Formula 9.

$$(TSF-\text{service start time}) \bmod \text{minimum SI}=0 \quad [\text{Formula 9}]$$

If s-SP is supported in a BSS, an STA is able to use both u-APSD and s-APSD for different ACs on the same time. When an STA configures a scheduled delivery for an AC, an AP does not transmit BU, which uses the corresponding AC, during an SP initiated by a trigger frame and does not process AC-using BU received from the STA in a trigger frame. The AP does not decline any ADDTS request frame indicating to use both s-APSD and u-APSD to be used for the same AC on the same time. APSD can be used for a delivery of an individually addresses BU only. A group-addressed BU delivery may follow a frame delivery rule for a group-addressed BU.

A non-AP STA, which uses u-APSD, may not be able to receive all frames transmitted from an AP during a service period due to interference observed by the corresponding non-AP STA. in this case, even if the AP does not observe the same interference, the AP may be able to determine that a frame is not accurately received by the non-AP STA. The u-APSD coexistence capability can instruct a transmission duration requested to be used for u-SP by the non-AP STA to the AP. Using the transmission duration, the AP can transmit a frame during the SP and the non-AP STA can improve reception possibility of a frame in an interfering situation. The u-APSD coexistence capability lowers possibility in receiving a frame during a service period by the AP.

FIG. 21 shows one example of U-APSD coexistence element format.

Referring to FIG. 21, an Element ID field is equal to a U-APSD coexistence value. A length of additional subelements existing on 12 is added to a value of a length field. A non-zero value in a TSF 0 Offset field means the number of microseconds after a time (TSF time 0) at which a non-AP STA recognizes that interference starts. An AP uses the TSF 0 Offset field for a transmission to the non-AP STA together with an Interval/Duration field.

An STA of which "dot11MgmtOptionUAPSDCoexistenceActivated" has a value of 'true' is defined as an STA supportive of U-APSD coexistence. In this case, the STA of which "dot11MgmtOptionUAPSDCoexistenceActivated" has a value of 'true' sets APSD Coexistence field of Extended Capabilities element to 1. Otherwise, the corresponding STA sets the field to 0. A non-AP STA associated with an AP (if supporting U-APSD coexistence capability was previously announced to both) is able to transmit ADDTS Request frame containing U-APSD Coexistence element to the corresponding AP.

A content of ADDTS Request frame not containing U-APSD Coexistence element shall be named Base ADDTS Request hereinafter. If successfully receiving ADDTS Request frame, an AP processes the content of the Base ADDTS Request frame. If the AP determines that the Base ADDTS Request is not acceptable, the AP does not process the U-APSD Coexistence element. On the contrary, if the AP determines that the Base ADDTS Request is acceptable, the AP processes the U-APSD Coexistence element. If the AP supports a frame transmission for a U-APSD service period for a specified duration in Interval/Duration field of the U-APSD Coexistence element, the AP can grant the ADDTS request. Otherwise, the AP can decline the ADDTS request.

If the AP grants the ADDTS request previously having the U-APSD coexistence, a non-AP STA, which keeps using a QoS service provided by the ADDTS Request frame, is able to terminate the use of the U-APSD coexistence by transmitting ADDTS Request frame not containing the U-APSD Coexistence element. If the non-AP STA desires to terminate the use of all QoS services by the ADDTS Request frame containing the U-APSD coexistence, the non-AP STA can transmit DELTS (delete traffic stream) Request frame to the AP.

If the previous ADDTS Request frame is nullifies by an ADDTS Request frame successfully received last, the non-AP STA can transmit multiple ADDTS Request frames to the AP. The AP, which supports the U-APSD coexistence and accepts the ADDTS request, can restrict a U-APSD service period in accordance with a parameter specified in U-APSD Coexistence element of ADDTS frame. Moreover, the AP transmits a frame to make a request to the non-AP STA by the following rules.

First of all, if the non-AP STA specifies a TSF 0 Offset value in the U-APSD Coexistence element into a non-zero value, the AP does not transmit a frame to the non-AP STA out of the U-APSD coexistence service period. The U-APSD coexistence service time starts when the AP receives a U-APSD trigger frame. Thereafter, the U-APSD coexistence service time ends after a transmission period specified by Formula 10.

$$\text{End of transmission period} = T + (\text{Interval} - ((T - \text{TSF 0 Offset}) \bmod \text{Interval})) \quad \text{[Formula 10]}$$

In Formula 10, T indicates a time at which a U-APSD trigger frame is received by an AP. And, Interval indicates an early arriving value selected from Duration/Interval field value of the U-APSD Coexistence element and a timing point of a successful transmission having EOSP (end of service period) bit set to 1.

On the contrary, if the non-AP STA specifies the TSF 0 Offset value in the U-APSD Coexistence element into 0, the AP does not transmit a frame to the non-AP STA out of the U-APSD coexistence service period. The U-APSD coexistence service time starts when the AP receives a U-APSD trigger frame. Thereafter, the U-APSD coexistence service time ends after a transmission period specified by Formula 11.

$$\text{End of transmission period} = T + \text{Duration} \quad \text{[Formula 11]}$$

In Formula 11, T indicates a time at which a U-APSD trigger frame is received by an AP. And, Duration indicates an early arriving value selected from Duration/Interval field value of the U-APSD Coexistence element and a timing point of a successful transmission having EOSP bit set to 1.

During the U-APSD coexistence service time, the AP further retains a frame which is to be transmitted by the corresponding AP. If it is determined that the corresponding frame will be successfully transmitted before expiration of the service period, an additional (more) bit can be set to 1.

If the AP estimates that a frame is a last frame that will be transmitted to the non-AP STA in the U-APSD coexistence service period, the AP can set the EOSP bit to 1 in the corresponding frame. If the corresponding last frame is not successfully transmitted to the non-AP STA before an end of the U-APSD coexistence service period, the AP transmits a QoS null frame having the EOSP bit set to 1. The non-AP STA can enter a doze state at the end timing point of the U-APSD coexistence service period.

Problem of Node Hidden in PS-Poll

Figure 22:
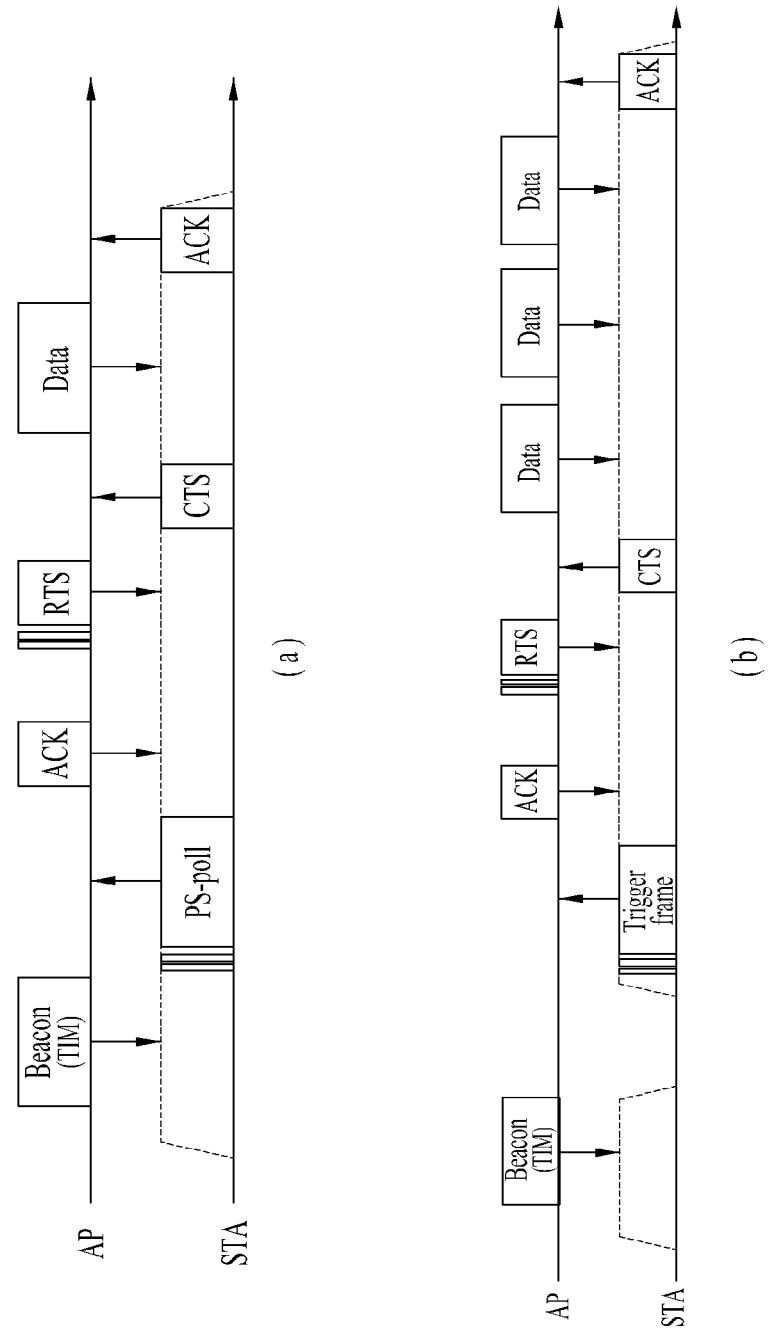
FIG. 22 is a diagram to describe operations of STA according to PS-Poll mechanism and U-APSD mechanism.

FIG. 22 is a diagram to describe operations of STA according to PS-Poll mechanism and U-APSD mechanism.

FIG. 22 (a) shows one example of PS-Poll mechanism. And, FIG. 22 (b) shows one example of U-APSD mechanism.

Referring to FIG. 22 (a), an STA can be aware of a presence or non-presence of a buffered traffic desired to be sent to the corresponding STA by an AP through a TIM element of a beacon. If the traffic to be transmitted to the STA is present, the STA performs a contending with other STAs by the PS-Poll mechanism and then makes a request for a data frame transmission to the AP by transmitting a PS-Poll frame to the AP. After the AP has received the PS-Poll frame, if the AP fails to prepare a data frame to transmit to the STA within an SIFS time, the AP is able to transmit an ACK frame to the STA instead of transmitting the data frame. Thereafter, if the AP prepares the data frame after the ACK frame transmission, the AP performs a contending with other STAs, exchanges RTS/CTS frame with the STA, and then transmits the data frame to the STA. In this case, the step of exchanging the RTS/CTS frame can be omitted. If the STA successfully receives the data frame, the STA transmits an ACK frame to the AP and then switches to a sleep state. Yet, in case of performing the data transmission by the above-mentioned PS-Poll mechanism, since the AP can transmit a single PSDU only at a time, if a size of data to be sent to the STA by the AP is large, it is disadvantageous in that the transmission may be performed inefficiently.

In order to settle such disadvantage, the STA can receive several PSDUs at a time from the AP using its own service period (SP) by the above-mentioned U-APSD mechanism.

Referring to FIG. 22 (b), an STA recognizes that there is data desired to be sent to the corresponding STA through a TIM element of a beacon. Thereafter, when the STA desires to receive the corresponding data, the STA performs a contending with other STAs and then transmits a trigger frame to the AP in order to announce that a service period (SP) of the STA has started and to make a request for the AP to transmit the data. Subsequently, the AP transmits an ACK frame to the STA in response to the trigger frame. Thereafter, the AP performs a contending with other STAs, exchanges RTS/CTS frame with the STA, and then transmits the data to the STA. In doing so, the data can be configured with several data frames. In this case, the step of exchanging the RTS/CTS frame can be omitted. When the AP transmits a last data frame, if the AP transmits the last data frame by setting an EOSP field of the corresponding data frame to 1, the STA recognizes it, transmits an AC frame to the AP, and is then able to switch to a sleep state by ending the SP. Thus, if using the U-APSD mechanism, the STA can receive data by starting its own SP on a time desired by the STA and is able to receive several data frames in a single SP, whereby data reception can be efficiently performed.

Yet, the RTS/CTS frame exchange, which is required for the data transmission to prevent the hidden node problem in the former example, causes a considerable amount of overhead to the data transmission. Moreover, after an STA has made a request for a transmission of data to an AP by transmitting a trigger frame, it takes a considerable time for the AP to prepare data to send to the STA and to perform a contending for the transmission of the data. Hence, the STA consumes unnecessary energy.

Meanwhile, in a hidden node environment, there are user equipments unable to overhear PS-Poll frame transmitted by a different user equipment. And, it is highly probable that collision may occur due to simultaneous transmissions of PS-Poll frames. To solve such problem, in order for a PS mode user equipment to receive data from an AP in a hidden node environment, an NDP (null data packet) PS-Poll frame and an extended slot time based on the NDS PS-Poll frame can be used.

Figure 23:
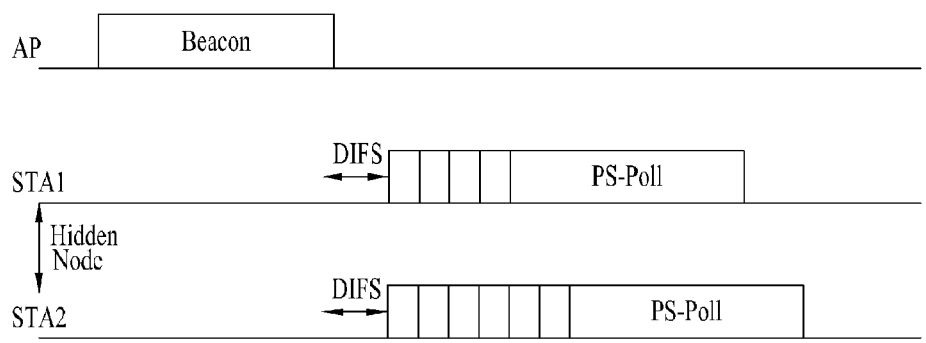
FIG. 23 is a diagram for one example of a case that PS-Poll frame collides in a hidden node environment.

FIG. 23 is a diagram for one example of a case that PS-Poll frame collides in a hidden node environment.

In FIG. 23, assume that an AP retains data frames for an STA 1 and an STA 2. And, assume that such a fact is announced to the STA 1 and the STA 2 through a TIM element of a beacon frame. Moreover, assume that the STA 1 and the STA 2 reciprocally correspond to hidden nodes.

Each of the STA 1 and the STA 2 attempts a channel access through c contending. If backoff count values of the STA 1 and the STA 2 are 4 and 6, respectively, as shown in FIG. 23, the STA 1 transmits a PS-Poll frame to the AP in the first place. If the PS-Poll frame of the STA 1 is successfully delivered to the AP, the AP transmits a buffered data frame for the STA 1 or an ACK frame to the STA 1. Yet, since the STA 2 is a hidden node of the STA 1, the STA 2 fails to monitor the PS-Poll frame transmitted by the STA 1 and then determines that a channel is idle on a time of transmitting the PS-Poll frame of the STA 1. Hence, the STA 2 can perform a countdown of its backoff slot. Finally, if a countdown value of the backoff slot of the STA 2 expires, the STA 2 can transmit a PS-Poll frame to the AP as well. In particular, although the STA 1 has transmitted the PS-Poll frame owing to the successful channel access in the first place, the STA 2 transmits the PS-Poll frame due to the hidden node problem. Hence, it may result in collision of PS-Poll frames.

In order to solve such a problem, it is necessary for a slot time of a backoff timer used for a contention process to be greater than a PS-Poll frame transmission time. In this case, the slot time corresponds to a channel idle time unit required for decreasing the backoff timer in the contention process. Hence, if the slot time is set greater than the PS-Poll frame transmission time, an AP successfully receives a PS-Poll frame and is then able to transmit a response frame in response to the received PS-Poll frame. Since STAs corresponding to hidden nodes can receive the response frame sent by the AP, they are aware that a channel is in use so as not to decrease the backoff timers. This considers a problem that STAs located in a hidden node environment are unable to overhear a PS-Poll frame. Hence, it is able to solve the problem of the hidden node by setting the slot time, i.e., a channel sensing time to be greater than the PS-Poll frame transmission time.

Figure 24:
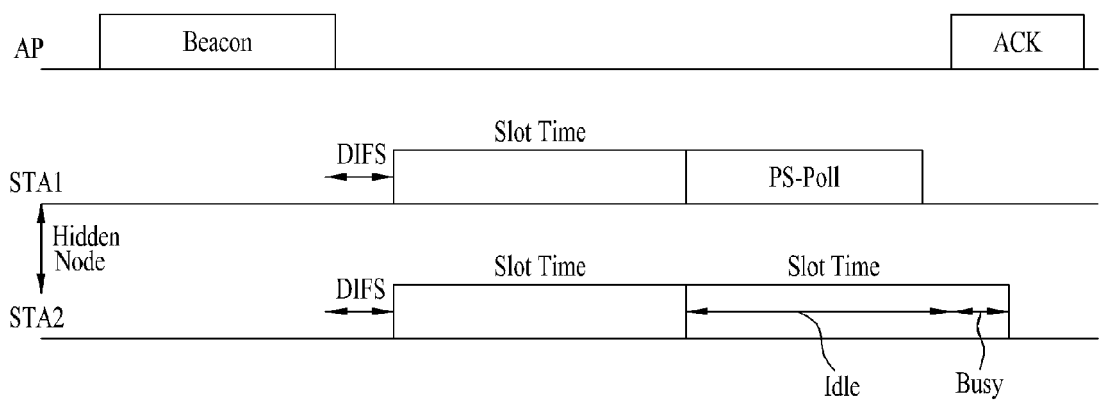
FIG. 24 is a diagram for one example of PS-Poll contention mechanism in a hidden node environment.

FIG. 24 is a diagram for one example of PS-Poll contention mechanism in a hidden node environment.

In FIG. 24, assume that an AP retains data frames for an STA 1 and an STA 2. And, assume that such a fact is announced to the STA 1 and the STA 2 through a TIM element of a beacon frame. Moreover, assume that the STA 1 and the STA 2 reciprocally correspond to hidden nodes.

Each of the STA 1 and the STA 2 attempts a channel access through c contending. If backoff count values of the STA 1 and the STA 2 are 4 and 6, respectively, as shown in FIG. 23, the STA 1 transmits a PS-Poll frame to the AP in the first place. If backoff count values of the STA 1 and the STA 2 are 1 and 2, respectively, the STA 1 transmits a PS-Poll frame to the AP in the first place. If the PS-Poll frame of the STA 1 is successfully delivered to the AP, the AP transmits a buffered data frame for the STA 1 or an ACK frame to the STA 1. Yet, since the STA 2 is a hidden node of the STA 1, the STA 2 fails to monitor the PS-Poll frame transmitted by the STA 1. The STA 2 determines that a channel is idle on a time of transmitting the PS-Poll frame of the STA 1 but also determines that a channel is busy for a buffered data frame or an ACK frame transmitted after the PS-Poll frame. Therefore, the STA 2 does not perform a countdown of its backoff slot while the STA 1 occupies the channel, whereby a situation of collision between PS-Poll frames can be avoided.

For the above-mentioned PS-Poll contention mechanism, a slot time can be set as Formula 12 in the following.

Slot Time=PS-Poll Transmission Time+SIFS+CCA Time of Response frame+2*Air Propagation Delay [Formula 12]

The PS-Poll Transmission Time means a transmission time of a PS-Poll frame. When an AP transmits a response frame (e.g., a data frame, an ACK frame, etc.) in response to a PS-Poll frame, the CCA Time of Response frame means a CCA detection time of an STA.

According to the PS-Poll contention mechanism, in a hidden node environment, it is able to solve the PS-Poll collision problem. Yet, it causes a problem that a time consumed in a contention process increases due to an increase of the slot time. As a method of mitigating such a problem, it is able use an NDP PS-Poll frame shown in FIG. 25. Unlike an existing PS-Poll frame is a MAC Control frame carried on PSDU, the NDP PS-Poll frame consists of PSDU-free NDP (Null Data Packet) only.

Figure 25:
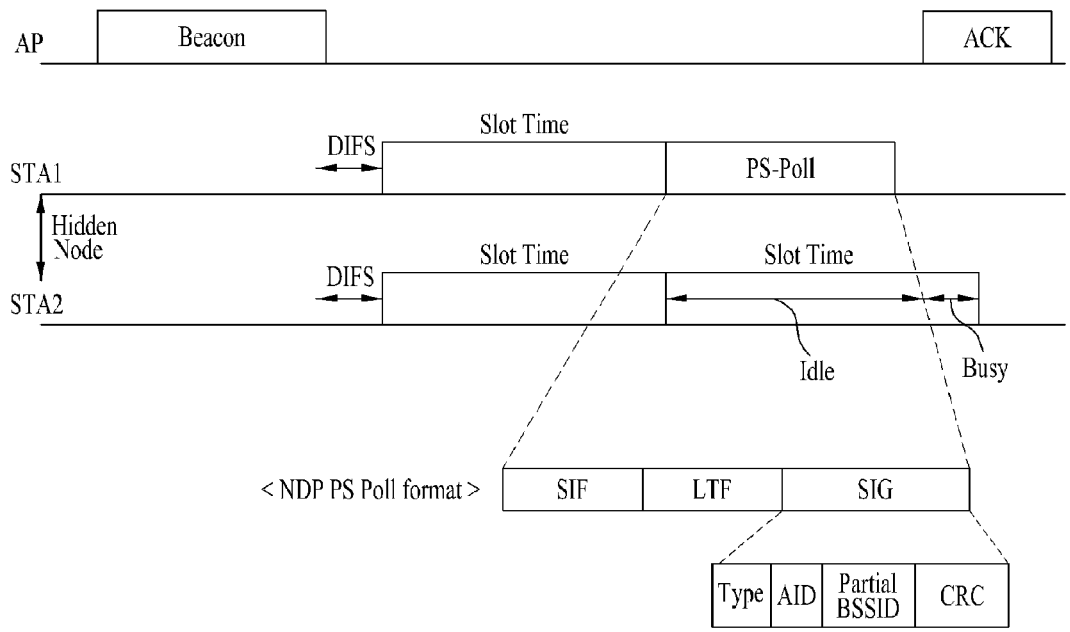
FIG. 25 is a diagram for one example of NDP PS-Poll frame.

FIG. 25 is a diagram for one example of NDP PS-Poll frame.

Referring to FIG. 25, an NDP PS-Poll frame consists of STF, LTF and SIG fields only. Each of the STF and LTF fields consists of a channel estimation sequence necessary for decoding the SIG field. The SIG field can mainly consist of 4 kinds of subfields. The fields exemplarily shown in FIG. 25 are just one example of subfields included in the SIG field of the NDP PS-Poll format, may be substituted with other fields, or may have other subfields added thereto. And, sizes of the respective subfields may have different values.

Type subfield is provided for SIG interpretation of an NPD frame and indicates that the corresponding NDP frame is designed for a PS-Poll frame. AID sub-field corresponds to an AID of an STA that transmits an NPD PS-Poll frame. The field is provided to enable an AP having received the NDP PS-Poll frame to know which STA has transmitted the PS-Poll frame. Partial BSSID subfield corresponds to a portion of BSSID of an AP to which the NDP PS-Poll frame transmitting STA belongs. Moreover, unlike this, any ID value for identifying the corresponding AP can be used. In particular, this may be used in a manner of defining a specific ID for the AP or hashing the NSSID. For the usage of error detection of the SIG field, CRC subfield is included.

In case that an AP receives an NDP PS-Poll frame, the AP preferentially determines whether to make a response to an STA in response to the PS-Poll frame through a partial BSSID subfield. The AP transmits an ACK frame to the corresponding STA in response to the NDP PS-Poll frame or may transmit a buffered frame toward the corresponding STA.

In doing so, if the ACK frame is transmitted, it corresponds to a case that the buffered frame toward the corresponding STA is not currently present at the AP or a case that it is difficult to directly transmit the buffered frame to the corresponding STA after SIFS. In case that the buffered frame toward the corresponding STA is not present at the AP, a more data bit subfield in a frame control field of the ACK frame is set to 0. Otherwise, the more data bit subfield in the frame control field of the ACK frame is set to 1.

As mentioned in the foregoing description, it is able to solve the PS-Poll collision due to the existing hidden nodes using the NDP PS-Poll frame and the new extended slot time [cf. Formula 2]. Yet, by using the existing contention-based PS-Poll mechanism, each user equipment performing PS-Poll receives a beacon and then recognizes whether a different user equipment uses a channel by continuously performing CCA until its PS-Poll is correctly transmitted. This causes unnecessary power consumption to the user equipment on performing PS-Poll. Particularly, a power consumption of a user equipment, which performs a latest PS-Poll, will become relatively greater than that of another user equipment.

Figure 26:
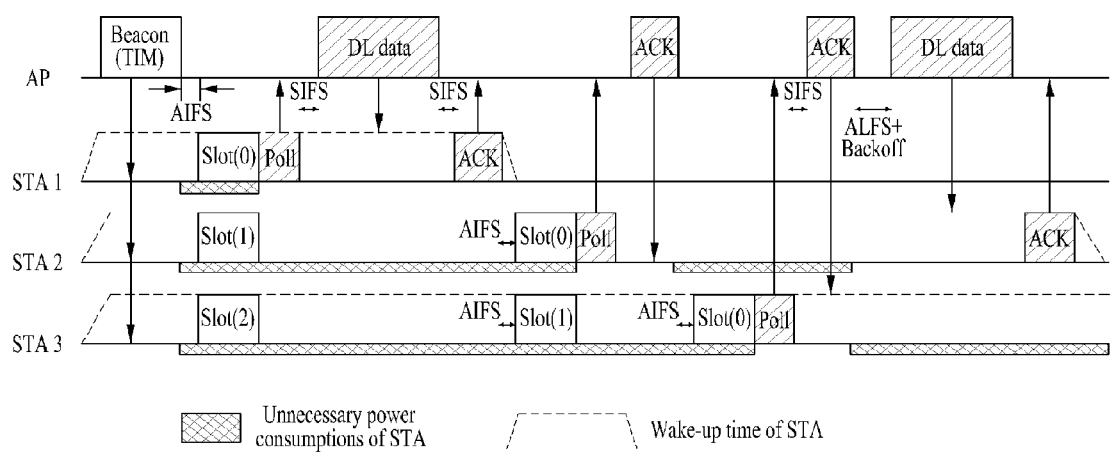
FIG. 26 is a diagram for one example of a channel access operation of STA using an extended slot time.

FIG. 26 is a diagram for one example of a channel access operation of STA using an extended slot time.

In FIG. 26, assume that an AP retains data frames for an STA 1, an STA 2 and an STA 3. And, assume that such a fact is announced to the STA 1, the STA 2 and the STA 3 through a TIM element of a beacon frame.

Referring to FIG. 26, each of the STA 1, the STA 2 and the STA 3 attempts a channel access through contention and performs a random backoff using a new extended slot time. In the example shown in FIG. 26, the PS-Poll transmitting STAs select different backoff count values (e.g., STA 1=1, STA 2=2, STA 3=3), respectively.

In the following description, assume that an STA senses a busy (or, occupied) status of a medium for AIFS (arbitration interframe space) before PS-Poll frame transmission.

The STA 1 confirms that a medium is in an idle status during AIFS, counts down a backoff slot (i.e., 1 slot), and then transmits a PS-Poll frame to an AP. In doing so, each of the STA 2 and the STA 3 monitors that the medium is in a busy status and then stands by. The AP receives the PS-Poll frame from the STA 1 and then transmits a data frame immediately after the SIFS. Subsequently, the STA 1 transmits an ACK frame in response to the data frame. Thus, while the STA 1 occupies the medium, each of the STA 2 and the STA 3 stops the countdown and stands by.

If the medium occupation by the STA 1 is ended, each of the STA 2 and the STA 3 confirms that the medium is in the idle status during AIFS and then performs a countdown of a residual backoff slot. Since a backoff count value of the STA 2 is smaller than that of the STA 3, the STA 2 counts down a residual backoff slot (i.e., 1 slot) and then transmits a PS-Poll frame to the AP. In doing so, the STA 3 monitors that the medium is in a busy status and stands by. After the AP has received the PS-Poll frame from the STA 2, if the AP is unable to immediately transmit a data frame after SIFS, the AP transmits an ACK frame after the SIFS. Thus, while the STA 2 occupies the medium, the STA 3 holds the countdown in the backoff slot and stands by.

Once the medium occupation by the STA 2 is ended, the STA 3 confirms that the medium is in the idle status during the AIDS, performs a countdown of a residual backoff slot (i.e., 1 slot), and then transmits a PS-Poll frame to the AP. After the AP has received the PS-Poll frame from the STA 3, if the AP is unable to immediately transmit a data frame after SIFS, the AP transmits an ACK frame.

Meanwhile, the AP performs a contending with STAs (e.g., performing an idle status check of a medium during AIFS and a random backoff) and transmits data to the STA 2. Subsequently, the STA 2 transmits an ACK frame in response.

In the above-mentioned examples, since the STA 1, the STA 2 and the STA 3 select the different backoff count values, respectively, collision does not occur. Yet, since the rest of the STAs except the STA 1 defer PS-Poll during channel access periods of other STAs and keep the awake state until receiving data toward themselves, unnecessary power consumption occurs. For instance, in case of the STA 2, after transmitting the PS-Poll, in order to receive data toward the STA 2, the STA 2 keeps the awake status unnecessarily during the period for the STA 1 to occupy the medium and the period for the STA 3 to occupy the medium. Moreover, this corresponds to a case that the slot time is extended greater than the PS-Poll transmission time. Hence, the unnecessary power consumption may increase greater than the existing power consumption.

Figure 27:
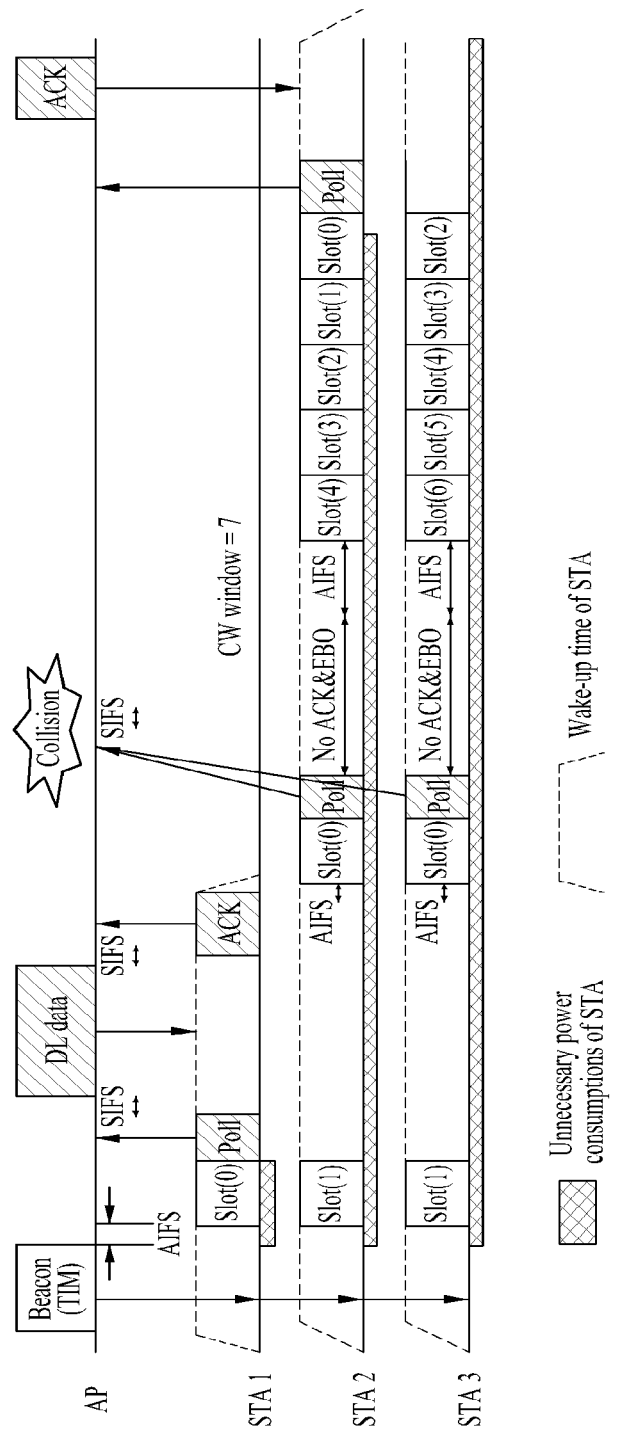
FIG. 27 is another diagram for one example of a channel access operation of STA using an extended slot time.

FIG. 27 is another diagram for one example of a channel access operation of STA using an extended slot time.

In FIG. 27, assume that an AP retains data frames for an STA 1, an STA 2 and an STA 3. And, assume that such a fact is announced to the STA 1, the STA 2 and the STA 3 through a TIM element of a beacon frame.

Referring to FIG. 27, each of the STA 1, the STA 2 and the STA 3 attempts a channel access through contention and performs a random backoff using a new extended slot time. In the example shown in FIG. 27, each of the STA 2 and the STA 3 selects the same backoff count value (e.g., STA 1=1, STA 2=2, STA 3=2), respectively.

As mentioned in the foregoing description with reference to FIG. 26, if the medium occupation by the STA 1 is ended, each of the STA 2 and the STA 3 confirms that the medium is in the idle status during AIDS and then performs a countdown of a residual backoff slot. Yet, since a backoff count value of the STA 2 is equal to that of the STA 3, a collision occurs. Thus, in case that the collision occurs, since the STA 2 and the STA 3 are unable to receive an ACK frame or a data frame from the AP, both of the STA 2 and the STA 3 fail in data transmission. In this case, each of the STA 2 and the STA 3 performs an exponential backoff. In particular, a CW value is doubled and a backoff count value is reselected. In the example shown in FIG. 27, the STA 2 selects 5 as the backoff count value and the STA 3 selects 7 as the backoff count value. Since the backoff count value of the STA 2 is smaller than that of the STA 3, the STA 2 performs a countdown of backoff slots (i.e., 5 slots) and then transmits a PS-Poll to the AP.

Thus, as backoff count values of two STAs coincide with each other, if a collision occurs, power consumptions of the two STAs increase and a transmission delay increases as well. Since this corresponds to a case that a slot time is extended greater than a PS-Poll transmission time, unnecessary power consumption may become greater than the existing power consumption.

Improved Channel Access Method

In order to solve the above-mentioned problems, the present invention proposes a method of reducing unnecessary power consumption in performing PS-Poll after an STA recognizes that there is data to be delivered to the STA by receiving a beacon containing a TIM. To this end, in an improved channel access scheme, a channel access operation can be performed in a channel access interval set per specific STA. In the following description of the present invention, a PS-Poll operation (i.e., an improved scheduled PS-Polling scheme) is assumed for a channel access, by which the present invention may be non-limited. And, a new frame for a channel access can be employed.

According to the present invention, when a random backoff of an STA is performed, a new extended slot time mentioned in the foregoing description can be used, by which the present invention may be non-limited. And, an existing slot time can be used as well. In case that an extended slot time is used, it can be determined as Formula 12. For PS-Poll, the aforementioned NDP PS-Poll frame having (STF+LTF+SIG) fields can be used, by which the present invention may be non-limited. And, an existing MAC control frame can be used.

An ACK frame may use an existing ACK frame identically or a configuration of an NDP ACK frame only having STF+LTF+SIG field similar to that of the aforementioned NDP PS-Poll frame. In this case, a size of the NDP PS-Poll frame may be equal to that of the NDP ACK frame.

In the following description, an STA can sense a busy (occupied) status of a medium for one of SIFS, PIFS, (PIFS+additional time), and EDCA time (AIFS+Random backoff). In particular, after the STA has sensed a channel by selecting one of SIFS, PIFS, (PIFS+additional time), and EDCA time, if the channel is idle, the STA transmits a PS-Poll. In this case, the EDCA time indicates a channel sensing time previously used for an existing STA to access a channel based on EDCA. For clarity of the following description, assume that an STA uses PIFS.

Figure 28:
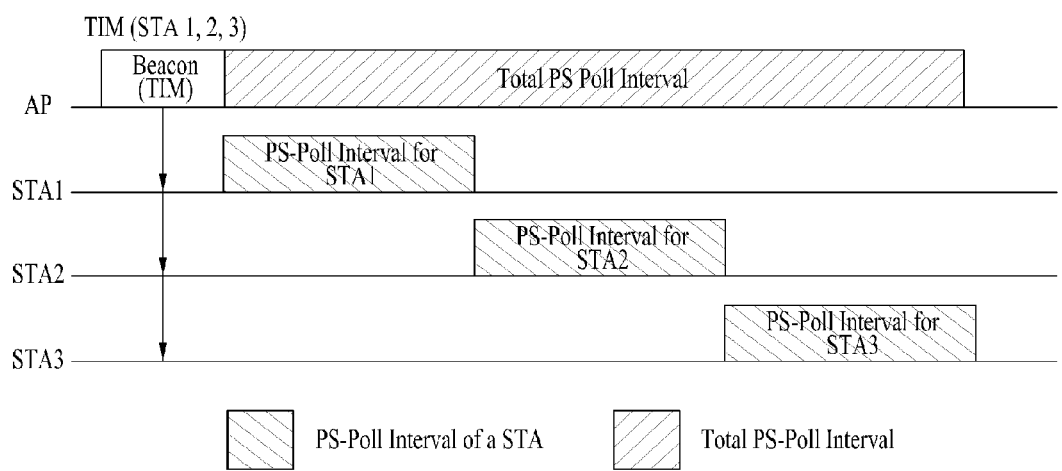
FIG. 28 is a diagram for one example of PS-Poll interval configured per STA according to one embodiment of the present invention.

FIG. 28 is a diagram for one example of a PS-Poll interval configured per STA according to one embodiment of the present invention.

In FIG. 28, assume that an AP retains data frames for an STA 1, an STA 2 and an STA 3. And, assume that such a fact is announced to the STA 1, the STA 2 and the STA 3 through a TIM element of a beacon frame.

Referring to FIG. 28, a PS-Poll interval of each of the STAs is designated per STA based on a TIM information element contained in a beacon and locations of the PS-Poll intervals are set different from each other among the STAs performing the PS-Poll. In particular, in case that the AP stores data frames to transmit to the STAs, the AP can configure a PS-Poll interval for each of the corresponding STAs (STA 1, STA 2 and STA 3). In addition, in order to prevent other STAs (e.g., STAs other than the STA 1, the STA 2 and the STA 3), which are not indicated by the TIM element, from attempting a channel access in total PS-Poll interval, the AP can set a value of a duration field in a MAC header of the beacon in a manner of adding the total PS-Poll interval to a length of the corresponding beacon. Since each of the STAs can check the length of the beacon through a length field and an MCS field within an SIG field, it can be aware of the total PS-Poll interval designated to the STAs (the STA 1, the STA 2 and the STA 3) indicated by the TIM element through the duration field. And, other STAs (STAs other than the STA 1, the STA 2 and the STA 3) not indicated by the TIM element may not attempt a channel access in the corresponding total PS-Poll interval.

An AP is able to explicitly inform STAs of location information of a PS-Poll interval through an information element (e.g., a TIM information element, a polling assignment information element, etc.) of a beacon frame. In particular, the AP can additionally inform each STA, which is indicated by a TIM element, of the location information of the PS-Poll interval through the information element in the beacon frame. For instance, the AP can inform each STA of an offset information on a start timing point of the PS-Poll interval and a length information of the PS-Poll interval of the corresponding STA. In this case, the length information of the PS-Poll interval may differ per STA. If all STAs use the same PS-Poll interval length, a single PS-Poll interval length information is contained in the information element within the beacon frame and each of the corresponding STAs acquires its PS-Poll interval information using the corresponding PS-Poll interval length. If a length of a PS-Poll interval of each STA is fixed or the corresponding STA is able to know the length of the PS-Poll interval implicitly (e.g., if a PS-Poll interval length is determined by a system, PIFS+PS-Poll frame transmission time+SIFS+CCA Time of Response frame (e.g., ACK frame transmission time)+2*Air Propagation Delay), the AP can inform the STA of an information on a start timing point of total PS-Poll interval and an order information of a PS-Poll of each STA indicated by a TIM through a TIM element. In this case, each STA can obtain a location of its PS-Poll interval by checking an order of its PS-Poll interval from the start timing point of the total PS-Poll interval using the PS-Poll order information. If a length of a PS-Poll interval of each STA is fixed or the corresponding STA can be aware of the length of the PS-Poll interval implicitly, and if a start timing point of total PS-Poll interval is fixed (e.g., if the total PS-Poll interval starts directly from a timing point designated after a beacon reception), the AP can announce the order information of the PS-Poll of each STA indicated by a TIM through a TIM element.

Alternatively, an STA can obtain a location information of its PS-Poll interval implicitly through a TIM element. For instance, assuming that STA 1, STA 2 and STA 3 are sequentially indicated by a partial virtual bitmap field of the TIM element and that the PS-Poll order corresponds to an ascending order of a bitmap, the STA can have its own interval in order of STA 1, STA 2 and STA 3. Thus, as mentioned in the above description, the PS-Poll order of each STA can be previously determined by a system in a manner of having an ascending or descending order in accordance with the order of the bitmap. Alternatively, each STA may be able to calculate its own PS-Poll order using a bitmap order based on a predetermined specific permutation.

Thus, one STA is able to obtain a location of its PS-Poll interval and a location of a PS-Poll interval of another STA based on information contained in a TIM. Having confirmed the location of its own PS-Poll interval, the corresponding STA is able to perform a PS-Poll operation. Moreover, an STA checks whether a medium is busy during PIFS at a start timing point of its own PS-Poll interval. If the medium is in idle status, the STA can transmit a PS-Poll to an AP. If a channel is busy during the PIFS at the start timing point of the PS-Poll interval, the STA can defer a PS-Poll frame transmission in its own PS-Poll interval. Thereafter, if the STA confirms that the medium is in idle status, the STA can transmit the deferred PS-Poll frame to the AP. In doing so, since the rest of STAs are not in their own PS-Poll intervals, they can operate in sleep state.

If the AP receives the PS-Poll frame from the corresponding STA in the PS-Poll interval, the AP transmits an ACK frame to the corresponding STA after SIFS. If the AP fails in correctly receiving the PS-Poll frame from the corresponding STA in the PS-Poll interval, the AP can transmit a frame containing NACK or an ACK frame to the corresponding STA. In this case, the NAC or ACK frame can include an NDP frame.

For clarity of the following description, assume that an STA is able to implicitly obtain a location of its own PS-Poll interval through a TIM element.

If a $1^{st}$ PS-Poll interval in a corresponding beacon period starts directly after a beacon reception, a PS-Poll interval of one STA can be determined as Formula 13 in the following.

PS-Poll interval=SIFS(or PIFS)+PS-Poll transmission time+SIFS+ACK transmission time+2*Air Propagation Delay     [Formula 13]

Unlike Formula 13, If a $1^{st}$ PS-Poll interval in a corresponding beacon period starts directly after SIFS or PIFS after a beacon reception, a PS-Poll interval of one STA can be determined as Formula 14 in the following.

PS-Poll interval=PS-Poll transmission time+SIFS+ACK transmission time+SIFS(or PIFS)+2*Air Propagation Delay     [Formula 14]

If an NDP PS-Poll frame and an NDP ACK frame are used, a PS-Poll interval of one STA can be determined as Formula 15 in the following.

2*NDP frame transmission time+SIFS(or PIFS)+ SIFS+2*Air Propagation Delay     [Formula 15]

Total PS-Poll interval can be determined as Formula 16 in the following.

(SIFS(or PIFS)+PS-Poll transmission time+SIFS+ ACK time)*$N$+2*Air Propagation Delay*$N$, or(2*NDP frame transmission time+SIFS(or PIFS)+ SIFS)*$N$+2*Air Propagation Delay*$N$     [Formula 16]

In Formula 16, the N means the total number of STAs set to 1 in a TIM bitmap, i.e., STAs that will perform PS-Poll.

In the present specification, for clarity of the following description, a PS-Poll interval of one STA can be determined as Formula 13.

Thereafter, each of the STAs having performed the PS-Poll in their PS-Poll interval switches to an awake state to receive data from an AP after the total PS-Poll interval.

Figure 29:
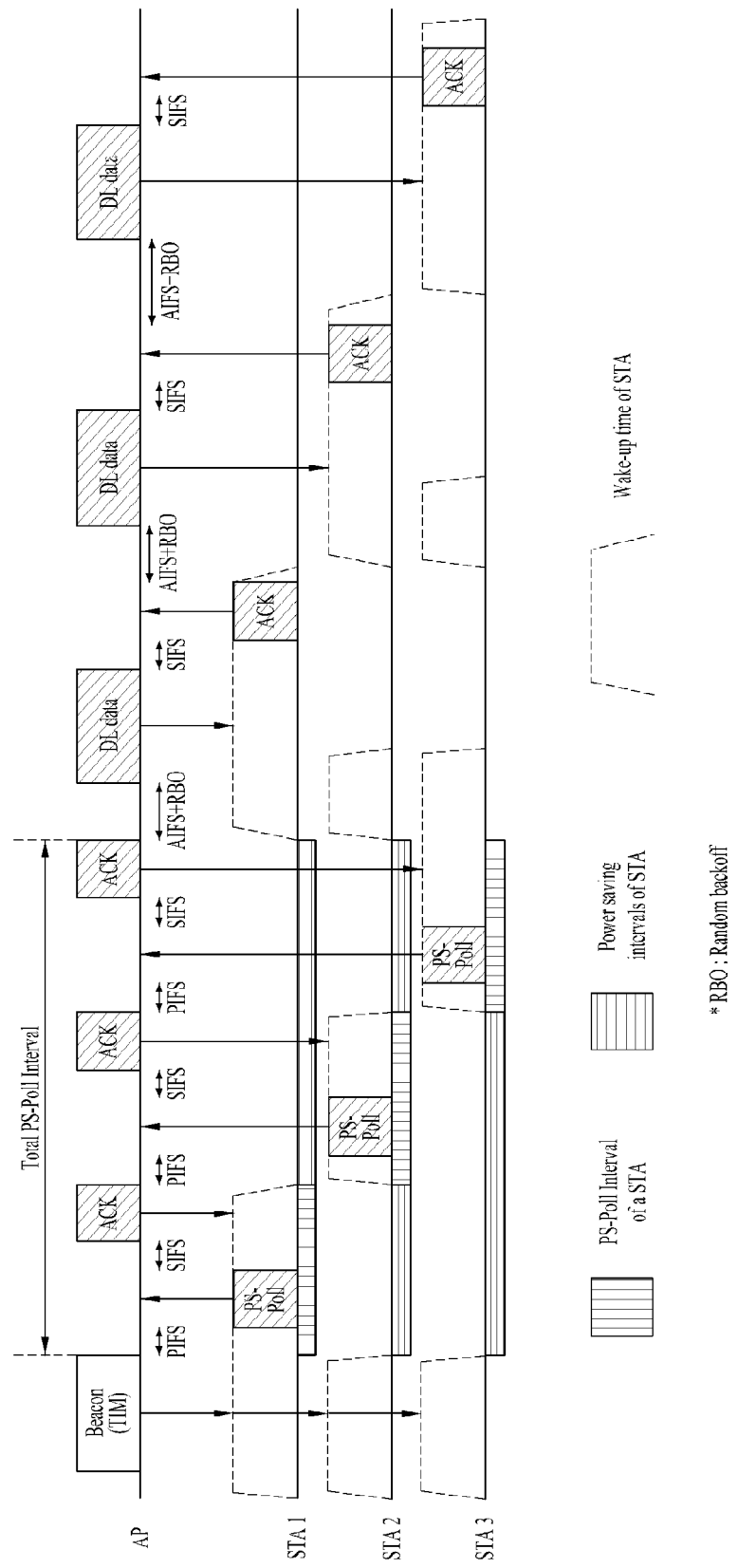
FIGS. 29 to 34 are diagrams to describe a channel access operation of STA according to one embodiment of the present invention.

FIG. 29 is a diagram to describe a channel access operation of an STA according to one embodiment of the present invention.

In FIG. 29, assume that an AP retains data frames for an STA 1, an STA 2 and an STA 3. And, assume that such a fact is announced to the STA 1, the STA 2 and the STA 3 through a TIM element of a beacon frame.

Referring to FIG. 29, if 3 STAs (STA 1, STA 2 and STA 3) are sequentially indicated by a TIM of a beacon, each of the STAs can have a PS-Poll interval configured in order of the STA 1, the STA 2 and the STA 3. And, each of the STAs can obtain a location of its own PS-Poll interval based on an information contained in the TIM.

First of all, a PS-Poll interval of the STA 1 starts after a reception of a beacon. Having received the beacon, the STA 1 corresponding to a $1^{st}$ STA confirms an idle status of a medium during PIFS and then transmits a PS-Poll frame to an AP. Since each of the STAs is able to know its own PS-Poll interval, the rest of the STAs except the STA performing a $1^{st}$ PS-Poll switches to a sleep state after the beacon reception and are then able to maintain the sleep state until their own PS-Poll intervals, respectively. In FIG. 29, each of the STA 2 and the STA 3 switches to the sleep state after the beacon reception and then maintain the sleep state until its own PS-Poll interval. After receiving the PS-Poll frame from the STA 1, the AP transmits an ACK frame after SIFS. And, the PS-Poll interval for the STA 1 ends. The STA except the STA (e.g., STA 3) performing a last PS-Poll switches to the sleep state at an end timing point of its own PS-Poll interval and is then able to maintain the sleep state until an end point of total PS-Poll interval. In FIG. 29, the STA 1 switches to the sleep state at an end timing point of its own PS-Poll interval and then maintains the sleep state until the end timing point of the total PS-Poll interval.

A PS-Poll interval of the STA 2 starts from an interval right next to the PS-Poll interval of the STA 1 (i.e., after a time of an ACK frame transmission to the STA 1). If the STA 2 switches to an awake state and then confirms a busy status of a medium during PIFS, the STA 2 transmits a PS-Poll frame to the AP. After receiving the PS-Poll frame from the STA 2, the AP transmits an ACK frame after SIFS. And, the PS-Poll interval for the STA 2 ends. Like the STA 1, the STA 2 switches to the sleep state at an end timing point of its own PS-Poll interval and then maintains the sleep state until the end timing point of the total PS-Poll interval.

A PS-Poll interval of the STA 3 starts from an interval right next to the PS-Poll interval of the STA 2 (i.e., after a time of an ACK frame transmission to the STA 2). If the STA 3 switches to an awake state and then confirms a busy status of a medium during PIFS, the STA 3 transmits a PS-Poll frame to the AP. After receiving the PS-Poll frame from the STA 3, the AP transmits an ACK frame after SIFS. Since the STA 3 is a last STA (i.e., an timing point of its own PS-Poll interval is equal to an end timing point of the total PS-Poll interval), the STA 3 does not switch to the sleep state but maintains the awake state.

After the end of the total PS-Poll interval, the AP transmits data to each of the STAs. Each of the STAs (except the last STA) switches to the awake state at the end timing point of the total PS-Poll interval and then performs a CCA to receive the data from the AP. The last STA (i.e., the STA 3) maintains the awake state from its own PS-Poll interval and performs the CCA. The AP is able to transmit the data to each of the STAs by performing a contention based on a random backoff period. In other words, the AP selects a backoff count value for each STA and is then able to transmit data to an STA having a smallest backoff count value to an STA having a greatest backoff count value in order of backoff count value. In the example shown in FIG. 29, the STA 1 has a smallest backoff count value, the STA 3 has a greatest backoff count value, and the STA 2 has a backoff count value between the smallest and the greatest. The AP confirms that a medium is in idle status during AIFS, counts down a backoff slot, and then transmits a data frame to the STA 1. The STA is able to check whether the data frame is a data frame toward the corresponding STA through a preamble (e.g., a partial AID of an SIG field) of the data frame transmitted from the AP. In particular, the STA 1 confirms that the transmitted data frame is the data frame toward the STA 1 and decodes the corresponding data frame. In doing so, each of the rest of the STAs (i.e., STA 2, STA 3) confirms that the transmitted data is not the data frame toward the corresponding STA and is then able to switch to a sleep mode. The STA can obtain a length of an MPDU of the data frame transmitted from the AP through a preamble (e.g., a length of SIG field) of the corresponding data frame. In particular, each of the STAs, which switched to the sleep mode by confirming that the transmitted data frame was not the data frame toward the corresponding STA, can switch to the awake state by considering a length of an MPDU of other STA.

Having received the data frame from the AP, the STA 1 transmits an ACK frame to the AP after SIFS. At a timing point of transmitting the ACK frame to the AP from the STA 1, i.e., at an end timing point of a data transmission from the AP to the STA 1, each of the STA 2 and the STA 3 switches to the awake state from the sleep state and then receives a data frame from the AP on the basis of contention.

On the other hand, an AP may be able to transmit data frames to STAs on the basis of non-contention. For instance, in a PS-Poll interval of each STA, the AP can transmit a scheduling information to the corresponding STA. In this case, after the STA has received an ACK frame for a PS-Poll frame from the AP in its own PS-Poll interval, the STA can wait for a scheduling information on a downlink data transmission from the AP after an end of total PS-Poll interval. The STA is then able to receive data using the obtained scheduling information. Thus, when the STA obtains the scheduling information from the AP, the STA is able to minimize power consumption by switching to a sleep state until a downlink data transmission timing point.

Moreover, the AP is able to directly transmit data to a last STA, which performs a PS-Poll, without an ACK frame transmission for the PS-Poll, which is described with reference to FIG. 30 as follows.

Figure 30:
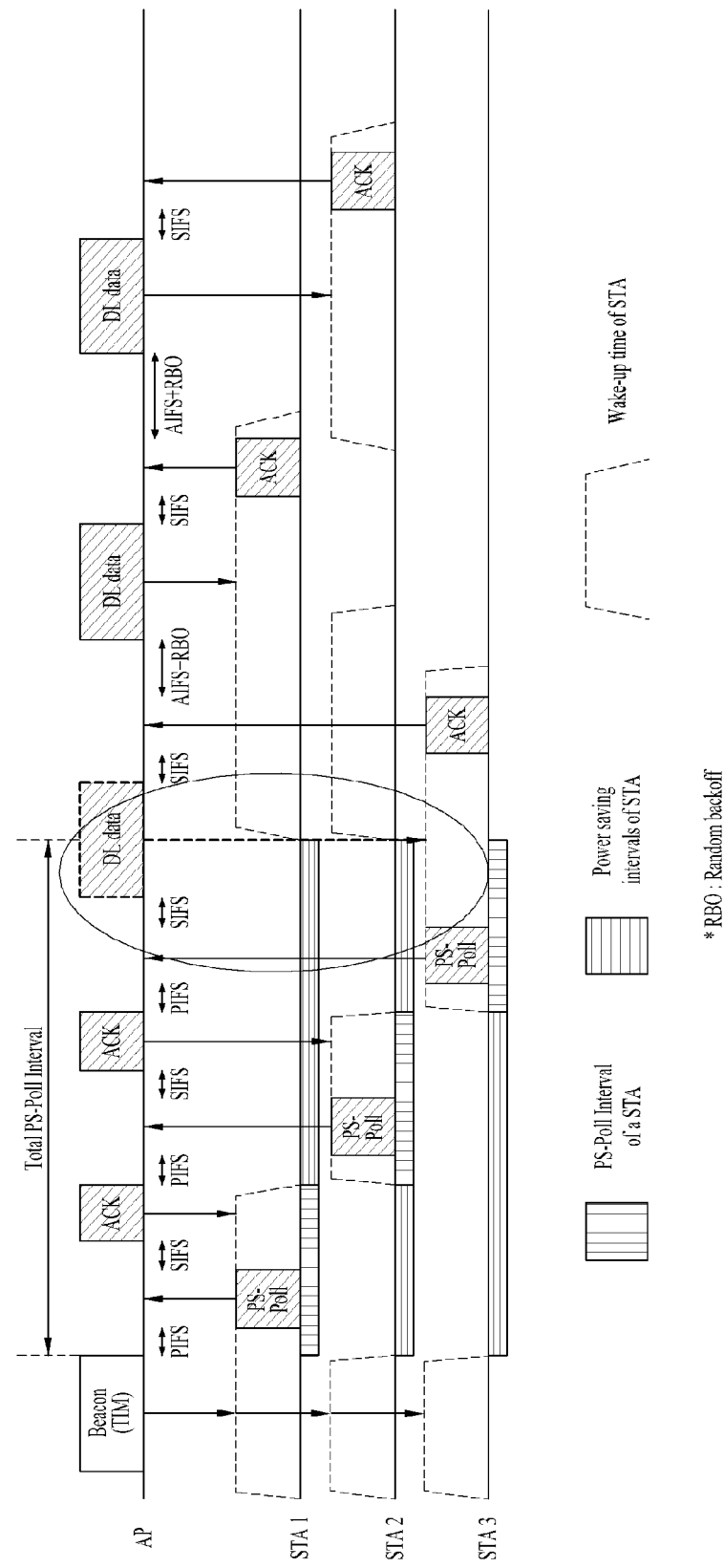

FIG. 30 is a diagram to describe a channel access operation of an STA according to one embodiment of the present invention.

In the example shown in FIG. 30, an operation for each STA to transmit a PS-Poll frame to an AP in its own PS-Poll interval is identical to that shown in FIG. 29.

Referring to FIG. 30, after an AP has received a PS-Poll frame from an STA 3 corresponding to a last STA, if the AP confirms that the STA 3 is the last STA, the AP does not transmit an ACK frame for the PS-Poll frame but transmits a data frame to the STA 3 after SIFS.

After total PS-Poll interval has ended, the AP can transmit data to the rest of STAs except the last STA (i.e., STA 3). And, the rest of the STAs except the last STA can switch to an awake state at an end timing point of the total PS-Poll interval. In this case, since each of the STA 1 and the STA 2 switches to the awake state in the course of transmitting the data frame to the STA 3 (i.e., at the end timing point of the total PS-Poll interval), it may be unable to check a preamble of the data frame transmitted to the STA 3. Hence, each of the STA 1 and the STA 2 maintains the awake state. Thereafter, after confirming that the corresponding frame is destined to the STA 1 through the preamble of the data frame transmitted from the AP, the STA 1 decodes the corresponding data frame and the STA 2 can switch to the sleep state again.

FIG. 30 just shows one example that each of the STA 1 and the STA 2 maintains the awake state by switching to the awake state at the end timing point of the total PS-Poll interval until receiving the data frame from the AP. Yet, after the rest of the STAs have switched to the awake state at the end timing point of the total PS-Poll interval, they switch to the sleep state if confirming a busy status of a medium. Subsequently, the rest of the STAs switch to the awake state again at an end timing point of the medium occupation and may be able to check whether data frames are transmitted to the corresponding STAs, respectively.

An AP can transmit data to the rest of STAs except a last STA by performing a contention based on a random backoff period. An operation for the AP to transmit the data to the rest of the STAs except the last STA is identical to that of the example shown in FIG. 29 and its details shall be omitted from the following description.

Moreover, an AP can transmit a data frame to an STA having a delay sensitive packet most preferentially after a lapse of total PS-Poll interval. This is described in detail with reference to FIG. 31 as follows.

Figure 31:
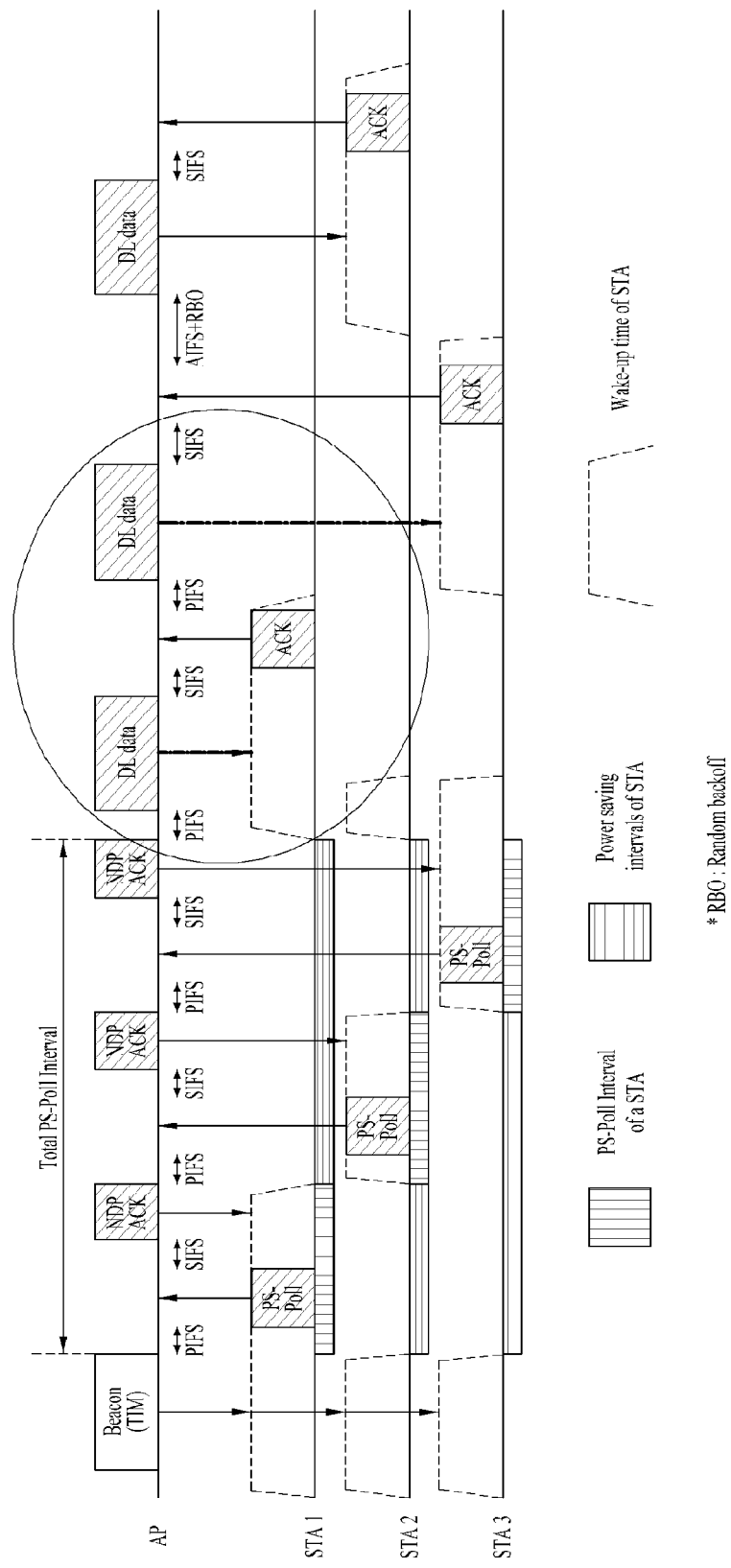

FIG. 31 is a diagram to describe a channel access operation of an STA according to one embodiment of the present invention.

In the example shown in FIG. 31, an operation for each STA to transmit a PS-Poll frame to an AP in its own PS-Poll interval is identical to that shown in FIG. 29.

Referring to FIG. 31, after total PS-Poll interval, an AP stands by for PIFS (or SIFS) and is then able to transmit a data frame to a delay-sensitive data frame transmitted STA among polled STAs directly without a random backoff procedure. In particular, data can be transmitted without contention. This can prevent a delay-sensitive packet transmission delay according to a random backoff based data transmission operation with a long slot time. Of course, in this case, a contention-based data transmission can be performed on an STA not having a delay sensitive packet like the former example shown in FIG. 29 or FIG. 30. In this case, an end timing point of the total PS-Poll interval may correspond to a timing point of transmitting a response to an STA that has performed a last PS-Poll. For instance, in case of the former example shown in FIG. 29, the end timing point of the total PS-Poll interval may mean a timing point of transmitting (NDP) ACK frame to the STA having performed the last PS-Poll. For another instance, in case of the former example shown in FIG. 30, the end timing point of the total PS-Poll interval may mean a timing point of transmitting a data frame to the STA having performed the last PS-Poll. In FIG. 31, the end timing point of the total PS-Poll interval corresponds to a timing point of transmitting (NDP) ACK frame to the STA 3 having performed the last PS-Poll. And, FIG. 31 shows one example that after the total PS-Poll interval, the AP transmits downlink data frames for the STA 1 and the STA 3 right after PIFS. Since the STA 2 does not have a delay sensitive packet, the data transmission to the STA 2 can be performed by a contention based mechanism (i.e. AIFS+Random backoff) like the former example shown in FIG. 29 or FIG. 30.

Meanwhile, it may happen that all STAs designated to TIM are unable to receive the TIM. For instance, interference due to OBSS (overlapping BSS) transmission may happen or an STA may miss the TIM. In this case, the STA failing to receive the TIM is unable to transmit a PS-Poll frame in its own PS-Poll interval. And, it may happen that the AP fails in receiving a PS-Poll frame despite that the STA transmits the PS-Poll frame correctly. In such case, an operation between the AP and the STA is described in detail with reference to FIG. 32 as follows.

Figure 32:
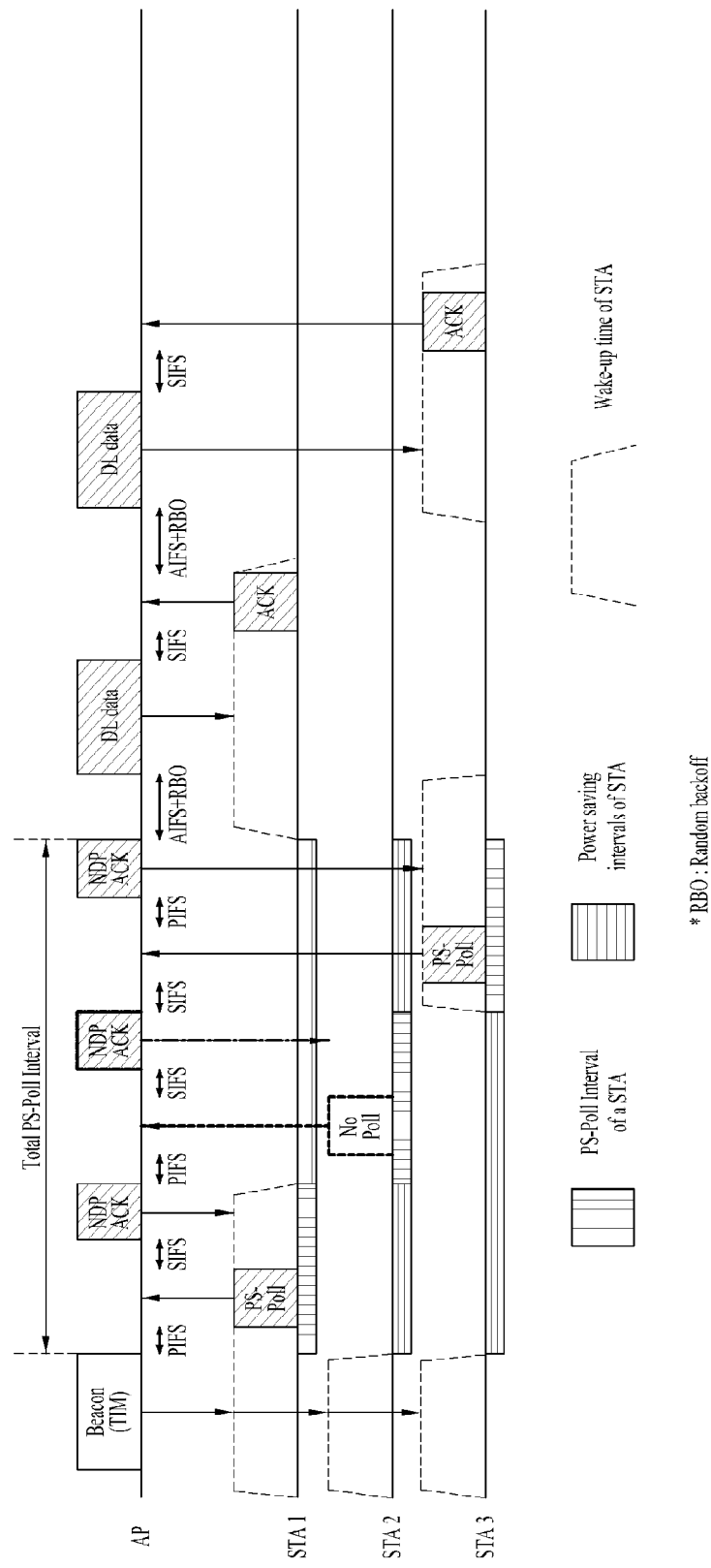

FIG. 32 is a diagram to describe a channel access operation of an STA according to one embodiment of the present invention.

In the example shown in FIG. 32, an operation for each STA to transmit a PS-Poll frame to an AP in its own PS-Poll interval is identical to that shown in FIG. 29.

Referring to FIG. 32, a case that an AP is unable to receive a PS-Poll frame from an STA 2 is illustrated. If the AP fails in receiving a PS-Poll from each STA on a PS-Poll transmission time in a determined PS-Poll interval of the corresponding STA, the AP transmits an unsolicited NDP frame to the corresponding STA after SIFS. A timing point of transmitting the unsolicited NDP frame may be equal to a timing point (PIFS+PS-Poll Transmission Time+SIFS) of transmitting (NDP) ACK frame on the assumption of a case that the corresponding STA normally transmits the PS-Poll. In this case, the unsolicited NDP frame may have a configuration of one of (NDP) ACK frame, new NDP frame and new MAC frame used in FIGS. 29 to 31. And, the unsolicited NDP frame may contain ACK, NACK or non-polling (no polling) indication. Thus, although the AP fails in receiving a PS-Poll frame at a determined timing point from a determined STA, the AP can prevent intervention into a PS-Poll interval by another STA (e.g., a hidden node) by transmitting NDP frame (or new frame).

Having received the NDP frame containing the ACK, NACK or non-polling (no polling) indication, the STA can perform a contention-based PS-Poll. In this case, the STA can use an extended slot time. While a medium is occupied by each of the STAs (e.g., STA 1, STA 3) in a PS-Poll interval assigned to the corresponding STA [not shown in FIG. 32-, although three is another STA failing to receive the TIM, since the AP transmits the NDP frame containing the NACK or non-polling (no polling) indication in the PS-Poll interval of the corresponding STA, the STA having received the NDP frame containing the NACK or non-polling (no polling) indication is able to eventually perform the contention-based PS-Poll after the total PS-Poll interval.

Thus, in case that a slot time is determined as an extended slot time according to Formula 12, like the example shown in FIG. 32, it is able to prevent the intervention of another STA in the corresponding PS-Poll interval by transmitting the NDP frame. Yet, in case that the slot time does not have the extended slot time, the example shown in FIG. 32 may not apply thereto. For instance, when a slot time is equal to a PS-Poll frame time, if intervention of another STA occurs for a time of (PIFS+PS-Poll Transmission Time+SIFS), it may not be able to prevent the intervention of another STA through the example shown in FIG. 32. Yet, in this case, since an STA indicated through a TIM element of a beacon frame performs a PS-Poll using its own PS-Poll interval and STAs not indicated by the TIM element can obtain total PS-Poll interval from the bitmap number of the TIM element or a value of a duration field of a MAC header of the beacon, the AP does not attempt a channel access in the total PS-Poll interval, thereby preventing the above-mentioned problem from being caused.

Meanwhile, when an STA receives a TIM and attempts to perform a PS-Poll in a designated PS-Poll interval, a channel may be occupied (or busy). Such a status shall be described in detail with reference to FIG. 33 as follows.

Figure 33:
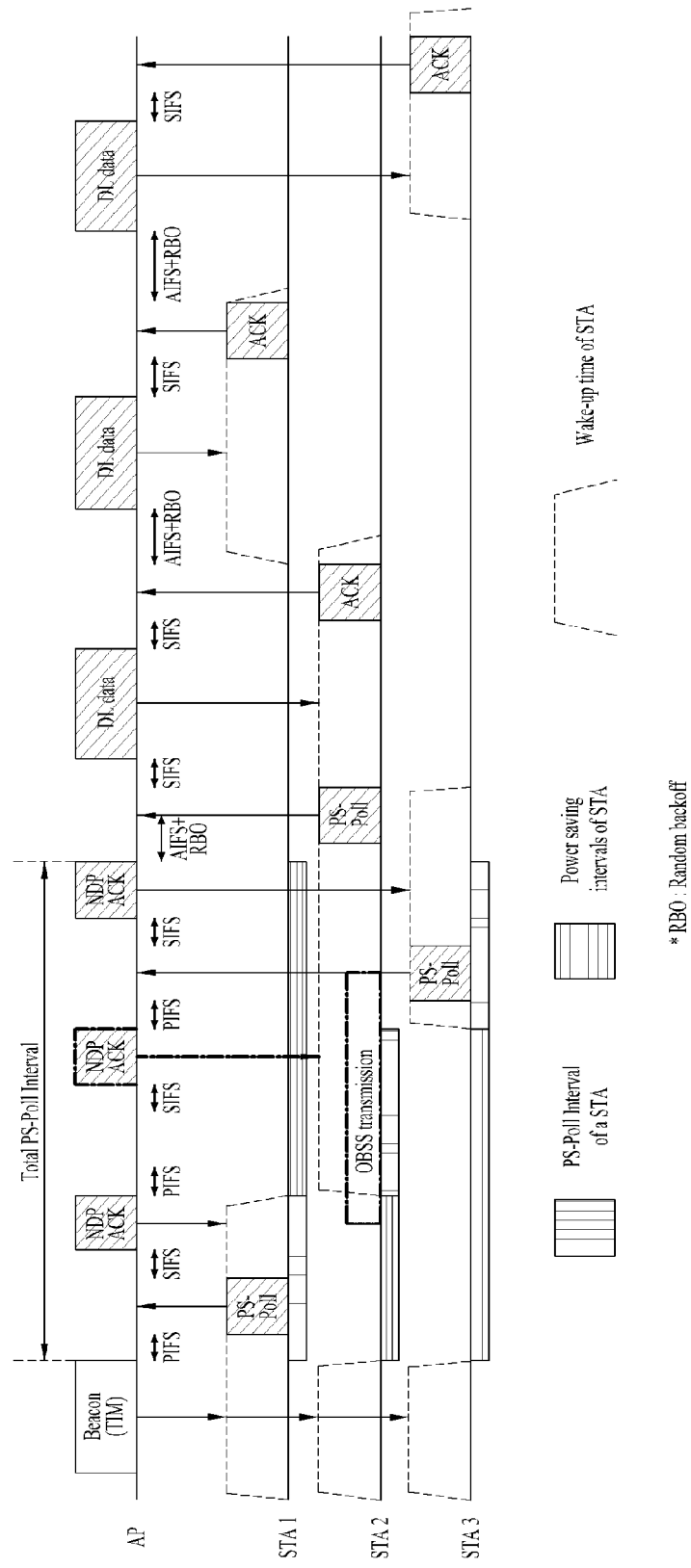

FIG. 33 is a diagram to describe a channel access operation of an STA according to one embodiment of the present invention.

In the example shown in FIG. 33, an operation for each STA to transmit a PS-Poll frame to an AP in its own PS-Poll interval is identical to that shown in FIG. 29.

Referring to FIG. 33, when an STA receives a TIM and attempts to perform a PS-Poll in a PS-Poll interval designated to the corresponding STA, a channel may be in a busy status. In particular, FIG. 33 shows one example of a status that a channel is occupied by a transmission of OBSS (overlapping BSS) when a STA 2 attempts a PS-Poll. In this case, when the STA 2 attempts the PS-Poll in its own PS-Poll interval, if the STA 2 determines that the channel is occupied (due to the OBSS transmission), the STA 2 defers the PS-Poll transmission until the channel enters an idle status. If the channel is idle during AIFS, the STA 2 attempts the PS-Poll transmission again. In particular, the corresponding STA does not transmit a PS-Poll frame in the PS-Poll interval designated to the corresponding STA but attempts the PS-Poll transmission by an existing contention-based (AIFS+Random backoff) using an extended slot time. In particular, in this case, as mentioned in the foregoing description with reference to FIG. 32, since a PS-Poll interval is designated to each polled STA in total PS-Poll interval, the corresponding STA can perform the PS-Poll on the basis of contention after the total PS-Poll interval.

Meanwhile, the AP may be able to transmit an STF instead of the (NDP) ACK frame used in the examples shown in FIGS. 29 to 33. As the STF is used instead of the (NDP) ACK frame, the (NDP) ACK frame can be transmitted after the total PS-Poll interval.

In this case, a PS-Poll interval of each STA can be determined as Formula 17 in the following.

PS-Poll interval=PIFS (or SIFS)+PS-Poll transmission+SIFS+STF+2*Air Propagation Delay   [Formula 17]

At a timing point (e.g., after (PIFS/SIFS+PS-Poll Transmission Time+SIFS)) designated in a PS-Poll interval of each STA, the AP transmits the STF instead of the (NDP) ACK frame. The STF transmitted by the AP performs a function of informing other STAs that a channel is occupied by a designated STA in a designated PS-Poll interval, thereby prohibiting an intervention by a hidden node STA. Since a size of the STF is smaller than that of an existing ACK frame or an NDP frame, a size of the total PS-Poll interval may decrease. Therefore, STA's power consumption can be reduced.

The total PS-Poll interval can be determined as Formula 18 in the following.

Total PS Poll Interval=(PIFS(or SIFS)+PS-Poll transmission time+SIFS+STF time)*N+2*Air Propagation Delay*N   [Formula 18]

In Formula 18, the N means the total number of STAs set to 1 in a TIM bitmap, i.e., STAs that will perform the PS-Poll.

If a PS-Poll frame includes an NDP frame, the total PS-Poll interval can be determined as Formula 19 in the following.

Total PS Poll Interval=(PIFS(or SIFS)+NDP frame transmission time+SIFS+STF time)*N+2*Air Propagation Delay*N   [Formula 19]

Figure 34:
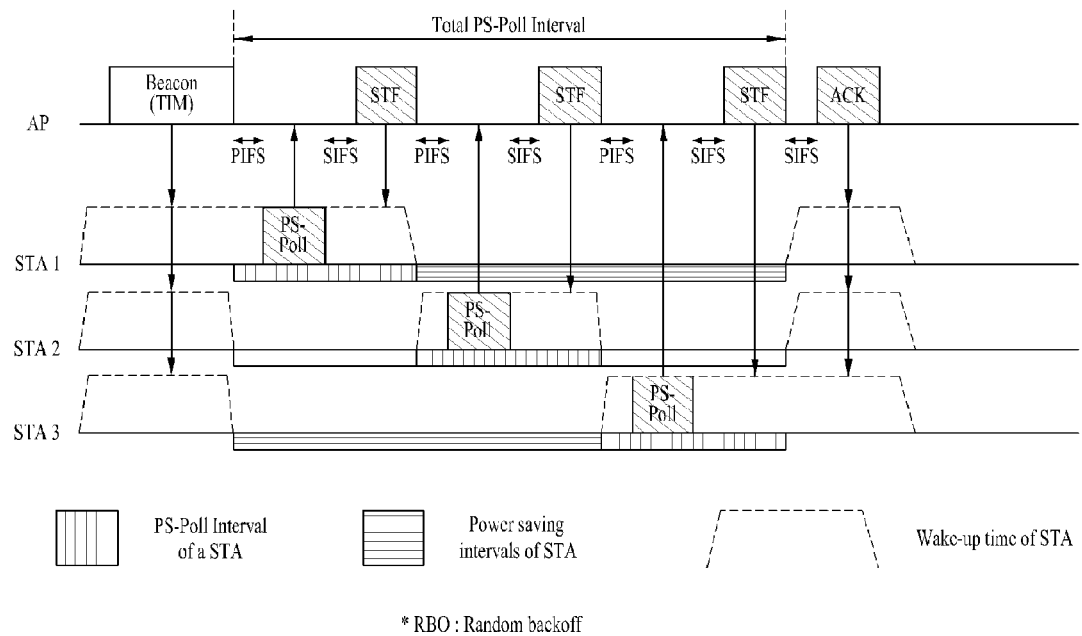

FIG. 34 is a diagram to describe a channel access operation of an STA according to one embodiment of the present invention.

In the example shown in FIG. 34, an operation for each STA to transmit a PS-Poll frame to an AP in its own PS-Poll interval is identical to that shown in FIG. 29 except that the AP transmits an STF instead of (NDP) ACK frame in response to the PS-Poll frame.

Referring to FIG. 34, after an end of a total PS-Poll interval, an AP transmits an ACK frame to all STAs. Each of the STAs (except a last STA) switches to an awake state at an end timing point of the total PS-Poll interval and then performs a CCA to receive the ACK frame from the AP. The last STA (i.e., STA 3) maintains the awake state from its own PS-Poll interval and performs the CCA. If the AP receives PS-Poll frames from all STAs indicated by TIM, the AP is able to transmit a single ACK frame by broadcast. In doing so, the ACK frame can be transmitted in format of an existing ACK frame or an NDP ACK frame. Yet, if the AP fails in receiving the PS-Poll frames from all STAs indicated by the TIM, the AP can transmit an ACK frame per STA or can transmit a group ACK frame containing a bitmap information indicating an ACK per STA by broadcast. Hereinafter, such a group ACK frame may be named a PS-Poll Group ACK (PPGA) frame.

After the AP has transmitted the ACK frame to all STAs, the AP transmits data to each of the STAs after the transmission of the ACK frame [not shown in FIG. 34]. Subsequently, each of the STAs performs CCA to receive the data from the AP. In particular, the AP can transmit the data to each STA by performing a contention based on a random backoff period. A process for each STA to receive data from an AP can be performed in the same manner according to the example shown in FIG. 29.

In the following description, the NDP ACK frame and the PPGA frame are explained in detail.

Figure 35:
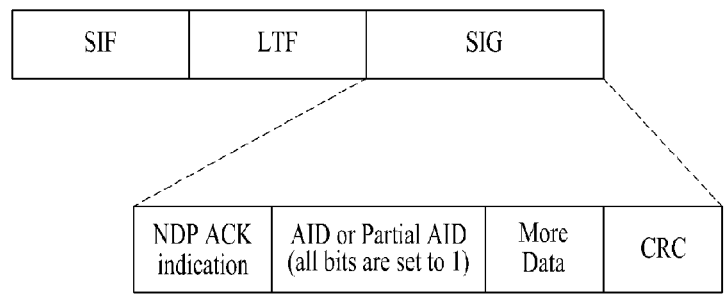
FIG. 35 is a diagram for one example of NDP ACK frame according to one embodiment of the present invention.

FIG. 35 is a diagram for one example of NDP ACK frame according to one embodiment of the present invention.

Referring to FIG. 34 and FIG. 35, an NDK ACK frame may include STF, LTF and SIG field. The SIG field may include an NDP ACK indication subfield, an AID (or partial AID) subfield, a more data subfield and a CRC subfield. In this case, each of the subfields corresponds to one example of subfield that can be included in the NDP ACK frame, may be substituted with a different subfield, or may further include an additional subfield.

The NDP ACK indication subfield indicates that a corresponding frame is an NDP ACK frame. Through the NDP ACK indication field, an STA can be informed of an ACK for a PS-Poll. The AID (or partial AID) subfield indicates an STA that receives a corresponding NDP ACK frame. The more data subfield indicates whether a buffered frame destined to an STA receiving a corresponding NDP ACK frame exists in an AP. And, the CRC subfield is used for the usage of error detection for the SIG field.

Like the example shown in FIG. 34, if an AP receives PS-Poll frames from all STAs indicated by a TIM, the AID (or partial AID) subfield can be set to a specific value (e.g., all bits set to 1 or 0) indicating multicast/broadcast in order to enable the STAs transmitting the PS-Poll to receive NDP ACK frame (i.e., in order to indicate that an ACK is transmitted by broadcast). After the STA has received the NDP ACK frame containing the AID (or partial AID) subfield set to the specific value, if the STA is the STA having performed the PS-Poll, the corresponding STA is able to check whether the received NDP ACK frame is a group ACK for the PS-Poll. In particular, when the STA receives the NDP ACK frame, if the AID indicates all STAs having performed the PS-Poll, each of the STAs having performed the PS-Poll determines that the received NDP ACK frame is the ACK transmitted to the corresponding STA and then reads the SIG field. On the contrary, each of the STAs not having performed the PS-Poll can ignore the corresponding NDP ACK frame.

On the other hand, unlike the example shown in FIG. 34, if the AP is unable to receive PS-Poll frames from all user equipments indicated by a TIM, the AP can transmit an NDP ACK frame for each STA having transmitted the PS-Poll frame. In this case, the AID (or partial AID) subfield can be set to an AID (or a partial ID) of the STA receiving the corresponding NDP ACK frame. And, the AP may be able to transmit a PS-Poll group ACJ (PPGA) frame to all STAs as follows.

Figures 36, 37:
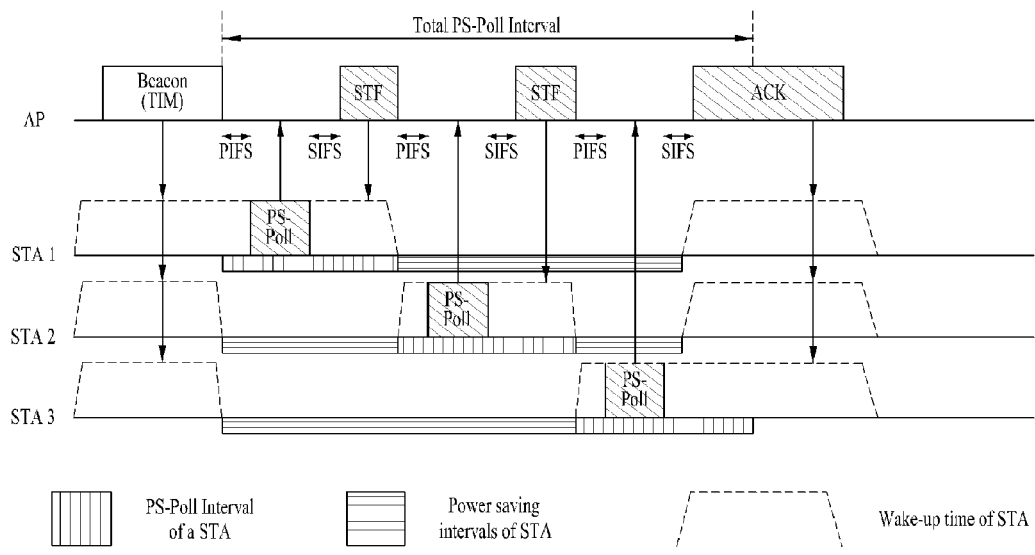
FIG. 36 is a diagram for one example of PS-Poll group ACK frame according to one embodiment of the present invention.
FIGS. 37 to 40 are diagrams to describe a channel access operation of STA according to one embodiment of the present invention.

FIG. 36 is a diagram for one example of PS-Poll group ACK frame according to one embodiment of the present invention.

Referring to FIG. 34 and FIG. 36, a PPGA frame shown in FIG. 36 (a) may include a frame control field, an AID field (or an RA (receiver address) field), a BSSID field, a bitmap size field, an ACK bitmap field, and a padding field. In case that the PPGA frame is configured by including the RA field, the RA field can have a size of 6 octets. In this case, each of the subfields corresponds to one example of subfield that can be included in the PPGA frame, may be substituted with a different subfield, or may further include an additional subfield.

A type subfield and a subtype subfield within the frame control field indicate that a corresponding frame is a group ACK. The AID field indicates an STA that receives a corresponding PPGA frame. In order to enable all STAs having performed PS-Poll to receive the PPGA frame, the AID (or RA) field can be set to a broadcast address (e.g., all bits set to 1 or 0). The bitmap size field indicates a size of the ACK bitmap field and is set to the number set to 1 in the TIM (i.e., the number of user equipments having performed PS-Poll). Namely, only the STA, which has read the TIM correctly and performed the PS-Poll, is able to read the ACK bitmap field. In case of the STA of which PS-Poll frame is received by the AP, the ACK bitmap field is set to 1. In case of the STA of which PS-Poll frame is not received by the AP, the ACK bitmap field is set to 0. In this case, the ACK bitmap field can be configured in the same order of a bitmap of TIM element.

Referring to FIG. 36 (b), a PPGA frame does not include the bitmap size field shown in FIG. 36 (a) and may include an ACK bitmap only. In this case, each user equipment having performed PS-Poll is able to calculate a size of the ACK bitmap in the PPGA frame through TIM information. For instance, the size of the ACK bitmap within the PPGA frame can be equal to that of a bitmap within TIM element.

Referring to FIG. 36 (c), a PPGA frame can include a compressed MAC header (or a new MAC header). And, the PPGA frame can be configured without AID (or RA field) shown in FIG. 36 (b). In this case, after a TIM has been received, each STA having performed a PS-Poll can recognize that a corresponding frame is a group ACK through a type subfield and a subtype subfield within a frame control field.

An AP is able to directly transmit (NDP) ACK frame or PPGA frame without transmitting STF in response to a last PS-Poll, which is described in detail with reference to FIG. 37 as follows.

FIG. 37 is a diagram to describe a channel access operation of an STA according to one embodiment of the present invention.

In the example shown in FIG. 37, an operation for each STA to transmit a PS-Poll frame to an AP in its own PS-Poll interval is identical to that shown in FIG. 29 except that an AP transmits an STF instead of (NDP) ACK frame in response to the PS-Poll frame.

Referring to FIG. 37, after an AP has received a PS-Poll frame from an STA 3 corresponding to a last STA, the AP transmits (NDP) ACK frame or PPGA frame instead of SIF right after SIFS. In this case, each STA having performed a PS-Poll (except the last STA) switches to an awake state at a timing point of (Total PS-Poll Interval–STF–SIFS) and then performs a CCA to receive an ACK from the AP. The last STA (i.e., STA 3) performs a CCA by maintaining an awake state from its own PS-Poll interval.

Meanwhile, as mentioned in the foregoing description, since all STAs designated to a TIM are unable to receive the TIM, it may happen that each of the STAs is unable to transmit a PS-Poll frame in its own PS-Poll interval. On the other hand, although an STA transmits a PS-Poll frame correctly, it may happen that an AP is unable to receive the PS-Poll frame. In such cases, like the former example that an AP transmits an unsolicited NDP frame, the AP can transmit an unsolicited STF, which is described in detail with reference to FIG. 38 as follows.

Figure 38:
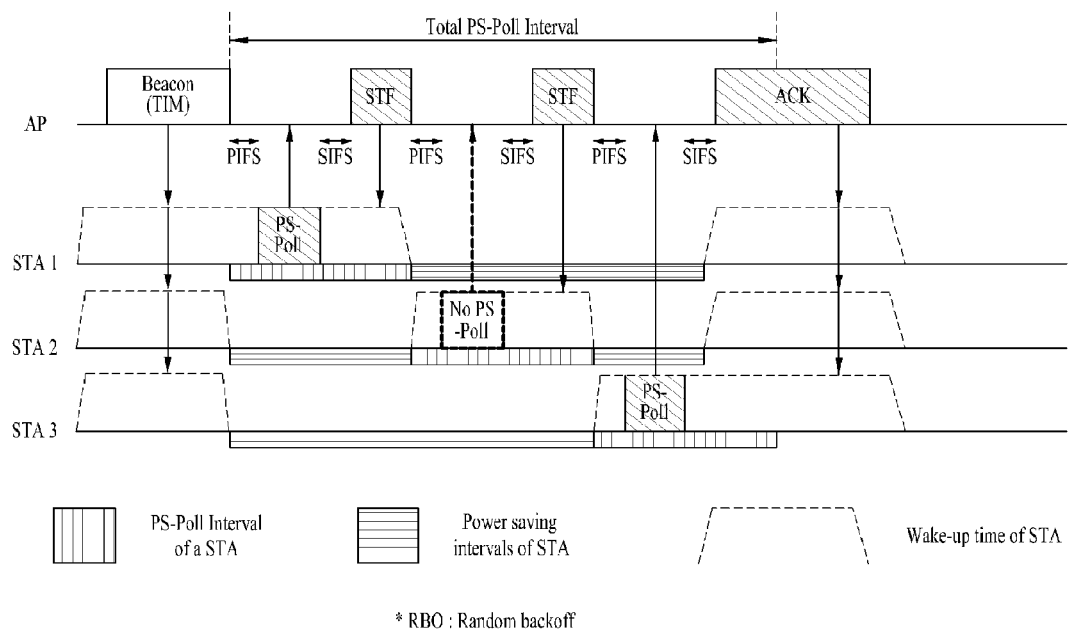

FIG. 38 is a diagram to describe a channel access operation of an STA according to one embodiment of the present invention.

In the example shown in FIG. 38, an operation for each STA to transmit a PS-Poll frame to an AP in its own PS-Poll interval is identical to that shown in FIG. 29 except that the AP transmits an STF instead of (NDP) ACK frame in response to the PS-Poll frame.

Referring to FIG. 38, a case that an AP is unable to receive a PS-Poll frame from an STA 2 is illustrated. If the AP fails in receiving a PS-Poll from each STA at a PS-Poll transmission time in a PS-Poll interval of the corresponding STA, the AP transmits an unsolicited STF to the corresponding STA after SIFS. A timing point of transmitting the unsolicited STF may be equal to a timing point (PIFS+PS-Poll Transmission Time+SIFS) of transmitting an STF on the assumption of a case that the corresponding STA transmits a PS-Poll normally. Thus, although an AP fails in receiving a PS-Poll frame at a determined timing point from a determined STA, the AP transmits an unsolicited STFD to prevent intervention in a PS-Poll interval by another STA (e.g., a hidden node).

Meanwhile, an unsolicited NDP frame or STF can be used for an AP to prevent a channel access by a different STA in situations as well as in a situation of the aforementioned example, which is described in detail with reference to FIG. 39 as follows.

Figure 39:
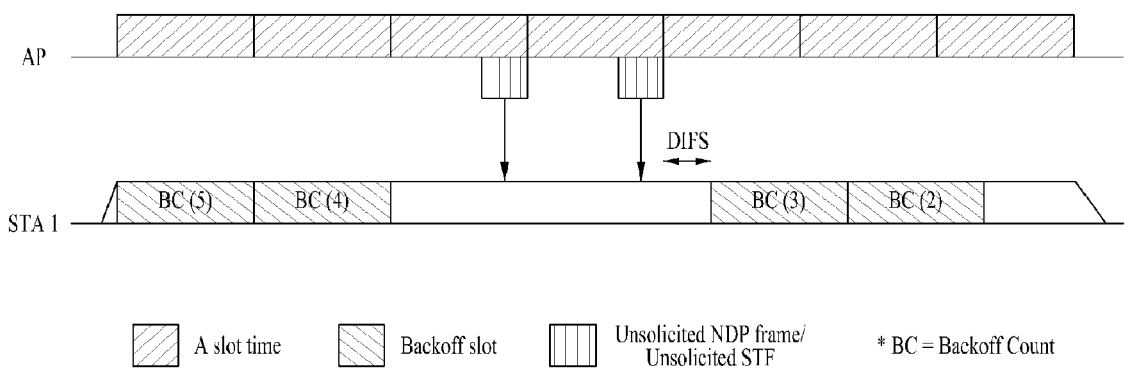

FIG. 39 is a diagram to describe a channel access operation of an STA according to one embodiment of the present invention.

Referring to FIG. 39, once a random backoff process is initiated to access a channel, an STA 1 monitors a medium continuously while counting down a backoff slot in accordance with a determined backoff count value. In order to prevent channel accesses by other STAs, an AP transmits an unsolicited NDP frame/STF in a specific slot. Since it is monitored that the medium is in a busy status in the slot in which the unsolicited NDP frame/STF is transmitted from the AP, the corresponding STA holds the countdown and stands by. If the medium enters an idle status during DIFS, the corresponding STA resumes the rest of the countdown. Thus, the AP transmits the unsolicited NDP frame/STF in the specific slot, thereby preventing channel accesses by arbitrary STAs.

Meanwhile, a PS-Poll interval is not configured for each STA indicated by a TIM element, a total PS-Poll interval is configured only, and a PS-Poll operation can be performed on the basis of contention. This is described in detail with reference to FIG. 40 as follows.

Figure 40:
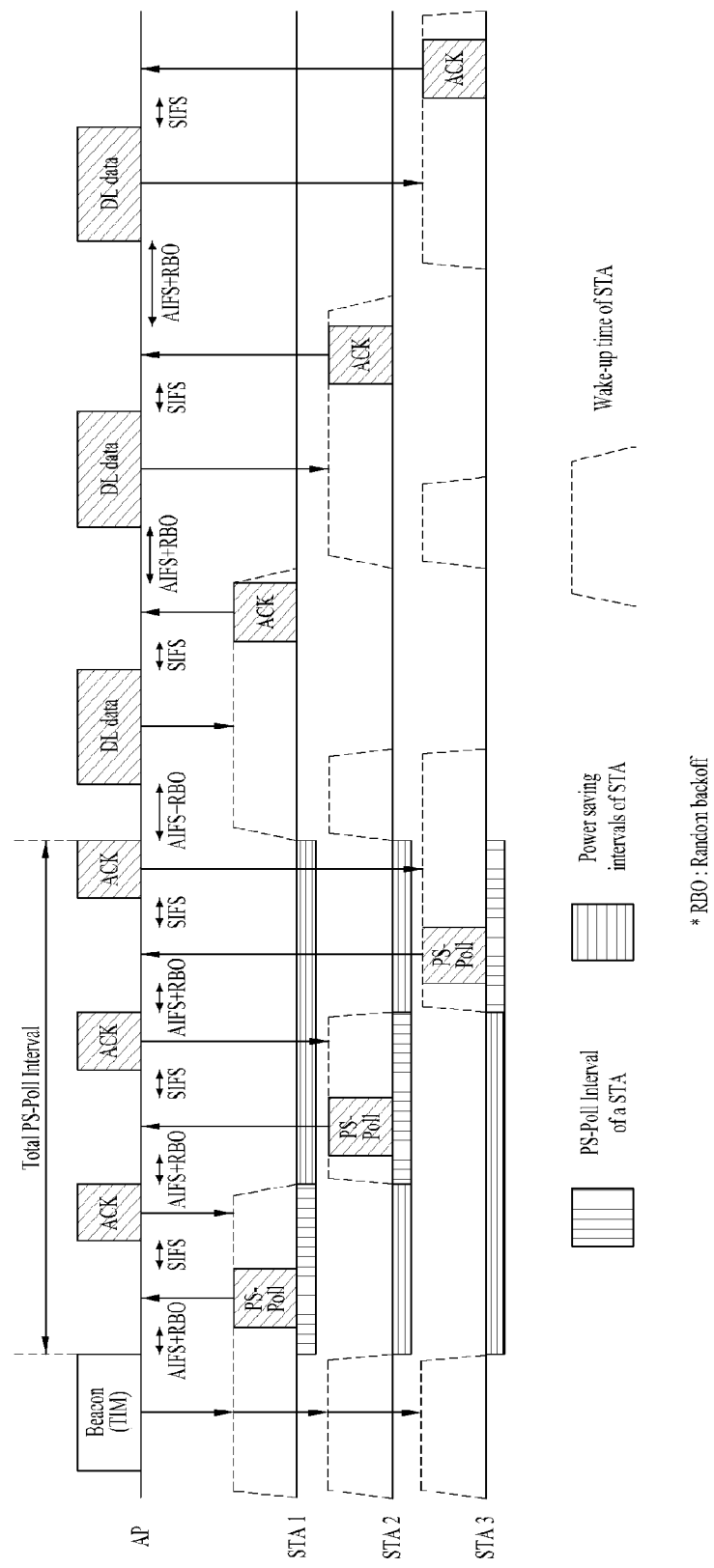

FIG. 40 is a diagram to describe a channel access operation of STA according to one embodiment of the present invention.

Referring to FIG. 40, only STAs (STA 1, STA 2, STA 3), which have checked that data destined to the corresponding STAs were saved in an AP through a TIM element, are able to contentionally perform PS-Poll operation in total PS-Poll interval. In doing so, the AP may be able to announce information on a length and location of the total PS-Poll interval to the STAs through TIM information. Yet, as mentioned in the foregoing description, the STA may be able to check the length and location of the total PS-Poll interval through a duration field of a beacon.

In the example shown in FIG. 40, the STA 1 selects a smallest backoff count value, the STA 3 selects a greatest backoff count value, and the STA 2 selects a backoff count value between the smallest and the greatest. After the STA 1 has received the beacon, if the STA 1 confirms that a medium is in idle status during AIFS, the STA 1 counts down a backoff slot and then transmits a PS-Poll frame to the AP. Thereafter, each of the STA 2 and the STA 3 transmits a PS-Poll frame to the AP in the same manner of the STA 1.

Figure 41:
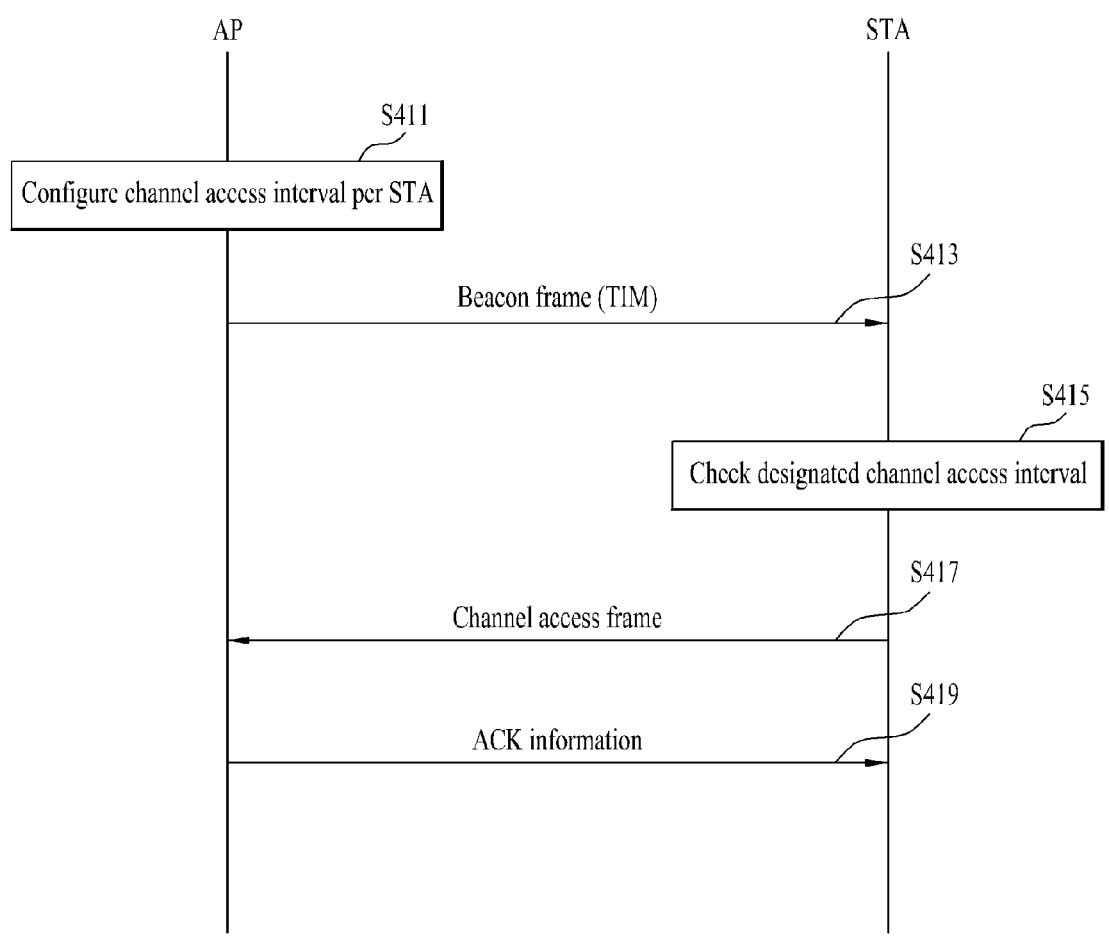
FIG. 41 is a diagram for one example of a channel access method according to one embodiment of the present invention.

FIG. 41 is a diagram for one example of a channel access method according to one embodiment of the present invention.

Referring to FIG. 41, an AP configures a channel access interval (e.g., a PS-Poll interval) of each STA having a downlink data designated thereto [S411].

The AP transmits a TIM element containing an information indicating a presence or non-presence of the downlink data, which is to be transmitted per STA in accordance with a beacon period, to STAs through a beacon frame [S413]. In this case, the TIM element can additionally include a location information of a channel access interval for each of the STAs having the downlink data designated thereto by the TIM element, a start timing point information of total channel access interval, a length information of the channel access interval, an order information of the channel access interval and the like.

The STA receives the beacon frame from the AP by switching to an awake state in accordance with a beacon transmission period and then checks a presence or non-presence of the downlink data designated to the corresponding STA and a channel access interval designated (assigned) to the corresponding STA through the TIM element within the received beacon frame [S415].

Subsequently, the STA transmits a channel access frame (e.g., a PS-Poll frame) to the AP in the channel access interval designated to the corresponding STA [S417]. The STA transmits the channel access frame to the AP by maintaining the awake state only in the channel access interval designated to the corresponding STA within the total channel access interval. In this case, an NDP PS-Poll frame format can be used for the channel access frame.

In response to the channel access frame received from the STA, the AP transmits an ACK frame to the STA [S419]. In particular, the ACK frame can be transmitted in the PS-Poll interval of each of the STAs or may be transmitted to all STAs after the total channel access interval. In this case, a format of an NDP ACK frame or a group ACK frame (e.g., a PPGA frame) can be used for the ACK frame. Thereafter, the AP transmits the stored data to each of the STAs.

In the following description, if a channel access interval (e.g., a PS-Poll interval) of each STA is configured. A method of informing an STA of the configured channel access interval is explained.

Figure 42:
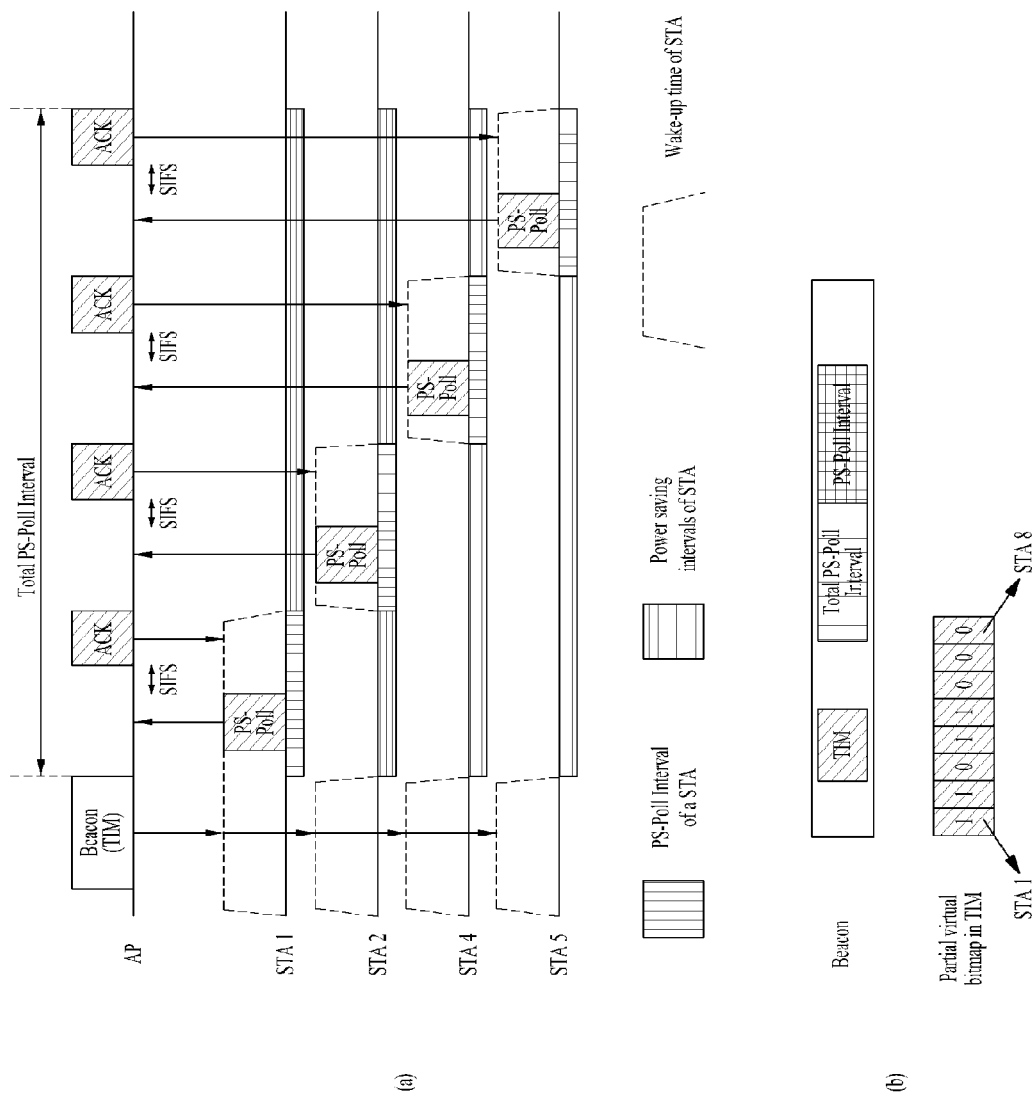
FIG. 42 is a diagram for another example of a channel access method according to one embodiment of the present invention.

In case that channel access interval (e.g., a PS-Poll interval) of an STA is configured, FIG. 42 shows one example of a method of informing the STA of the configured channel access interval. FIG. 42 (*a*) shows that 4 channel access intervals (e.g., PS-Poll intervals) for STA and a total PS-Poll interval are configured. FIG. 42 (*b*) shows a method of announcing such information.

In particular, referring to FIG. 42 (*b*), an AP is able to transmit a beacon frame in a manner that a PS-Poll interval information for each STA and a total PS-Poll interval information are contained in the beacon frame, by which the present invention may be non-limited. Moreover, unlike the drawing, a PS-Poll interval information for each STA and a total PS-Poll interval information can be transmitted in a manner of being contained in a TIM. The AP can announce that a configured PS-Poll interval is provided for which STA through a partial virtual bitmap contained in a TIM element. For instance, through the partial virtual bitmap shown in FIG. 42 (*b*), the AP can indicate that PS-Poll intervals for 4 STAs shown in FIG. 42 (*a*) are provided for STA 1, STA 2, STA 4 and STA 5, respectively. in other words, the STA 1, STA 2, STA 4 and STA 5 are paged by the partial virtual bitmap and locations of the PS-Poll intervals for the respective STAs can be determined in the STA paged order in the partial virtual bitmap. In the above example, if the total PS-Poll interval information is not transmitted, the total PS-Poll interval can be determined as (PS-Poll Interval for STA)*(Number of STAs Paged in Partial Virtual Bitmap). This is applicable to a case that a PS-Poll interval for each STA is provided for a single STA but is not applicable to a case that a PS-Poll interval is provided for two or more STAs.

As mentioned in the above description, when channel access intervals for STAs are configured, a method of informing a user equipment of the channel access interval configuration is useful to a case that STAs paged in TIM need to perform channel accesses only in their own channel access intervals, respectively. For instance, such method is appropriate for user equipments that should minimize power consumptions like a sensor type STA. Yet, if the STAs paged in the TIM include an offloading STA as well as the sensor type STA, they need to be identifiably indicated.

To this end, various kinds of methods are described as follows. In the following description, a channel access method according to a related art (i.e., an STA paged in TIM performs a contention and then transmits a PS-Poll frame) shall be named a $1^{st}$ type. And, a new channel access method (i.e., a PS-Poll is transmitted in a PS-Poll interval configured for each STA) shall be named a $2^{nd}$ type.

For another instance, when intervals for enabling STAs to access like a PS-Poll interval are assigned to STAs, an information (i.e., an indicator) indicating whether a channel access interval assigned to each of the STAs is provided for a sensor type STA or a offloading STA can be announced to the STAs in a manner of being contained in the assigned interval. If a sensor type is indicated by the corresponding indicator, the STAs use the new channel access method. If an offloading type is indicated, the STAs can perform PS-Poll transmission using an existing contention-based method.

According to a $1^{st}$ case, a sensor type STA and offloading STAs are included in a partial virtual bitmap of TIM. In this case, an AP can announce that an STA should perform a channel access through a method of a prescribed type through a $1^{st}$ bitmap indicating PS-Poll transmission types of STAs individually. In particular, through the $1^{st}$ bitmap, the AP can indicate that each STA indicating a presence of a buffered traffic in the TIM corresponds to a $1^{st}$ type or a $2^{nd}$ type. So to speak, the AP can transmit the $1^{st}$ bitmap (individual PS-Poll mode bitmap) for the user equipments, which are paged with reference to the partial virtual bitmap of the TIM, to STA. In the $1^{st}$ bitmap, bit 0 may indicate the $1^{st}$ type and bit 1 may indicate the $2^{nd}$ type. And, the $1^{st}$ bitmap can be transmitted in a manner of being contained in a beacon or a TIM IE of the beacon.

Figure 43:
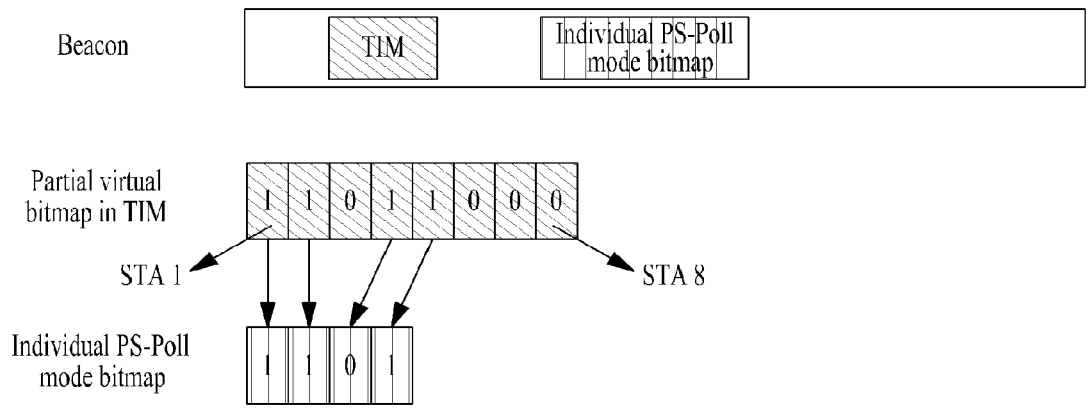

The $1^{st}$ bit mentioned in the above description is shown in FIG. 43. Referring to FIG. 43, a $1^{st}$ bitmap (individual PS-Poll mode bitmap) is transmitted through a beacon frame. An STA 1 checks a presence or non-presence of data buffered for the STA 1 through a partial virtual bitmap. The STA 1 checks the $1^{st}$ bitmap and is then able to transmit a PS-Poll frame in accordance with a bit value set to 1, i.e., a $2^{nd}$ type. In FIG. 43, an STA 4 transmits a PS-Poll frame in accordance with a $1^{st}$ type.

According to a $2^{nd}$ case, a partial virtual bitmap for at least one group/page exists in a beacon or TIM IE. And, STAs having the same attribute (e.g., sensor type STAs) are included per group/page.

In this case, an information related to a PS-Poll transmission type can be indicated per group through a $2^{nd}$ bitmap (group PS-Poll mode bitmap). In particular, the $2^{nd}$ bitmap can indicate that each group indicated as having a buffered traffic in the partial virtual bitmap corresponds to a $1^{st}$ type or a $2^{nd}$ type. In the $2^{nd}$ bitmap, a bit value set to 0 can indicate the $1^{st}$ type, while a bit value set to 1 can indicate the $2^{nd}$ type.

Figure 44:
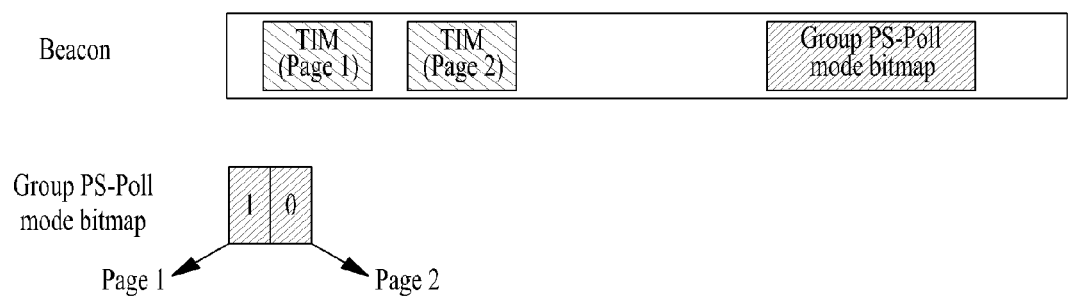

One example of the $2^{nd}$ bitmap mentioned in the above description is shown in FIG. 44. Referring to FIG. 44, if an STA receives a beacon, the STA is aware that a group to which the STA belongs is paged [page 1] and then checks the $2^{nd}$ bitmap (group PS-Poll mode bitmap). As a bit value corresponding to the page 1 in the $2^{nd}$ bitmap is set to 1, the STA transmits a PS-Poll frame in accordance with the $2^{nd}$ type.

The $2^{nd}$ bitmap mentioned in the above description can be transmitted in a manner of being contained in a beacon frame aside from a TIM for a group.

FIG. 45 shows another example of the $2^{nd}$ case. Referring to FIG. 45 (a), a PS-Poll mode indicator for a page is contained in a TIM. A group (page 2) having an indicator value set to 0 can transmit a PS-Poll in accordance with a $1^{st}$ type and a group (page 2) having an indicator value set to 1 can transmit a PS-Poll in accordance with a $2^{nd}$ type. FIG. 45 (b) shows one example that PS Poll mode information on a page is contained in a TIM. Referring to FIG. 45 (b), a bitmap control field and a partial virtual bitmap field are included in the TIM. And, the partial virtual bitmap consists of at least one or more blocks. The bitmap control field includes a page index (group information) and a PS-Poll transmission type information (i.e., PS-Poll mode indicator) for the corresponding page. If a PS-Poll type field is set to 1, it operates as a $1^{st}$ type. If a PS-Poll type field is set to 0, it operates as a $2^{nd}$ type.

According to a $3^{rd}$ case, a TIM for at least one group is contained in a beacon. A specific group consists of user equipments having the same attribute. A different group consists of user equipments having different attributes.

In this case, information related to a PS-Poll transmission type may include a $1^{st}$ bitmap (individual PS-Poll mode bitmap) indicating PS-Poll transmission types of STAs included in a group per STA, a $2^{nd}$ bitmap (group PS-Poll mode bitmap) indicating PS-Poll transmission types of STAs included in groups per group, and a $3^{rd}$ bitmap (individual PS-Poll mode bitmap) indicating that a paged group is related to the $1^{st}$ bitmap or the $2^{nd}$ bitmap. For instance, if the number of groups paged in TIM IE is 2, the $3^{rd}$ bitmap is configured with 2 bits, a bit value '0' can indicate that a PS-Poll transmission type is determined by the $2^{nd}$ bitmap, and a bit value '1' can indicate that a PS-Poll transmission type is determined by the $1^{st}$ bitmap. In particular, the bit value '1' indicates a group including an STA having a different attribute. Based on a value set to 0 in the $3^{rd}$ bitmap, a size of the $2^{nd}$ bitmap can be determined. For instance, if a single bit is set o 0 only in the $3^{rd}$ bitmap having a 2-bit size, the $2^{nd}$ bitmap is configured with 1 bit. And, $1^{st}$ bitmaps amounting to the number of bits set to 1 in the $3^{rd}$ bitmap are included.

Figure 46:
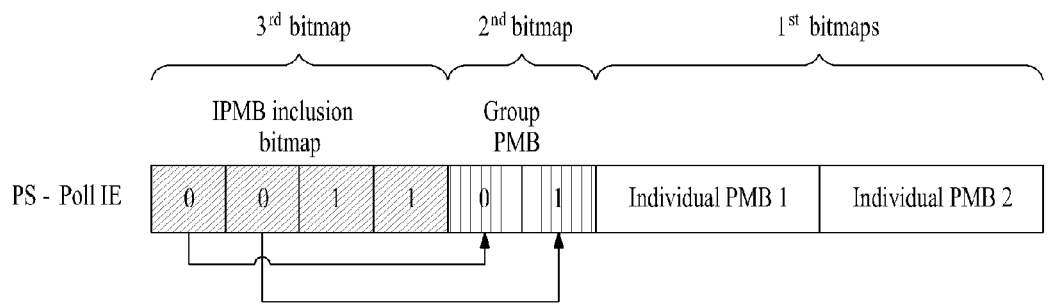

FIG. 46 shows one example of PS-Poll IE including the $1^{st}$ to $3^{rd}$ bitmaps mentioned in the above description. In FIG. 46, assume a case that there are 4 groups paged by TIM. After an STA has checked the $3^{rd}$ bitmap, if a bit value is 0, the STA can determine a PS-Poll transmission type through the corresponding $2^{nd}$ bitmap. If a bit value is 1, the STA can determine a PS-Poll transmission type through the corresponding $1^{st}$ bitmap.

Although the above descriptions are made basically on the assumption of a case that two PS-Poll transmission types (i.e., $1^{st}$ type and $2^{nd}$ type) exist, there may exist a PS-Poll transmission type of a $3^{rd}$ type. In this case, the $3^{rd}$ type is a PS-Poll transmission type different from each of the $1^{st}$ type and the $2^{nd}$ type. And, the $3^{rd}$ type may include a PS-Poll transmission type that can be derived from one of the aforementioned various methods or the description in the present specification. In this case, the $2^{nd}$ and $3^{rd}$ types except the $1^{st}$ type in an existing system are merged into an enhanced PS-Poll type. And, in the foregoing descriptions, a case of indicating the enhanced PS-Poll type can apply by replacing a case of indicating the $2^{nd}$ bitmap among the $1^{st}$ to $3^{rd}$ bitmaps. This is described with reference to FIG. 47 and FIG. 48 as follows.

Figure 47:
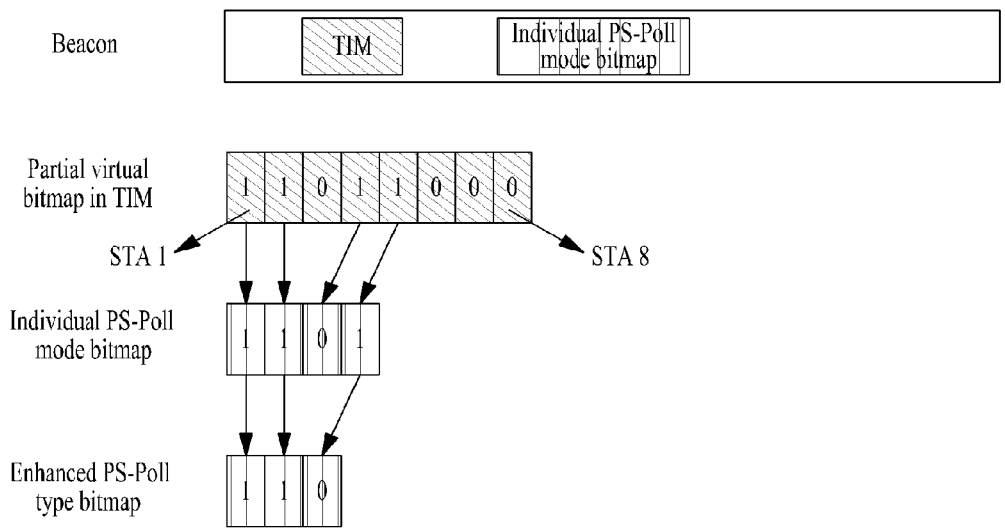

FIG. 47 shows a case that the $1^{st}$ map mentioned in the foregoing description supports an enhanced PS-Poll type. In particular, if a value of a $1^{st}$ bitmap (individual PS-Poll mode bitmap) is 1, it indicates an enhanced PS-Poll type. If the value is 0, it indicates a $1^{st}$ type. If the enhanced PS-Poll type is indicated, it is able to indicate a $2^{nd}$ type (a case of a bit value set to 0) or a $3^{rd}$ type (a case of a bit value set to 1) in an enhanced PS-Poll type bitmap.

Figure 48:
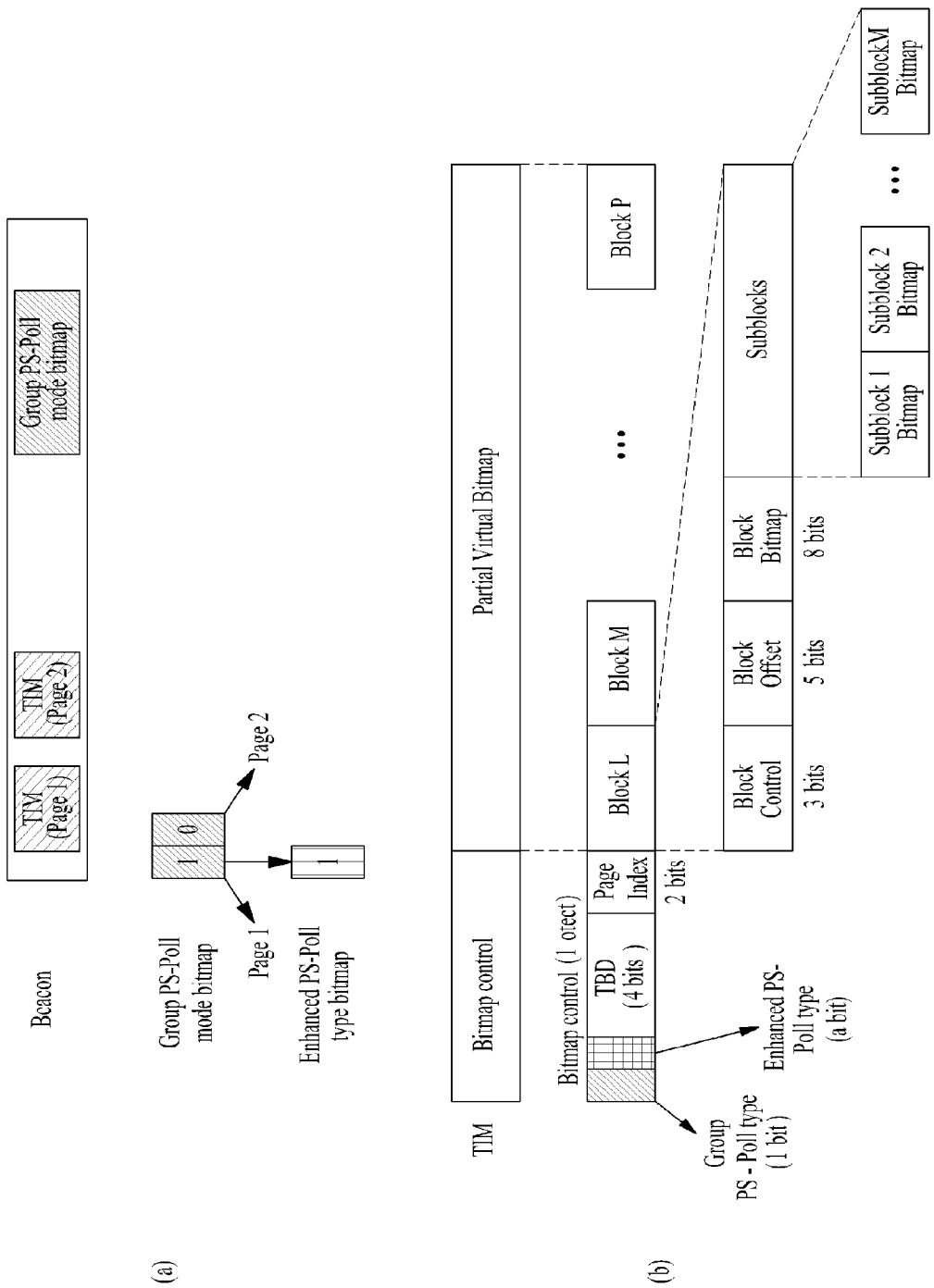

FIG. 48 shows a case that the $2^{nd}$ map mentioned in the foregoing description supports an enhanced PS-Poll type. Referring to FIG. 48 (a), if a value of a $2^{nd}$ bitmap (group PS-Poll mode bitmap) is 1, it indicates an enhanced PS-Poll type. And, an enhanced PS-Poll type bitmap can indicate a $2^{nd}$ type (a case of a bit value set to 0) or a $3^{rd}$ type (a case of a bit value set to 1). FIG. 48 (b) shows one example that PS Poll mode information on a page is included in a TIM.

Figure 49:
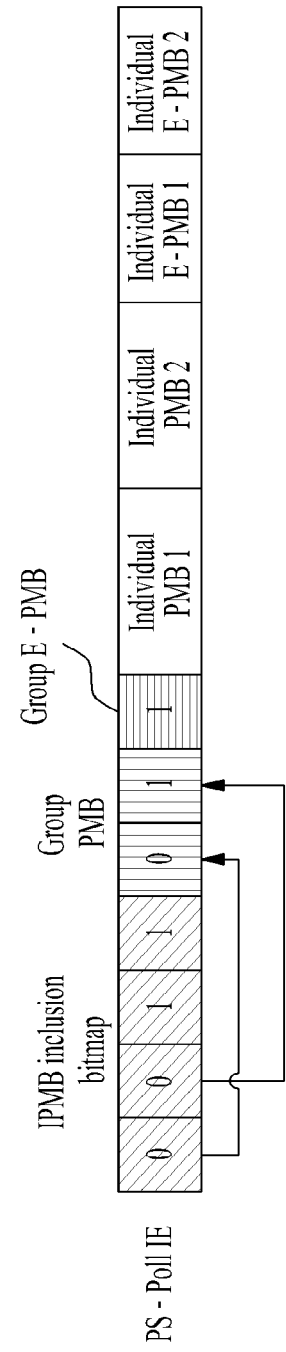

FIG. 49 shows a case that the aforementioned PS-Poll IE supports an enhanced PS-Poll type. In particular, if a bit value is 1 in a $2^{nd}$ bitmap, one of a $2^{nd}$ type (a case of a bit value set to 0) and a $3^{rd}$ type (a case of a bit value set to 1) can be indicated through a group E-PMB bitmap. If a bit value of $1^{st}$ bitmaps (Individual PMB 1, Individual PMB 2) is 1, one of a $2^{nd}$ type (a case of a bit value set to 0) or a $3^{rd}$ type (a case of a bit value set to 1) can be indicated in individual E-PMB bitmaps (Individual E-PMB 1, Individual E-PMB 2).

Meanwhile, a channel access can be granted only to user equipments belonging to a specific group in a specific channel access interval. When STAs belonging to the corresponding group transmit PS-Poll in the channel access interval, an AP can determine whether to allow a $1^{st}$ type or a $2^{nd}$ type to be used. In particular, when the AP assigns a channel access interval, the AP can information a user equipment of a PS-Poll type information. FIG. 50 shows one example that a PS-Poll type information to be used for RAW is included when a channel access interval (e.g., restrict access window (RAW)) is assigned. In FIG. 50, a poll type field indicates a PS Poll operation type in a corresponding RAW, '0' indicates a $1^{st}$ type, '1' indicates a $2^{nd}$ type, and PS-Poll is transmitted in accordance with a corresponding type. Of course, a poll type field value set to 0 may indicate the $1^{st}$ type. And, a poll type field value set to 1 may indicate a PS-Poll type.

Additional Channel Access Interval Assignment

According to the above-described embodiment, total PS-Poll interval can be understood as RAW for transmitting PS-Poll, and PS-Poll interval for each STA can be understood as slot in RAW. For clarity of the description, RAW for transmitting PS-Poll shall be named PS-Poll dedicated RAW.

An STA can check whether data buffered for the corresponding STA exists through a TIM contained in a beacon frame. If the buffered data exists, the STA can confirm a PS-Poll dedicated RAW assigned to the corresponding STA through a RAW information contained in the beacon frame. At least one of the number of RAWs to be assigned, a start timing point information of an assigned RAW, a slot (i.e., each PS-Poll interval) duration information of a slot per RAW, and an order information of each slot can be included in the RAW information transmitted through the beacon frame.

Figure 51:
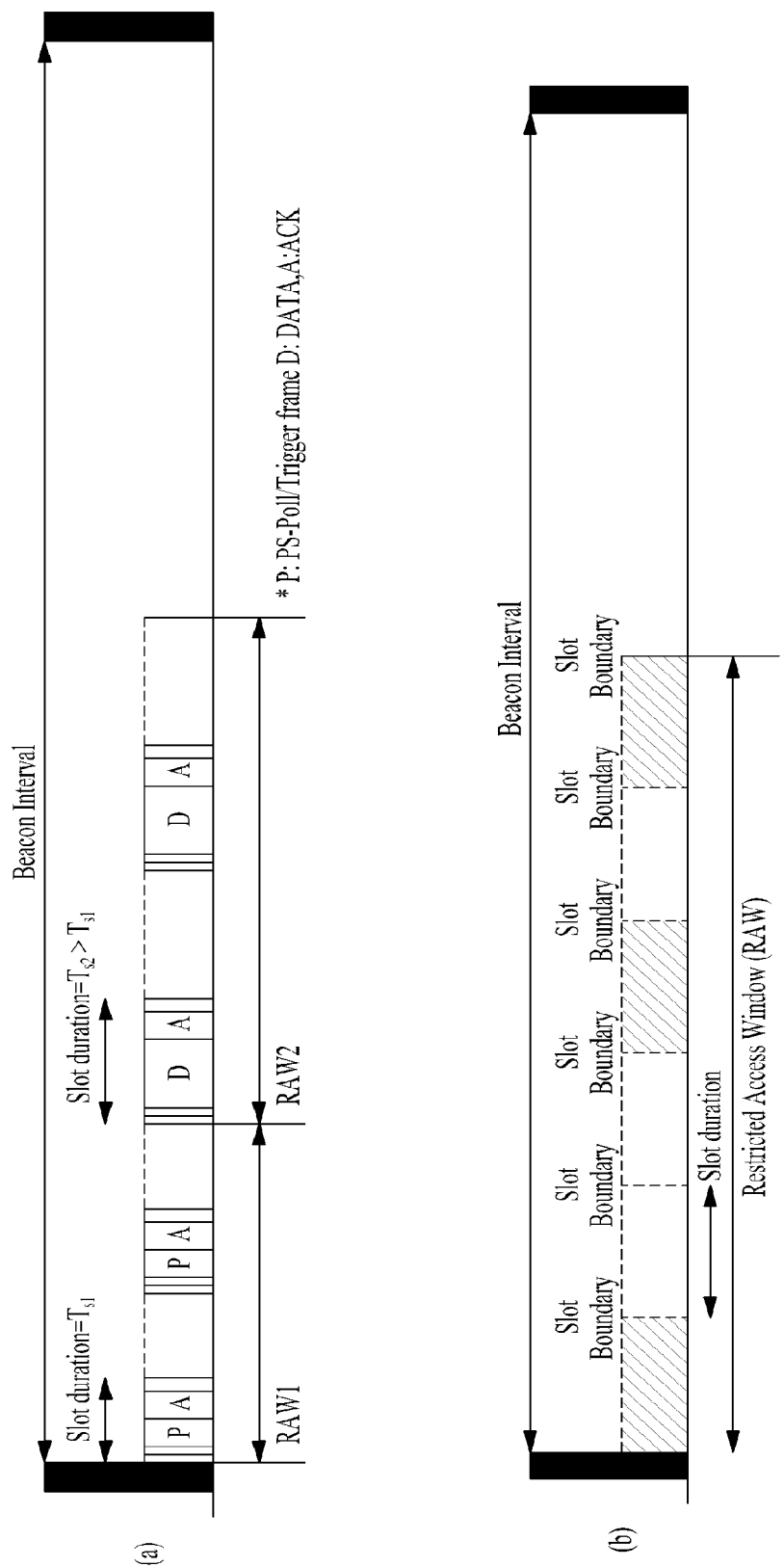
FIG. 51 is a diagram to describe RAW assigned for a beacon interval.

For instance, FIG. 51 is a diagram to describe an RAW assigned for a beacon interval. FIG. 51 (a) shows one example that 2 RAWs (RAW 1, RAW 2) are assigned for a beacon interval. The RAW 1 is the RAW assigned to transmit a PS-Poll frame or a trigger frame for example. And, the RAW 2 is the RAW assigned to transmit data for example. A slot duration and boundary may be configured different per RAW. For instance, referring to FIG. 51, the slot duration of the RAW 1 is Ts1, whereas the slot duration of the RAW 2 can be set to Ts2 longer than Ts1.

FIG. 51 (b) is a diagram for one example to describe a slot duration and a slot boundary. An EDCA based STA can perform a channel access for a slot duration. In doing so, the channel access in not performed across a slot boundary. In particular, the channel access is not performed across a plurality of slot durations. And, the STA may not wait for a probe delay when waking up on the slot boundary.

A paged STA checks an RAW through a beacon frame and is then able to make a request for an AP to transmit data by transmitting a PS-Poll in a PS-Poll interval assigned to the paged STA. Yet, every STA may not be able to transmit a PS-Poll in its own PS-Poll interval. For instance, if interference caused by OBSS transmission is generated or an STA misses a TIM, the STA may not be able to transmit a PS-Poll in a PS-Poll interval assigned to the corresponding STA. Having failed in transmitting the PS-Poll in its PS-Poll interval, the STA can perform a contention-based PS-Poll. In doing so, if the contention-based PS-Poll is performed, it may affect a PS-Poll performed by a different STA. This is described in detail with reference to examples shown in FIG. 52 and FIG. 53.

Figure 52:
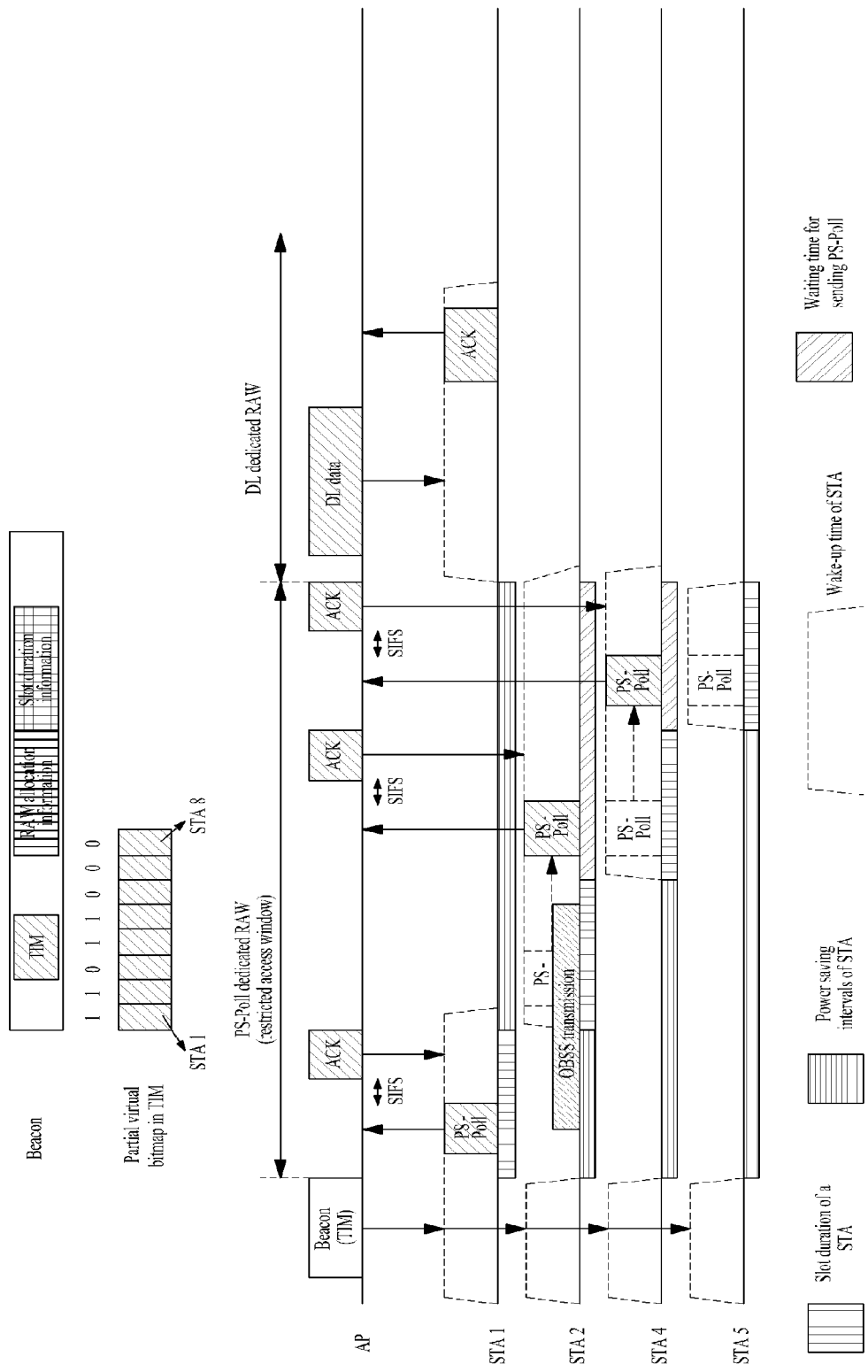
FIG. 52 and FIG. 53 are diagrams for one example of a case that a prescribed STA is unable to perform PS-Poll for its own PS-Poll interval.
Figure 53:
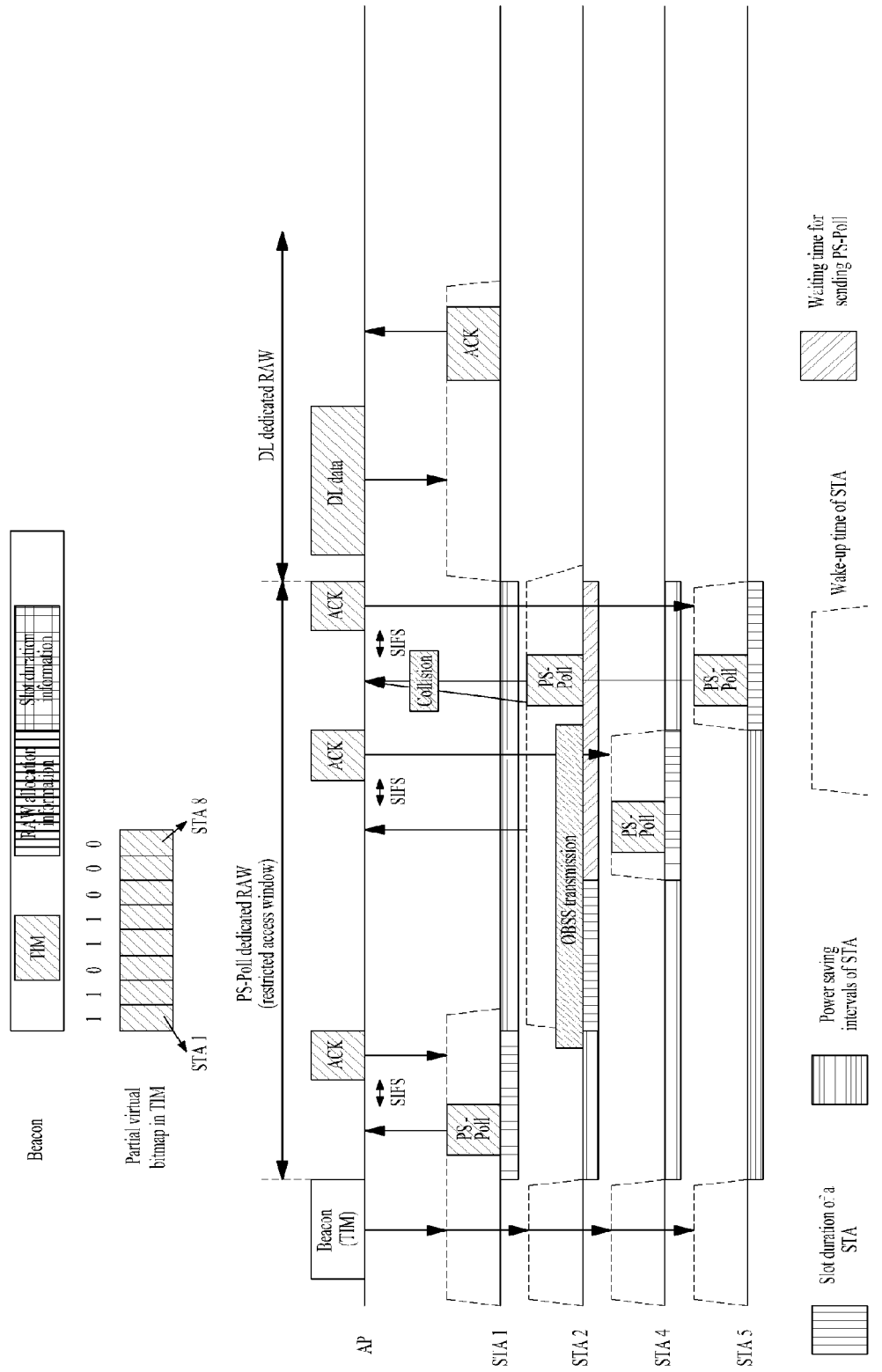

FIG. 52 and FIG. 53 are diagrams for one example of a case that a prescribed STA is unable to perform PS-Poll in its own PS-Poll interval. Referring to FIG. 52 and FIG. 53, a partial virtual bitmap field in a TIM of a beacon frame pages STA 1, STA 2, STA 4 and STA 5 for example. Hence, a PS-Poll dedicated RAW may be able to include at least 4 slots (i.e., 4 PS-Poll intervals) to match the number of the paged STAs. Each of the STAs 1, 2, 4 and 5 can perform a STAs 1, 2, 4 and 5 in a PS-Poll interval assigned to the corresponding STA. in FIG. 52 and FIG. 53, the PS-Poll intervals are assigned in order of the STAs 1, 2, 4 and 5 within the RAW for example.

If at least one STA is unable to transmit a PS-Poll in its own PS-Poll interval due to the OBSS interference or a medium preoccupation by a different STA, the STA failing in the PS-Poll frame transmission can attempt a transmission of a PS-Poll frame through contention during a remaining PS-Poll dedicated RAW.

For instance, like the examples shown in FIG. 52 and FIG. 53, if the STA 2 fails in transmitting a PS-Poll frame in a PS-Poll interval assigned to the STA 2, the STA 2 may be able to attempt a transmission of PS-Poll through contention with the STA 4 and the STA 5 during a remaining PS-Poll dedicated RAW.

In doing so, like the example shown in FIG. 52, if the STA 2 transmits a PS-Poll frame in a PS-Poll interval assigned for the STA 4, since the STA 4 needs to maintain an awake state in a PS-Poll interval assigned for the STA 5 in order to transmit a PS-Poll, the STA 4 may consume an additional power. Moreover, since the STA 4 should attempt a transmission of a PS-Poll through a contention with the STA 5, at least one of the STA 4 and the STA 5 will be unable to transmit a PS-Poll frame during a PS-Poll dedicated RAW.

Like the example shown in FIG. 53, assuming that the STA 5 is a hidden node of the STA 2, if the STA 2 transmits a PS-Poll in a PS-Poll interval assigned for the STA 5, a PS-Poll frame transmitted by the STA 2 and a PS-Poll frame transmitted by the STA 5 collide with each other so that both of the STA 2 and the STA 5 may fail in the transmission of the PS-Poll frames.

As a method of overcoming the inefficient contention mentioned in the above description, an AP can additionally assign an additional RAW for an STA failing in a transmission of a PS-Poll frame behind a PS-Poll dedicated RAW. In the following description, the additional RAW is explained in detail.

Figure 54:
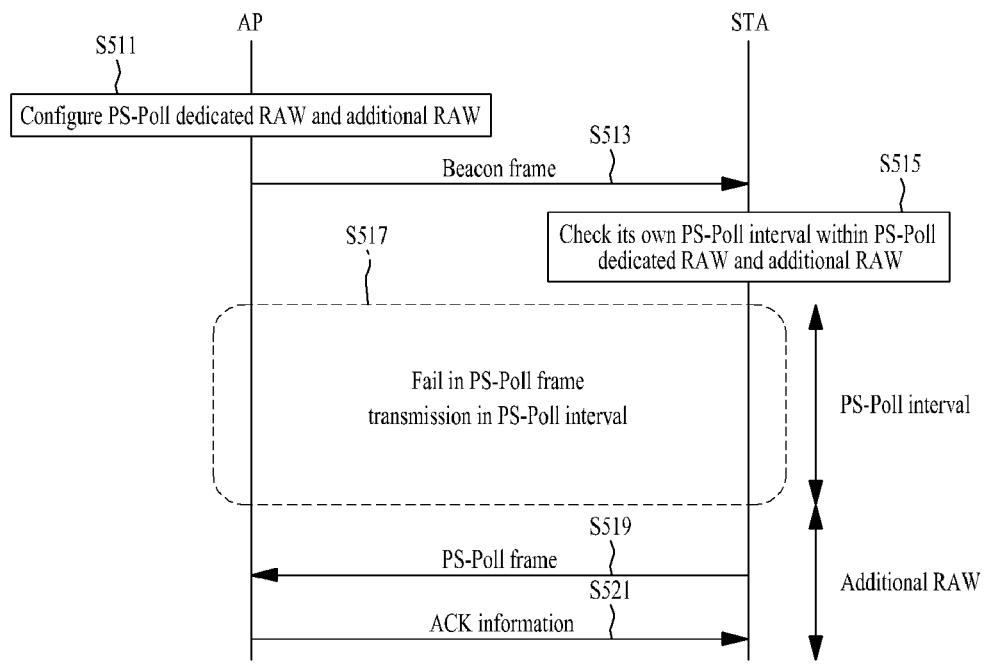
FIG. 54 is a diagram for one example of a channel access method using an additional RAW according to one embodiment of the present invention.

FIG. 54 is a diagram for one example of a channel access method using an additional RAW according to one embodiment of the present invention.

Referring to FIG. 54, an AP is able to configure PS-Poll dedicated RAWs for channel accesses of downlink data designated STAs and an additional RAW for an STA failing in a channel access [S511]. The AP is able to define the PS-Poll dedicated RAW in order to assign a single slot to each paged STA. On the other hand, when the AP defines the additional RAW, the AP may define the additional RAW as a single slot. In particular, unlike the PS-Poll dedicated RAW, it is unnecessary for the additional RAW to be defined as slots matching the number of the paged STAs. In case that the additional RAW is defined as a single slot, a length of the additional RAW may be set equal to that of the single slot.

The AP can transmit a beacon frame containing a TIM element, which contains an information indicating a presence or non-presence of downlink data to be transmitted per STA in accordance with a beacon period, and an RAW information to the STA [S513].

In this case, the RAW information may include a PS-Poll dedicated RAW information and an additional RAW information. The PS-Poll dedicated RAW information can include at least one of a location information of a PS-Poll interval for each STA having downlink data designated thereto, a start timing point information of a PS-Poll dedicated RAW, a length information of the PS-Poll interval, and an order information of the PS-Poll interval. And, the additional RAW information can include at least one of a start timing point information of an additional RAW, a length information of the additional RAW, and the number information of a slot defined in the additional RAW.

The STA switches to an awake state to match a beacon transmission period and is then able to receive a beacon frame from the AP. Having received the beacon frame, the STA can check a presence or non-presence of downlink data designated to the corresponding STA through a TIM element in the received beacon frame and is able to confirm a PS-Poll interval (i.e., slot) assigned to the corresponding STA within the PS-Poll dedicated RAW and an additional RAW [S515].

The paged STA can transmit a PS-Poll frame in the slot (i.e., PS-Poll interval) assigned to the paged STA within the PS-Poll dedicated RAW. If the STA is unable to transmit the PS-Poll frame successfully in the PS-Poll interval assigned to the corresponding STA [S517], the STA can transmit the PS-Poll frame during the additional RAW [S519]. If the STA fails to receive an acknowledgement (ACK) frame in the PS-Poll interval in response to the PS-Poll frame (e.g., if not receiving the ACK frame despite a lapse of SIFS after the transmission of the PS-Poll frame) or the STA is unable to transmit the PS-Poll frame in a PS-Poll transmission interval assigned to the corresponding STA due to the PBSS interference, the STA can determine that the PS-Poll frame is not successfully transmitted.

During the additional RAW, the STA can attempt a transmission of a PS-Poll frame based on contention (i.e., based on EDCA). For instance, if there are a plurality of STAs failing to transmit PS-Poll frame, a plurality of the STAs can attempt the transmission of the PS-Poll frame by contending with each other.

The STA failing to transmit the PS-Poll frame successfully through the PS-Poll dedicated RAW is able to reduce unnecessary power consumption by maintaining a sleep state until the additional RAW starts.

Having transmitted the PS-Poll during the additional RAW, the STA can receive an ACK frame in response to the transmitted PS-Poll [S521].

Figure 55:
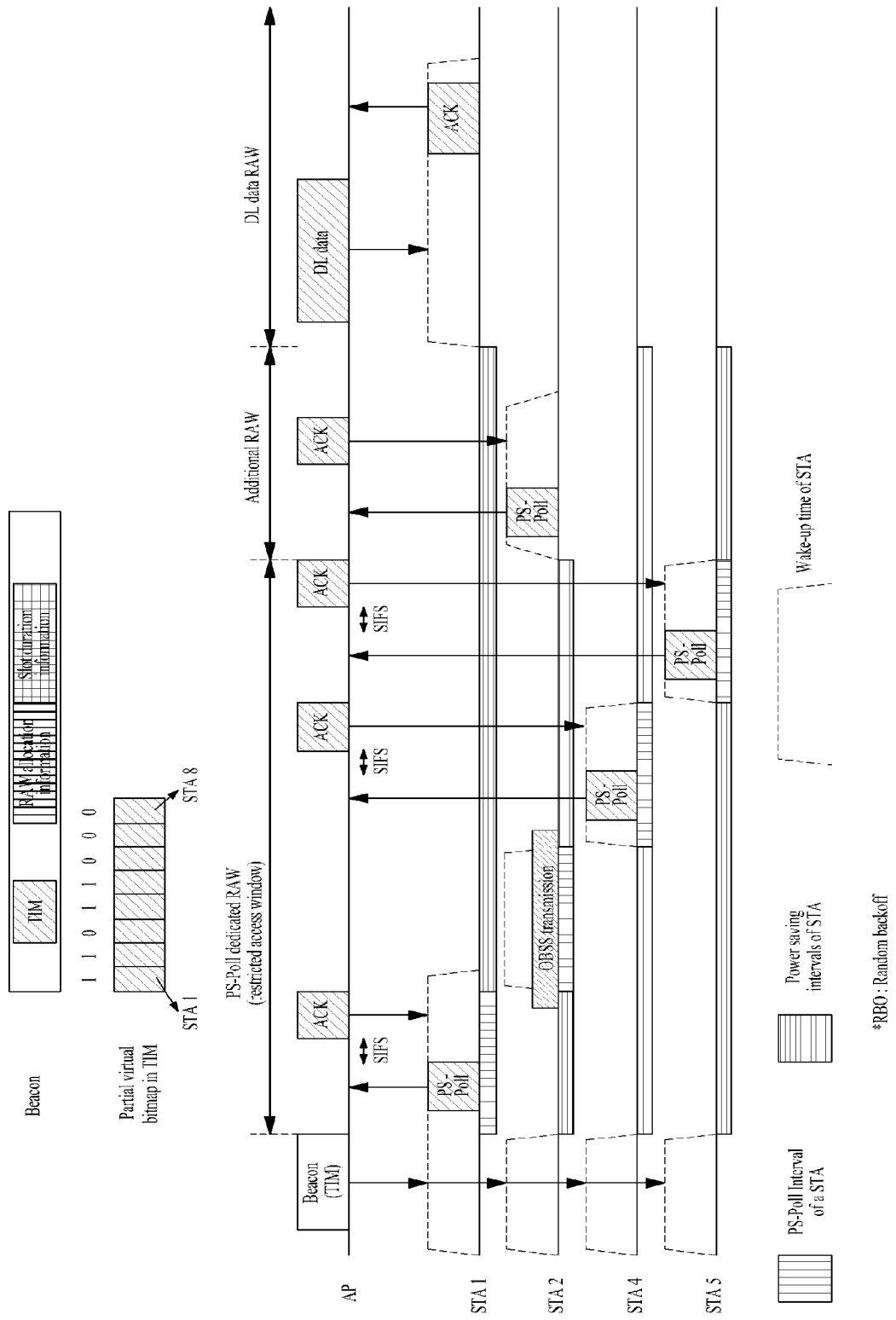
FIG. 55 and FIG. 56 are diagrams for one example when an additional RAW is applied.
Figure 56:
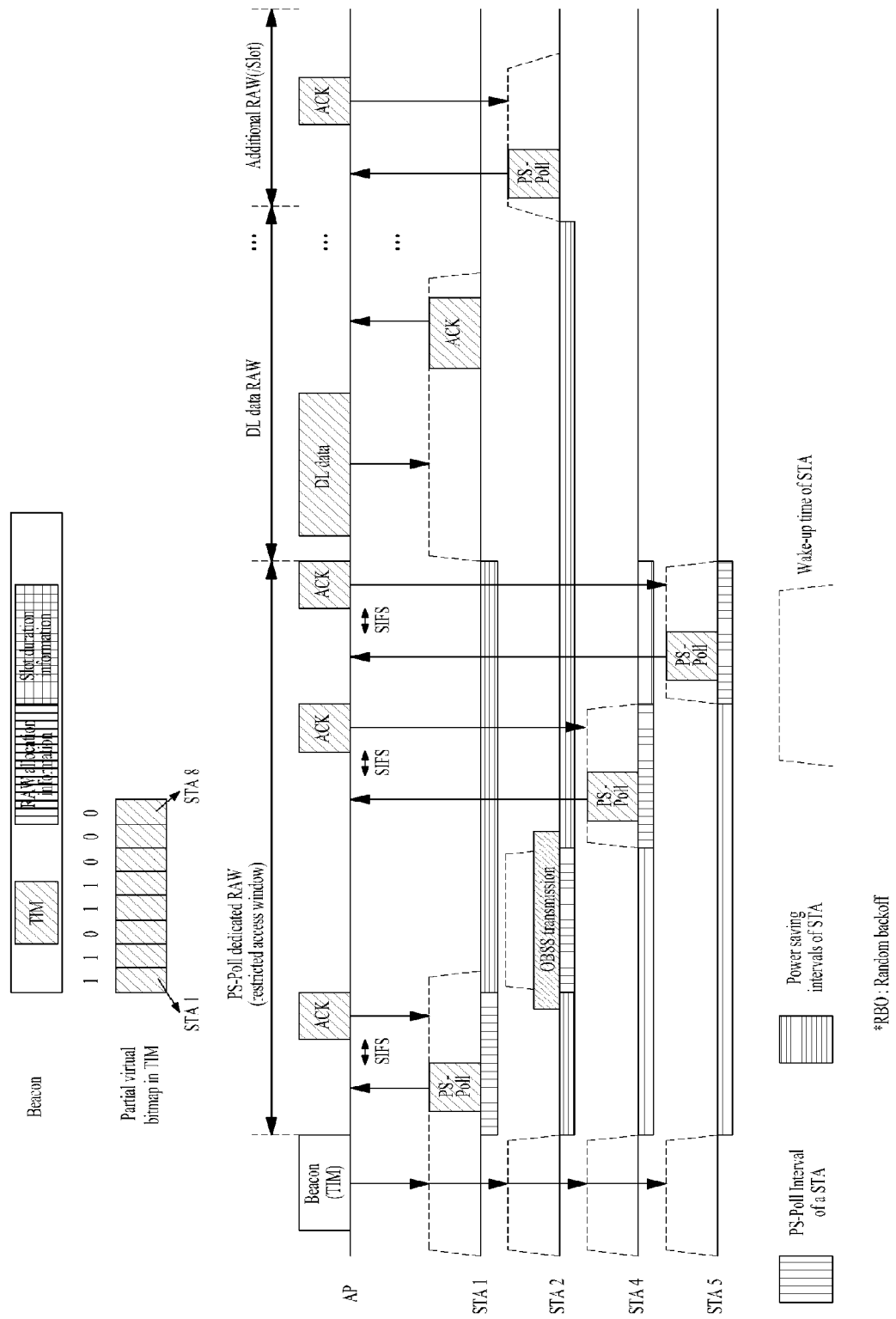

FIG. 55 and FIG. 56 are diagrams for one example when an additional RAW is applied. For clarity of the description, as mentioned in the foregoing descriptions with reference to FIG. 52 and FIG. 53, assume that paged STAs include STA 1, STA 2, STA 4 and STA 5. And, assume that PS-Poll intervals are assigned in order of STAs 1, 2, 4 and 5 within a PS-Poll dedicated RAW.

For instance, if the STA 2 fails in transmitting a PS-Poll in its own PS-Poll interval due to OBSS interference, the STA 2 can attempt a transmission of a PS-Poll frame through an additional RAW assigned behind a PS-Poll dedicated RAW. In this case, like the example shown in FIG. 55, the additional RAW may be situated right next to the PS-Poll dedicated RAW. Alternatively, like the example shown in FIG. 56, the additional RAW may be situated after a PS-Poll dedicated RAW for transmitting a PS-Poll frame and a downlink (DL) data RAW for transmitting a buffered data frame have ended.

Like the above-described example, if the STA fails to successfully transmit the PS-Poll frame during the PS-Poll dedicated RAW, the STA can attempt the transmission of the PS-Poll frame again using the additional RAW. As mentioned in the foregoing description, only the paged STA failing in successfully transmitting the PS-Poll in its own slot (e.g., its own PS-Poll interval) within the PS-Poll dedicated RAW can utilize the additional RAW as a RAW for a channel access.

Yet, if the additional RAW does not end despite that every paged STA successful transmits the PS-Poll frames during the PS-Poll dedicated RAW or the STA failing in transmitting the PS-Poll during the PS-Poll dedicated RAW transmits the PS-Poll through the additional RAW, the additional RAW results in wasting the limited radio resources instead.

Hence, an AP can enable at least one of a paged STA failing in successfully transmitting a PS-Poll, a paged STA succeeding in transmitting a PS-Poll, and an unpaged STA to transmit an uplink frame through an additional RAW. To this end, if the AP determines that every paged STA has successfully transmitted the PS-Poll frames, if the AP detects that a channel is in an idle status over a specific period since a start of the additional RAW, or as soon as the additional RAW starts, the AP is able to transmit a UTA (UL transmission allowance) frame to inform STAs that a transmission of an uplink frame is allowed. In doing so, the AP can transmit the UTA frame by broadcast or may transmit the UTA frame by unicast only to prescribed STAs to allow for the uplink frame transmission.

Having received the UTA frame, the STA can transmit an uplink frame to the AP based on contention (i.e., EDCA) during the additional RAW. This is described in detail with reference to FIG. 57 and FIG. 58 as follows.

Figure 57:
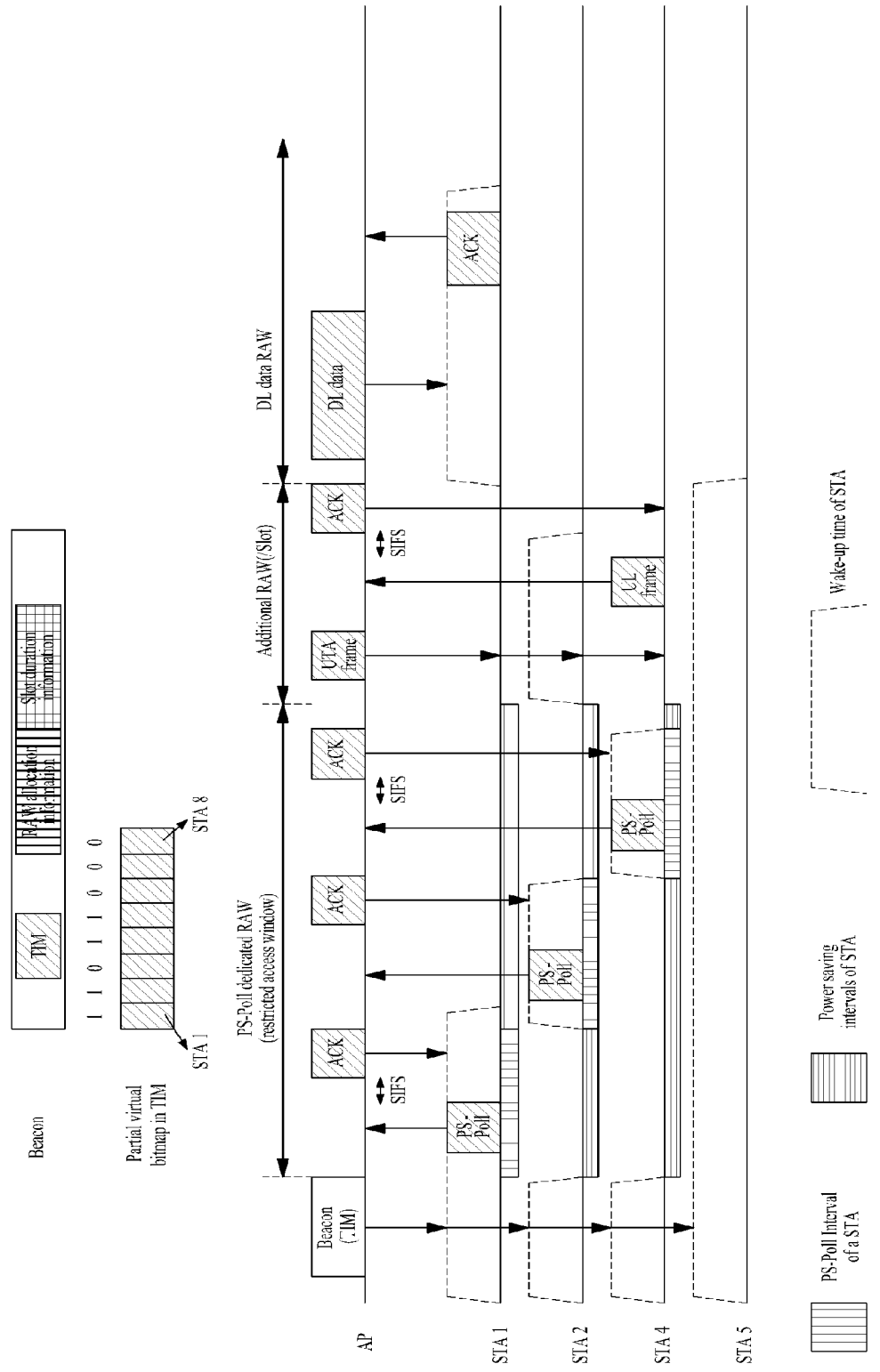
FIG. 57 and FIG. 58 are diagrams for one example of transmitting an uplink frame to an AP from an STA for an additional RAW.
Figure 58:
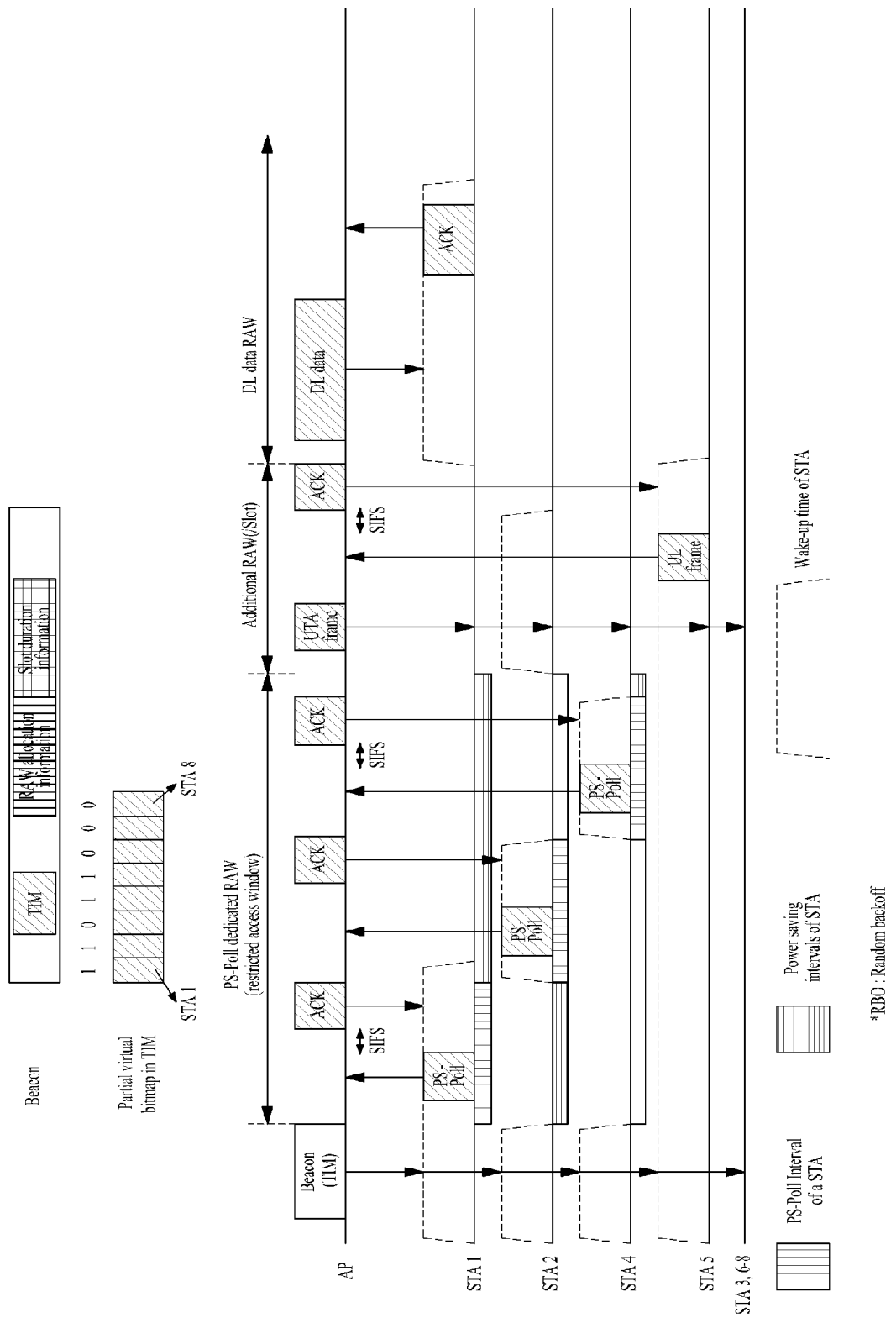

FIG. 57 and FIG. 58 are diagrams for one example of transmitting an uplink frame to an AP from an STA for an additional RAW. For clarity of the following description, assume that STAs paged through a partial virtual map include STA 1, STA 2 and STA 4.

An AP is able to transmit a UTA frame to announce allowance for an uplink transmission of an STA during an additional RAW. Like the example shown in FIG. 57, the UTA frame can be transmitted to a paged STA only by unicast (or multicast). Like the example shown in FIG. 58, the UTA frame can be transmitted to both a paged STA and an unpaged STA by broadcast as well as to the paged STA.

Having received the UTA frame, the STAs recognize that the additional RAW in idle status and are then able to attempt transmissions of uplink frames through contention during the additional RAW. During the additional RAW, the AP may be able to receive the UL frame from at least one of the paged STA and the unpaged STA.

Figure 59:
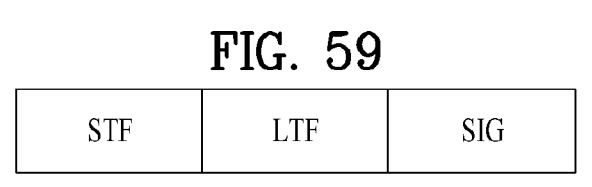

The UTA frame may have a MAC control frame format or include a frame in NDP (null data packet) format. For instance, FIG. 59 is a diagram for one example of an NDP UTA frame format. Referring to FIG. 59, the NDP UTA frame may include STF, LTF and SIG field. The SIG field may include an NDP frame type information indicating that a corresponding NDP frame is a UTA frame. An STA is able to confirm that the NDP frame is the UTA frame by checking the NDP frame type information of the SIG field. In order for the NDP frame type information to indicate the UTA frame, it is able to use a reserved bit of an MCS field that is a subfield of the SIG field. Moreover, existing frames (e.g., CTS MAC control frame, NDP-CTS frame, CF-END frame, etc.) can be transmitted by including the UTA frame function. Instead, the existing frame is transmitted by containing an information (e.g., indication bit or duration set to 0) indicating that channel accesses of other STAs are allowed after a corresponding timing point.

The SIG field may further include a BSSID information or a partial BSSID information. The BSSID information or the partial BSSID information may indicate a BSSID to which an NDP UTA frame transmitting AP belongs. Having received the NDP UTA frame, an STA can attempt a transmission of an uplink frame during an additional RAW only if belonging to the same BSSID of the STA.

Although the ATP is able to attempt a reception of the uplink frame from the STA during the additional RAW, the AP may be able to transmit a downlink data frame to the STA during the additional RAW. This is described in detail with reference to FIG. 60 as follows.

Figure 60:
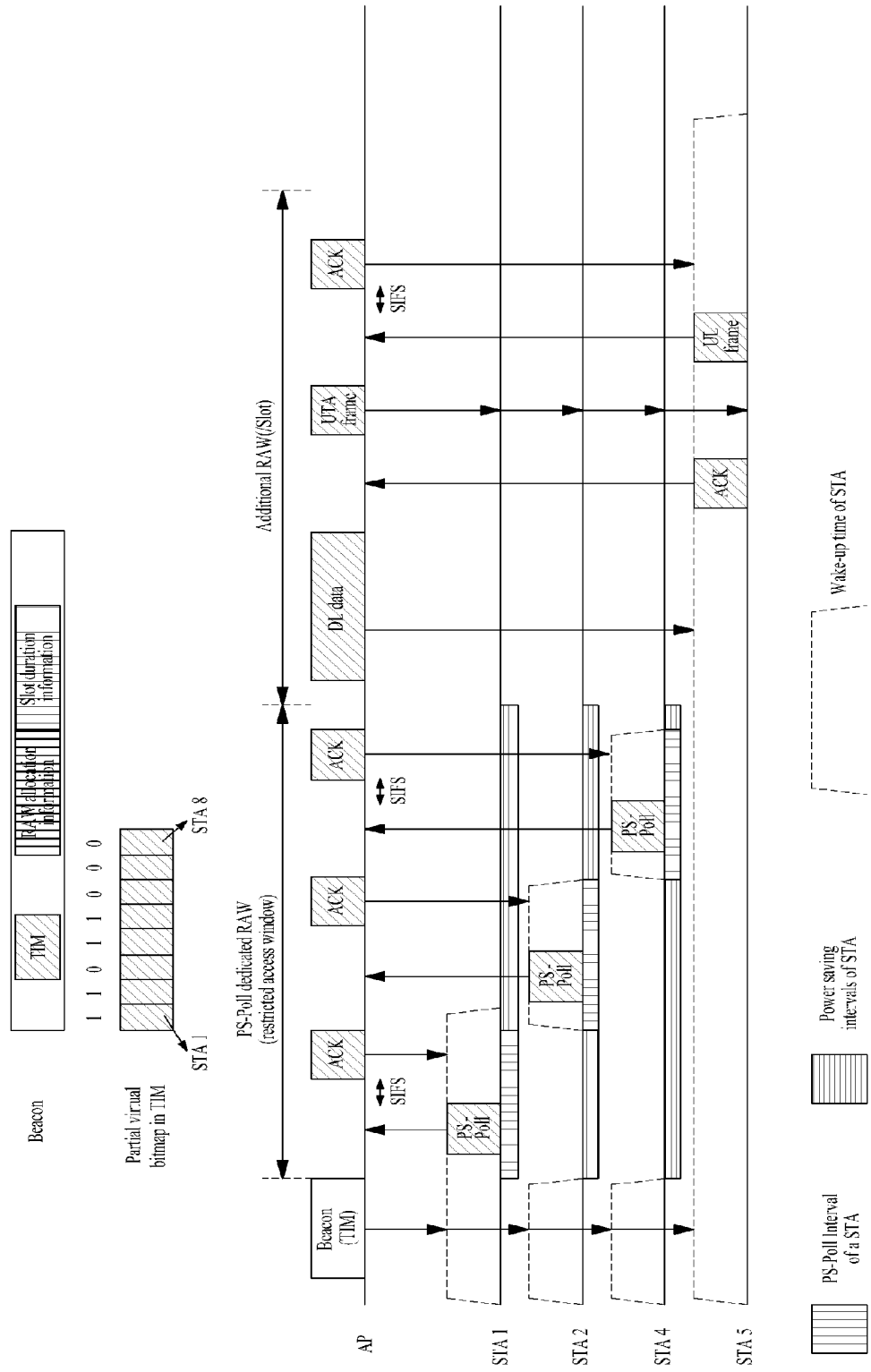
FIG. 60 is a diagram for one example of transmitting a downlink data frame to an STA from an AP for an additional RAW.

FIG. 60 is a diagram for one example of transmitting a downlink data frame to an STA from an AP for an additional RAW. For clarity of the following description, assume that STAs paged through a partial virtual bitmap include STA 1, STA 2 and STA 4.

If detecting that a channel is in an idle status during a specific period since an additional RAW starts, an AP can transmit a downlink data frame to an STA. Although FIG. 60 shows one example that the downlink data frame is transmitted to the unpaged STA 5, if there is data to be transmitted to the paged STA, the downlink data frame can be transmitted during the additional RAW.

Despite that the downlink data frame was transmitted to the STA, if the channel is still in the idle status, the AP can transmit a UTA frame, which indicate that an uplink frame is transmittable during the additional RAW, for the first time by transmitting a UTA frame to the STA. In doing so, as mentioned in the foregoing descriptions with reference to FIG. 57 and FIG. 58, the UTA frame may be transmitted to a paged STA or may be transmitted to an unpaged STA as well as to the paged STA.

As mentioned in the foregoing description, an STA failing in transmitting a PS-Poll frame in its own PS-Poll interval can attempt a transmission of a PS-Poll frame during an additional RAW. In doing so, an AP transmits a UTA frame during the additional RAW so that at least one of a paged STA succeeding in transmitting a PS-Poll frame and an unpaged STA can use the additional RAW. Yet, in order for an STA failing in transmitting a PS-Poll frame to transmit an uplink frame (i.e., PS-Poll) through the additional RAW earlier than other STAs (e.g., a paged STA succeeding in transmitting a PS-Poll frame and an unpaged STA), it is able to give a channel access priority to the paged STA failing in the transmission of the PS-Poll frame. To this end, EDCA parameter can be newly defined for PS-Poll traffic.

Table 2 to 5 show examples of EDCA parameters for PS-Poll traffic.

TABLE 2

| Access Category (AC) | CWmin | CWmax | AIFSN |
|---|---|---|---|
| AC_BK | aCWmin | aCWmax | 7 |
| AC_BE | aCWmin | aCWmax | 3 |

TABLE 2-continued

| Access Category (AC) | CWmin | CWmax | AIFSN |
|---|---|---|---|
| AC_VI | (aCWmin + 1)/2 − 1 | aCWmin | 2 |
| AC_VO | (aCWmin + 1)/4 − 1 | (aCWmin + 1)/2 − 1 | 2 |
| AC_PS-Poll | (aCWmin + 1)/8 − 1 | (aCWmin + 1)/4 − 1 | 1 |

Referring to Table 2, for a PS-Poll transmission, a new access category AC_PS-Poll can be defined. By setting EDCA parameter (e.g., CWmin, CWmax, AIFSN (Arbitration Inter-Frame Spacing Number)) of an access category for PS-Poll transmission to a value lower than an access category of traffic (e.g., Background (BK), Best Effort (BE), Video (VI), Voice (VO)) of another kind, a paged STA performing PS-Poll in a PS-Poll dedicated RAW and an additional RAW can perform a channel access more quickly.

TABLE 3

| Access Category (AC) | CWmin | CWmax | AIFSN |
|---|---|---|---|
| AC_BK | aCWmin | aCWmax | 7 |
| AC_BE | aCWmin | aCWmax | 3 |
| AC_VI | (aCWmin + 1)/2 − 1 | aCWmin | 2 |
| AC_VO | (aCWmin + 1)/4 − 1 | (aCWmin + 1)/2 − 1 | 2 |
| AC_PS-Poll | (aCWmin + 1)/4 − 1 | (aCWmin + 1)/2 − 1 | 1 |

Referring to Table 3, CWmin and CWmax of an access category for PS-Poll transmission are set equal to an access category of audio traffic. And, AIFSN can be set lower than the access category of the audio traffic.

TABLE 4

| Access Category (AC) | CWmin | CWmax | AIFSN |
|---|---|---|---|
| AC_BK | aCWmin | aCWmax | 7 |
| AC_BE | aCWmin | aCWmax | 3 |
| AC_VI | (aCWmin + 1)/2 − 1 | aCWmin | 2 |
| AC_VO | (aCWmin + 1)/4 − 1 | (aCWmin + 1)/2 − 1 | 2 |
| AC_PS-Poll | (aCWmin + 1)/8 − 1 | (aCWmin + 1)/4 − 1 | 2 |

Referring to table 4, CWmin and CWmax of an access category for PS-Poll transmission are set different from an access category of audio traffic. And, AIFSN can be set equal to the access category of the audio traffic.

TABLE 5

| Access Category (AC) | CWmin | CWmax | AIFSN |
|---|---|---|---|
| AC_BK | aCWmin | aCWmax | 7 |
| AC_BE | aCWmin | aCWmax | 3 |
| AC_VI | (aCWmin + 1)/2 − 1 | aCWmin | 2 |
| AC_VO/AC_PS-Poll | (aCWmin + 1)/4 − 1 | (aCWmin + 1)/2 − 1 | 2 |

Referring to Table 5, EDCA parameter of an access category for PS-Poll transmission may be set equal to an access category of audio traffic. Hence, PS-Poll will have a priority equivalent to that of audio traffic.

Referring to the descriptions with reference to Table 2 to 5, PS-Poll has a priority equal to or higher than that of audio traffic. The descriptions with reference to Table 2 to 5 are exemplarily made for clarity of the description, by which the present invention may be non-limited. And, it is a matter of course that PS-Poll can be set to have a priority lower than that of audio traffic.

The EDCA parameter for the PS-Poll traffic mentioned in the descriptions with reference to Tables 2 to 5 are available for a paged user equipment to transmit PS-Poll during a PS-Poll dedicated RAW as well as during an additional RAW. Hence, an STA can transmit PS-Poll more quickly during the PS-Poll dedicated RAW.

As an additional method of giving a priority to a PS-Poll frame transmission, it is able to consider a method for a paged user equipment to sense a busy (occupied) status of a medium before a PS-Poll frame transmission not during AIFS but during DIFS or PIFS. In this case, since the paged user equipment can transmit a PS-Poll frame after lapse of DIFS or PIFS shorter than AIFS, it may be possible to transmit a PS-Poll frame more quickly.

Figure 61:
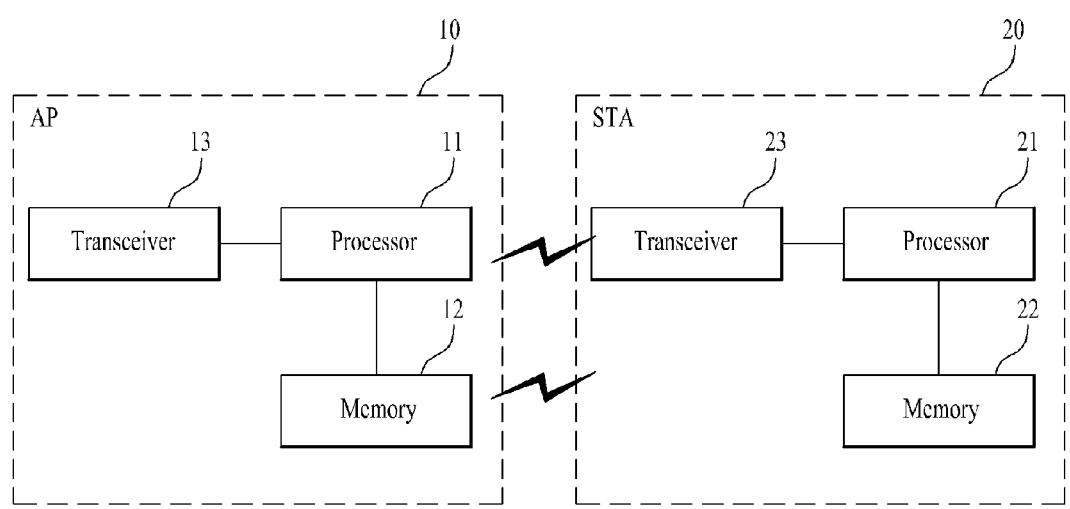
FIG. 61 is a block diagram for a configuration of a wireless device according to one embodiment of the present invention.

FIG. 61 is a block diagram for a configuration of a wireless device according to one embodiment of the present invention.

An AP 10 may include a processor 11, a memory 12 and a transceiver 13. An STA 20 may include a processor 21, a memory 22 and a transceiver 23. The transceiver 13/23 can transmit and receive radio signals and is able to implement a physical layer according to IEEE 802 system for example. The processor 11/21 is connected to the transceiver 13/23 and is able to implement a physical layer and/or a MAC layer according to IEEE 802 system. The processor 11/21 can be configured to perform operations according to the various embodiments of the present invention mentioned in the foregoing description. And, modules for implementing operations of the AP and STA according to the various embodiments of the present invention mentioned in the foregoing description are saved in the memory 12/22 and can be executed by the processor 11/21. The memory 12/22 is included in the processor 11/21 or installed outside the processor 11/21 and is then connected to the processor 11/21 via a means known to the public.

In the above-mentioned detailed configurations of the AP and STA device, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, methods according to embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, methods according to embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

Various embodiments according to the present invention are mainly described with reference to the examples applying to IEEE 802.11 system and can identically apply to various kinds of wireless access systems as well as to IEEE 802.11 system.

What is claimed is:

1. A method of performing channel access, which is performed by a station (STA) in a wireless communication system, the method comprising:
   receiving a beacon frame containing a TIM (traffic indication map) from an Access Point (AP); and
   transmitting a PS-Poll (Power Save-Poll) frame when the TIM indicates that traffic for the STA is buffered,
   wherein the PS-Poll frame is transmitted during a PS-Poll dedicated RAW(restricted access window) accessible for a specific page group including the STA,
   wherein each STA included in the specific page group is allowed to send the PS-Poll frame to the AP during the PS-Poll dedicated RAW,
   wherein the STA does not receive a data frame during the PS-Poll dedicated RAW, and
   wherein at least one EDCA parameter used for transmitting the PS-Poll frame is equivalent to an EDCA parameter used for transmitting audio traffic.

2. The method of claim 1, wherein the STA receives the data frame after the end of the PS-Poll dedicated RAW.

3. The method of claim 1, wherein the EDCA parameter comprises at least one selected from the group consisting of CWmin (minimum Contention Window), CWmax (maximum Contention Window) and AIFSN (Arbitration Inter-Frame Spacing Number).

4. The method of claim 1, wherein the STA receives a data frame during a second RAW additionally assigned behind after the PS-Poll dedicated RAW.

5. The method of claim 1, wherein when the PS-Poll frame is not transmitted during the PS-Poll dedicated RAW, the STA transmits the PS-poll frame during a RAW additionally assigned behind after the PS-Poll dedicated RAW.

6. The method of claim 5, wherein when the STA fails to transmit the PS-Poll frame during the PS-Poll dedicated RAW or is unable to receive an ACK (acknowledgement) frame in response to the PS-Poll despite transmitting the PS-Poll frame during the PS-Poll dedicated RAW, the STA determines that the PS-Poll frame was transmitted unsuccessfully during the PS-Poll dedicated RAW.

7. The method of claim 5, wherein after transmitting the PS-Poll frame successfully, the STA receives a UTA (UL transmission allowance) frame from an Access Point (AP) indicating that the channel access is allowed during the RAW additionally assigned behind after the PS-Poll dedicated RAW.

8. The method of claim 1, wherein when the TIM does not indicate that traffic is buffered for the STA or the STA successfully transmits the PS-Poll frame during the PS-Poll dedicated RAW, the method further comprises:
- receiving, at the STA, a UTA (UL transmission allowance) frame during a RAW additionally assigned behind after the PS-Poll dedicated RAW, and
- attempting the channel access during the RAW additionally assigned behind after the PS-Poll dedicated RAW.

9. A method of performing a channel access, which is supported by an AP (access point) in a wireless communication system, the method comprising:
- transmitting, to a STA, a beacon frame containing a TIM (traffic indication map), wherein the TIM indicates that traffic for the STA is buffered; and
- receiving a PS-Poll (Power Save-Poll) frame from the STA receiving an indication of a presence of a buffered traffic the TIM,
- wherein the PS-Poll frame is received during at a PS-Poll dedicated RAW(restricted access window) accessible for a specific page group including the STA,
- wherein each STA included in the specific page group is allowed to send the PS-Poll frame to the AP during the PS-Poll dedicated RAW,
- wherein the STA does not receive a data frame during the PS-Poll dedicated RAW, and
- wherein at least one EDCA parameters used for transmitting the PS-Poll frame is equivalent to an EDCA parameter used for transmitting audio traffic.

10. The method of claim 9, wherein the EDCA parameter comprises at least one selected from the group consisting of CWmin (minimum Contention Window), CWmax (maximum Contention Window) and AIFSN (Arbitration Inter-Frame Spacing Number).

11. The method of claim 9, wherein the AP transmits a data frame during a RAW additionally assigned behind after the PS-Poll dedicated RAW.

12. The method of claim 9, wherein when the PS-Poll frame is not be received during the PS-Poll dedicated RAW, the AP receives the PS-poll frame during a RAW additionally assigned behind after the PS-Poll dedicated RAW.

13. The method of claim 9, wherein the AP transmits a UTA (UL transmission allowance) frame indicating that the channel access of the STA is allowed during a RAW additionally assigned behind after the PS-Poll dedicated RAW.

14. The method of claim 13, wherein the UTA frame is transmitted while a channel is idle over a prescribed time during the RAW additionally assigned behind after the PS-Poll dedicated RAW.

15. The method of claim 13, wherein the UTA frame is transmitted to the paged STA by unicast or multicast.

16. The method of claim 13, wherein the UTA frame is transmitted by broadcast.

17. A station (STA) device that performs a channel access in a wireless communication system, the STA comprising:
- a transceiver that transmits and receives a radio signal;
- a processor that controls the transceiver to:
  - receive a beacon frame containing a TIM (traffic indication map) from an AP (access point), and
  - transmit a PS-Poll (Power Save-Poll) frame to the AP when the TIM indicates that traffic is buffered,
- wherein the PS-Poll frame is transmitted during a PS-Poll dedicated RAW(restricted access window) accessible for a specific page group including the STA,
- wherein each STA included in the specific page group is allowed to send the PS-Poll frame to the AP during the PS-Poll dedicated RAW,
- wherein the STA does not receive a data frame during the PS-Poll dedicated RAW, and
- wherein at least one EDCA parameter used for transmitting the PS-Poll frame is equivalent to an EDCA parameter used for transmitting audio traffic.

18. An AP (access point) device that supports a channel access in a wireless communication system, the AP comprising:
- a transceiver that transmits and receives a radio signal;
- a processor that controls the transceiver to:
  - transmit, to an STA, a beacon frame containing a TIM (traffic indication map), wherein the TIM indicates that traffic for the STA is buffered, and
  - receive a PS-Poll frame from an STA receiving an indication of a buffered traffic by the TIM,
- wherein the PS-Poll frame is received during a PS-Poll dedicated RAW(restricted access window) accessible for a specific page group including the STA,
- wherein each STA included in the specific page group is allowed to send the PS-Poll frame to the AP during the PS-Poll dedicated RAW,
- wherein the STA does not receive a data frame during the PS-Poll dedicated RAW, and
- wherein at least one EDCA parameter used for transmitting the PS-Poll frame is equivalent to an EDCA parameter used for transmitting audio traffic.

* * * * *